US012641612B2

(12) United States Patent
Yoshimura et al.

(10) Patent No.: US 12,641,612 B2
(45) Date of Patent: May 26, 2026

(54) DETERMINING THE NUMBER OF CODED MODULATION SYMBOLS IN UPLINK CONTROL INFORMATION

(71) Applicant: SHARP KABUSHIKI KAISHA, Sakai City (JP)

(72) Inventors: Tomoki Yoshimura, Camas, WA (US); Zhanping Yin, Vancouver, WA (US)

(73) Assignee: SHARP KABUSHIKI KAISHA, Sakai City (JP)

( * ) Notice: Subject to any disclaimer, the term of this patent is extended or adjusted under 35 U.S.C. 154(b) by 0 days.

(21) Appl. No.: 18/429,029

(22) Filed: Jan. 31, 2024

(65) Prior Publication Data

US 2025/0247848 A1 Jul. 31, 2025

(51) Int. Cl.
H04W 72/21 (2023.01)
(52) U.S. Cl.
CPC ................................... H04W 72/21 (2023.01)
(58) Field of Classification Search
CPC ............................. H04W 72/21; H04W 72/20
See application file for complete search history.

(56) References Cited

U.S. PATENT DOCUMENTS

2018/0124815 A1* 5/2018 Papasakellariou ...........................
H04W 72/1268
2022/0104210 A1* 3/2022 Yang ................. H04W 72/1263

2023/0095899 A1* 3/2023 Yang ..................... H04L 1/1861
370/329
2023/0353276 A1* 11/2023 Park .......................... H04L 5/00
2024/0276305 A1* 8/2024 Khoshkholgh Dashtaki ...............
H04L 1/1864

OTHER PUBLICATIONS

3GPP, "Multiplexing and channel coding", Section 6.3.2.4.1.1 UCI encoded by Polar code: HARQ-ACK p. 70, 3GPP TS 38.212, version 16.2.0, Release 16, Jul. 20, 2020 [Online]. Available: https://www.etsi.org/deliver/etsi_ts/138200_138299/138212/16.02. 00_60/ts_138212v160200p.pdf. (Year: 2020).*
Hsiao-Hwa Chen, Hsin-Wei Chiu and M. Guizani, "Orthogonal complementary codes for interference-free CDMA technologies," in IEEE Wireless Communications, vol. 13, No. 1, pp. 68-79, Feb. 2006, doi: 10.1109/MWC.2006.1593527. (Year: 2006).*

* cited by examiner

*Primary Examiner* — Jae Y Lee
*Assistant Examiner* — Nhu Pham
(74) *Attorney, Agent, or Firm* — ScienBiziP, P.C.

(57) ABSTRACT

A UE that includes one or more non-transitory computer-readable media storing one or more computer-executable instructions for determining the number of coded modulation symbols for Uplink Control Information (UCI) in a Physical Uplink Shared Channel (PUSCH) transmission and at least one processor coupled to the non-transitory computer-readable media is provided. The processor is configured to execute the one or more instructions to cause the UE to determine that an Orthogonal Cover Code (OCC) is applied to the PUSCH transmission based on an indication received from a base station (BS) and determine the number of coded modulation symbols for the UCI based on the determination that the OCC is applied to the PUSCH transmission and a parameter received from the BS.

1 Claim, 27 Drawing Sheets

100

101A
Terminal
device

101B
Terminal
device

101C
Terminal
device

103
Base station
device

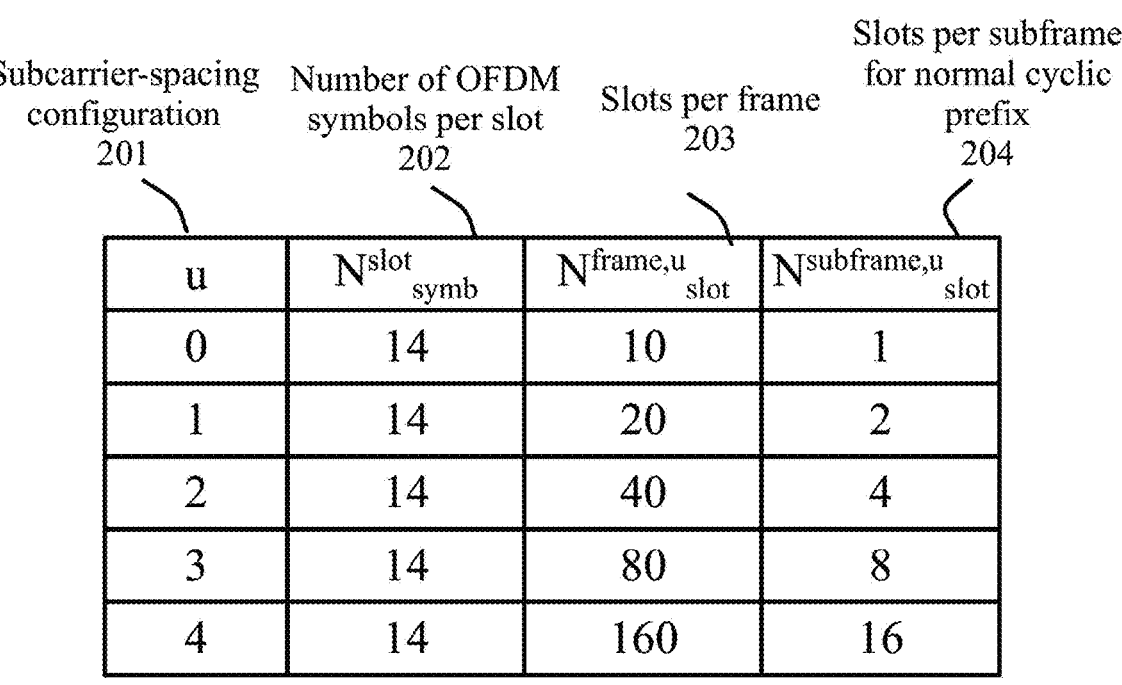

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Subcarrier-spacing configuration 201 — Number of OFDM symbols per slot 202 — Slots per frame 203 — Slots per subframe for normal cyclic prefix 204

Figure 2A

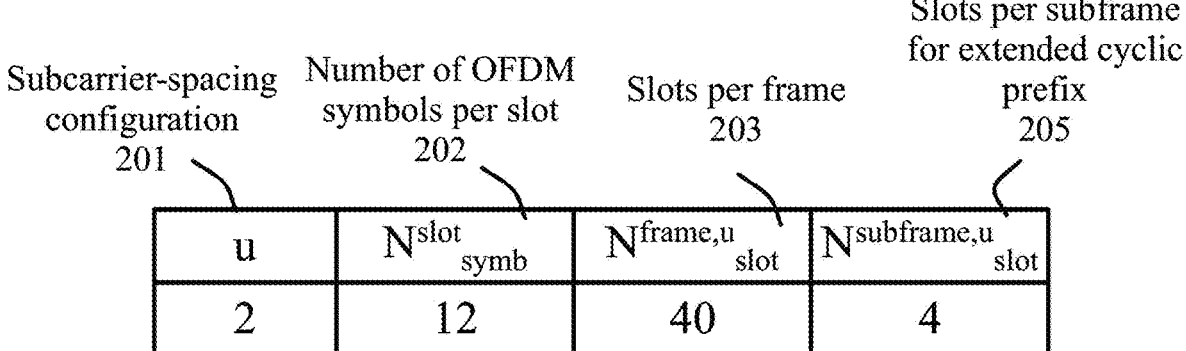

| u | $N^{slot}_{symb}$ | $N^{frame,u}_{slot}$ | $N^{subframe,u}_{slot}$ |
|---|---|---|---|
| 2 | 12 | 40 | 4 |

Subcarrier-spacing configuration 201 — Number of OFDM symbols per slot 202 — Slots per frame 203 — Slots per subframe for extended cyclic prefix 205

Figure 2B

Frequency

Time (OFDM symbol index $l_{sym}$)

REs for PSS

REs for SSS

REs for PBCH

Start

1101

The terminal device determines the number $N_{RE}$ of resource elements

1102

The terminal device determines the value $N_{info}$

1103

Terminal device determines the TBS

End

Figure 12:
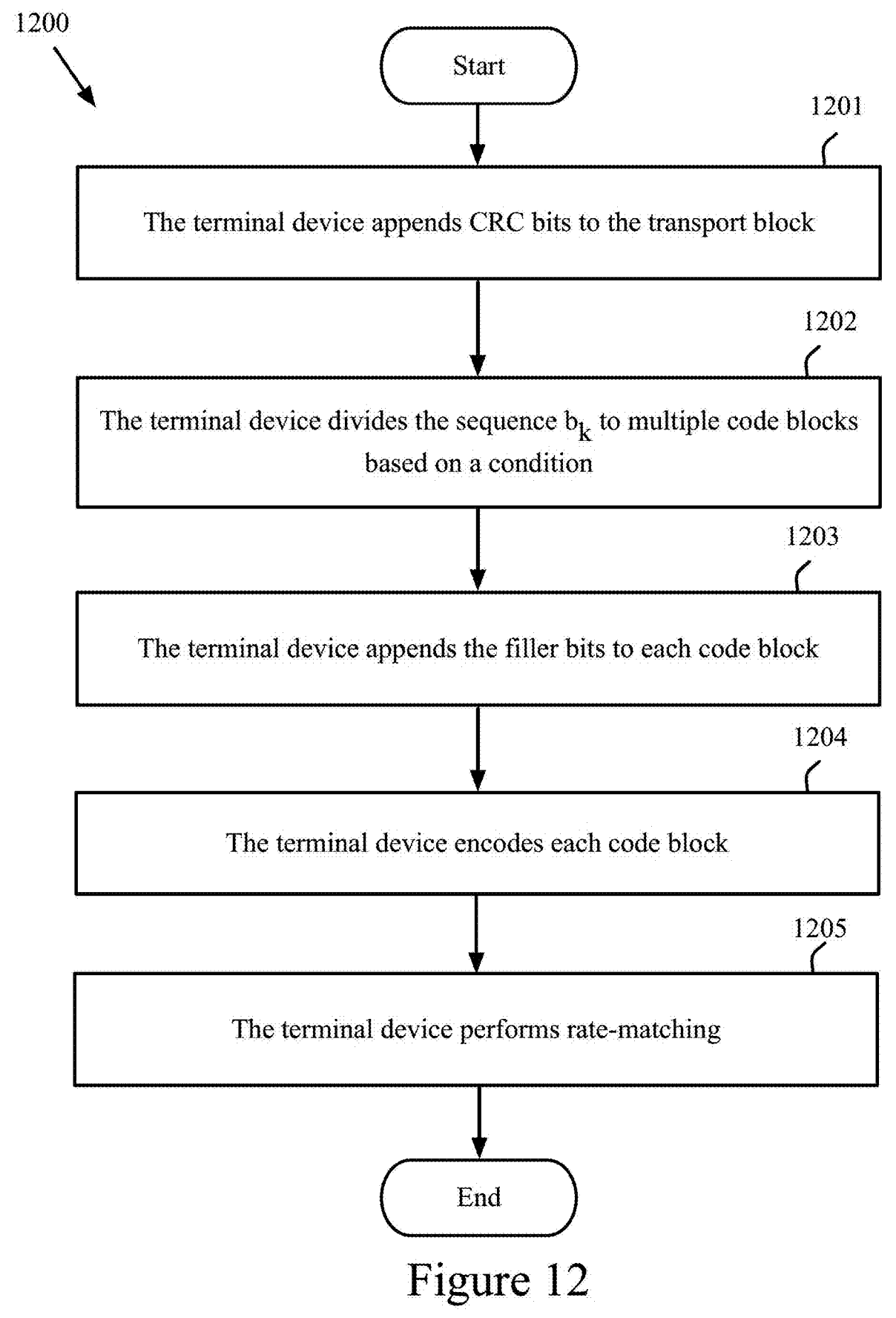

1200

Start

1201

The terminal device appends CRC bits to the transport block

1202

The terminal device divides the sequence $b_k$ to multiple code blocks based on a condition

1203

The terminal device appends the filler bits to each code block

1204

The terminal device encodes each code block

1205

The terminal device performs rate-matching

End

| Spreading factor P | Scaling factor S |
|:---:|:---:|
| 2 | 2 |
| 4 | 3 |
| 6 | 4.5 |

1500

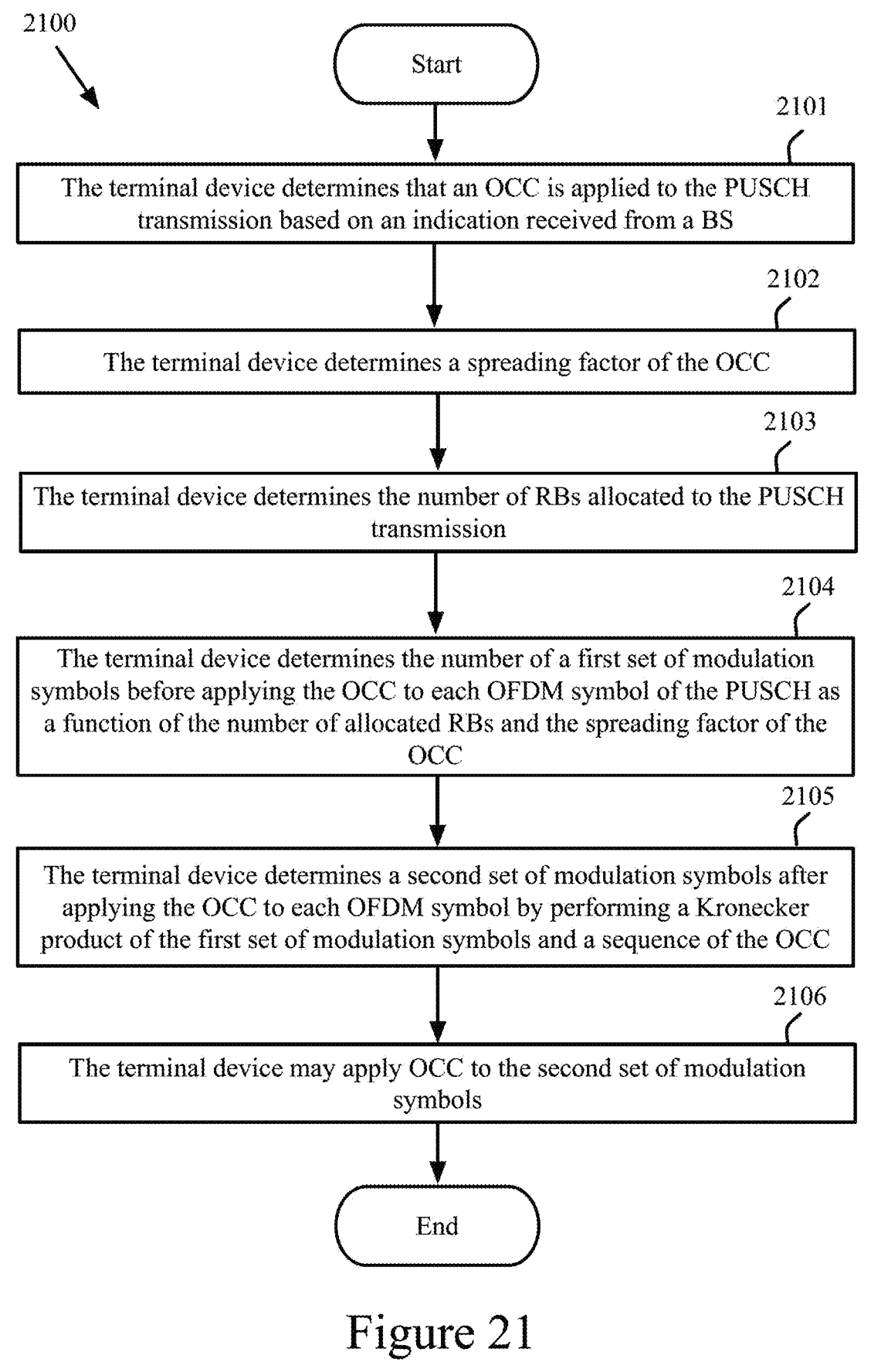

2100

( Start )

2101

The terminal device determines that an OCC is applied to the PUSCH transmission based on an indication received from a BS

2102

The terminal device determines a spreading factor of the OCC

2103

The terminal device determines the number of RBs allocated to the PUSCH transmission

2104

The terminal device determines the number of a first set of modulation symbols before applying the OCC to each OFDM symbol of the PUSCH as a function of the number of allocated RBs and the spreading factor of the OCC

2105

The terminal device determines a second set of modulation symbols after applying the OCC to each OFDM symbol by performing a Kronecker product of the first set of modulation symbols and a sequence of the OCC

2106

The terminal device may apply OCC to the second set of modulation symbols ( End )

Figure 21

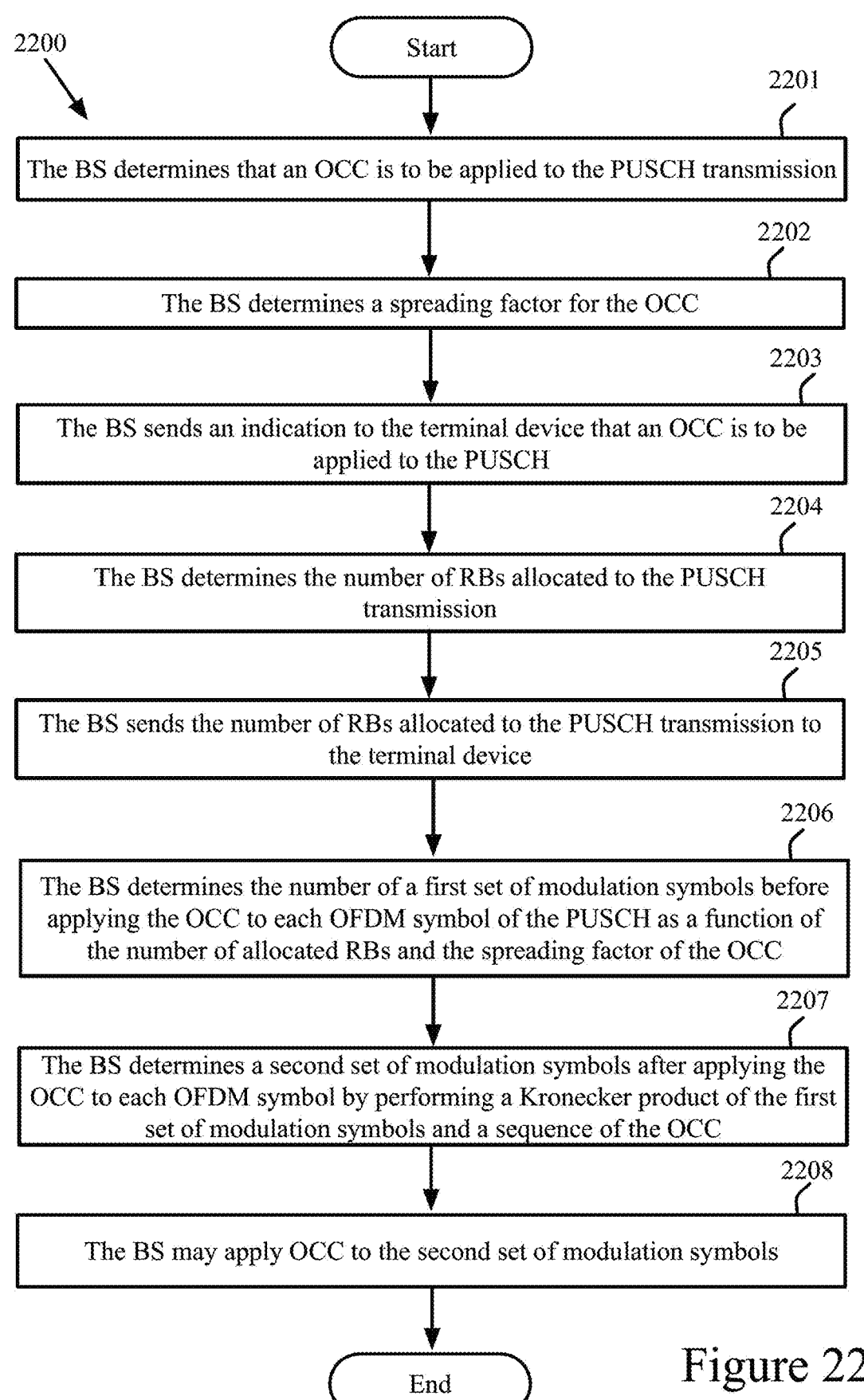

2200

Start

2201

The BS determines that an OCC is to be applied to the PUSCH transmission

2202

The BS determines a spreading factor for the OCC

2203

The BS sends an indication to the terminal device that an OCC is to be applied to the PUSCH

2204

The BS determines the number of RBs allocated to the PUSCH transmission

2205

The BS sends the number of RBs allocated to the PUSCH transmission to the terminal device

2206

The BS determines the number of a first set of modulation symbols before applying the OCC to each OFDM symbol of the PUSCH as a function of the number of allocated RBs and the spreading factor of the OCC

2207

The BS determines a second set of modulation symbols after applying the OCC to each OFDM symbol by performing a Kronecker product of the first set of modulation symbols and a sequence of the OCC

2208

The BS may apply OCC to the second set of modulation symbols

End

Figure 22

DETERMINING THE NUMBER OF CODED MODULATION SYMBOLS IN UPLINK CONTROL INFORMATION

TECHNICAL FIELD

The technology generally relates to wireless communications, and more particularly uplink transmissions.

BACKGROUND

With the tremendous growth in the number of connected devices and the rapid increase in user/network (NW) traffic volume, various efforts have been made to improve different aspects of wireless communication for next-generation radio communication systems, such as fifth-generation (5G) New Radio (NR), by improving data rate, latency, reliability, and mobility.

The 5G NR system is designed to provide flexibility and configurability to optimize NW services and types, thus accommodating various use cases, such as enhanced Mobile Broadband (eMBB), massive Machine-Type Communication (mMTC), and Ultra-Reliable and Low-Latency Communication (URLLC).

However, as the demand for radio access continues to increase, there is a need for further improvements in wireless communications in the next-generation radio communication systems.

SUMMARY

In a first aspect of the present application, a user equipment (UE) is provided. The UE includes one or more non-transitory computer-readable media storing one or more computer-executable instructions for determining the number of coded modulation symbols for Uplink Control Information (UCI) in a Physical Uplink Shared Channel (PUSCH) transmission and at least one processor coupled to the one or more non-transitory computer-readable media. The at least one processor is configured to execute the one or more computer-executable instructions to cause the UE to determine that an Orthogonal Cover Code (OCC) is applied to the PUSCH transmission based on an indication received from a base station (BS); and determine the number of coded modulation symbols for the UCI based on the determination that the OCC is applied to the PUSCH transmission and a parameter received from the BS.

In an implementation of the first aspect, the coded modulation symbols for the UCI includes one or more of coded modulation symbols for hybrid automatic repeat request acknowledgement (HARQ-ACK), coded modulation symbols for Channel State Information (CSI) part 1, or coded modulation symbols for CSI part 2.

In another implementation of the first aspect, the at least one processor is configured to execute the one or more computer-executable instructions to cause the UE to multiplex the coded modulation symbols for HARQ-ACK with a rate-matching output sequence originated from a transport block (TB).

In another implementation of the first aspect, the at least one processor is configured to execute the one or more computer-executable instructions to cause the UE to multiplex the coded modulation symbols for HARQ-ACK and the rate-matching output sequence originated from a TB with a sequence of coded modulation symbols of demodulation reference signal (DMRS).

In another implementation of the first aspect, the at least one processor is configured to execute the one or more computer-executable instructions to cause the UE to multiplex the coded modulation symbols for HARQ-ACK with a rate-matching output sequence originated from a TB, a sequence of coded modulation symbols CSI part 1, and a sequence of coded modulation symbols for CSI part 2.

In another implementation of the first aspect, the parameter received from the BS is parameter $$\beta_{offset}^{ACK};$$

and the at least one processor is configured to execute the one or more computer-executable instructions to cause the UE to determine the number of coded modulation symbols for the HARQ-ACK based on a value of the parameter $$\beta_{offset}^{ACK}.$$

In another implementation of the first aspect, the indication received from the BS is a first indication; the value of the parameter $$\beta_{offset}^{ACK}$$

is a first value of the parameter $$\beta_{offset}^{ACK};$$

the at least one processor is further configured to execute the one or more computer-executable instructions to cause the UE to receive a second indication from the BS; determine that OCC is not applied to the PUSCH transmission based on the second indication; and determine the number of coded modulation symbols for the HARQ-ACK based on the determination that the OCC is not applied to the PUSCH transmission and a second value of the parameter $$\beta_{offset}^{ACK}$$

received from the BS, wherein the first and second values of the parameter $$\beta_{offset}^{ACK}$$

are different.

In another implementation of the first aspect, the at least one processor is configured to execute the one or more computer-executable instructions to cause the UE to receive the first value of the parameter $$\beta_{offset}^{ACK}$$

from the BS in a first radio resource control (RRC) message; and receive the second value of the parameter $$\beta_{offset}^{ACK}$$

from the BS in a second RRC message.

In another implementation of the first aspect, the parameter received from the BS is a spreading factor of the OCC; and the at least one processor is configured to execute the one or more computer-executable instructions to cause the UE to determine the number of coded modulation symbols for the UCI based on the spreading factor of the OCC.

In another implementation of the first aspect, the indication received from the BS is a first indication; the at least one processor is further configured to execute the one or more computer-executable instructions to cause the UE to receive a second indication from the BS; determine that OCC is not applied to the PUSCH transmission based on the second indication; and determine the number of coded modulation symbols for the HARQ-ACK without using the spreading factor of the OCC.

In another implementation of the first aspect, the at least one processor is configured to execute the one or more computer-executable instructions to cause the UE to determine the spreading factor of the OCC as a length of the OCC.

In another implementation of the first aspect, the parameter received from the BS is parameter $\alpha$; and the at least one processor is configured to execute the one or more computer-executable instructions to cause the UE to determine the number of coded modulation symbols for the HARQ-ACK based on a value of the parameter $\alpha$.

In another implementation of the first aspect, the indication received from the BS is a first indication; the value of the parameter $\alpha$ is a first value of the parameter $\alpha$; the at least one processor is further configured to execute the one or more computer-executable instructions to cause the UE to receive a second indication from the BS; determine that OCC is not applied to the PUSCH transmission based on the second indication; and determine the number of coded modulation symbols for the HARQ-ACK without using a second value of the parameter $\alpha$ received from the BS, wherein the first and second values of the parameter $\alpha$ are different.

In another implementation of the first aspect, the at least one processor is configured to execute the one or more computer-executable instructions to cause the UE to receive the first value of the parameter $\alpha$ from the BS in a first RRC message; and receive the second value of the parameter $\alpha$ from the BS in a second RRC message.

In a second aspect, a method of determining the number of coded modulation symbols for HARQ-ACK in a PUSCH transmission is provided. The method includes determining that an OCC is applied to the PUSCH transmission based on an indication received from a BS; and determining the number of coded modulation symbols for the HARQ-ACK based on the determination that the OCC is applied to the PUSCH transmission and a parameter received from the BS.

In a third aspect of the present application, a BS is provided. The BS includes one or more non-transitory computer-readable media storing one or more computer-executable instructions for determining the number of coded modulation symbols for UCI in a PUSCH transmission and at least one processor coupled to the one or more non-transitory computer-readable media. The at least one processor is configured to execute the one or more computer-executable instructions to cause the BS to determine that an OCC is applied to the PUSCH transmission; and determine the number of coded modulation symbols for the UCI based on the determination that the OCC is applied to the PUSCH transmission and a parameter determined by the BS.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

FIGS. 2A and 2B are two diagrams illustrating parameters related to subcarrier spacing (SCS)-specific carriers, according to an example implementation of the present disclosure.

FIG. 7 is a diagram illustrating an example configuration of a synchronization signal/physical broadcast channel (SS/PBCH) block including a primary synchronization signal (PSS) and a secondary synchronization signal (SSS), according to an example implementation of the present disclosure.

FIG. 12 is a flowchart illustrating an example method/process performed by a terminal device to perform rate matching, according to an example implementation of the present disclosure.

FIG. 21 is a flowchart illustrating an example method/ process performed by a terminal device to apply OCC to modulation symbols prior to applying DFT, according to an example implementation of the present disclosure.

FIG. 22 is a flowchart illustrating an example method/ process performed by a base station to apply OCC to modulation symbols prior to applying DFT, according to an example implementation of the present disclosure.

DETAILED DESCRIPTION

Figure 1:
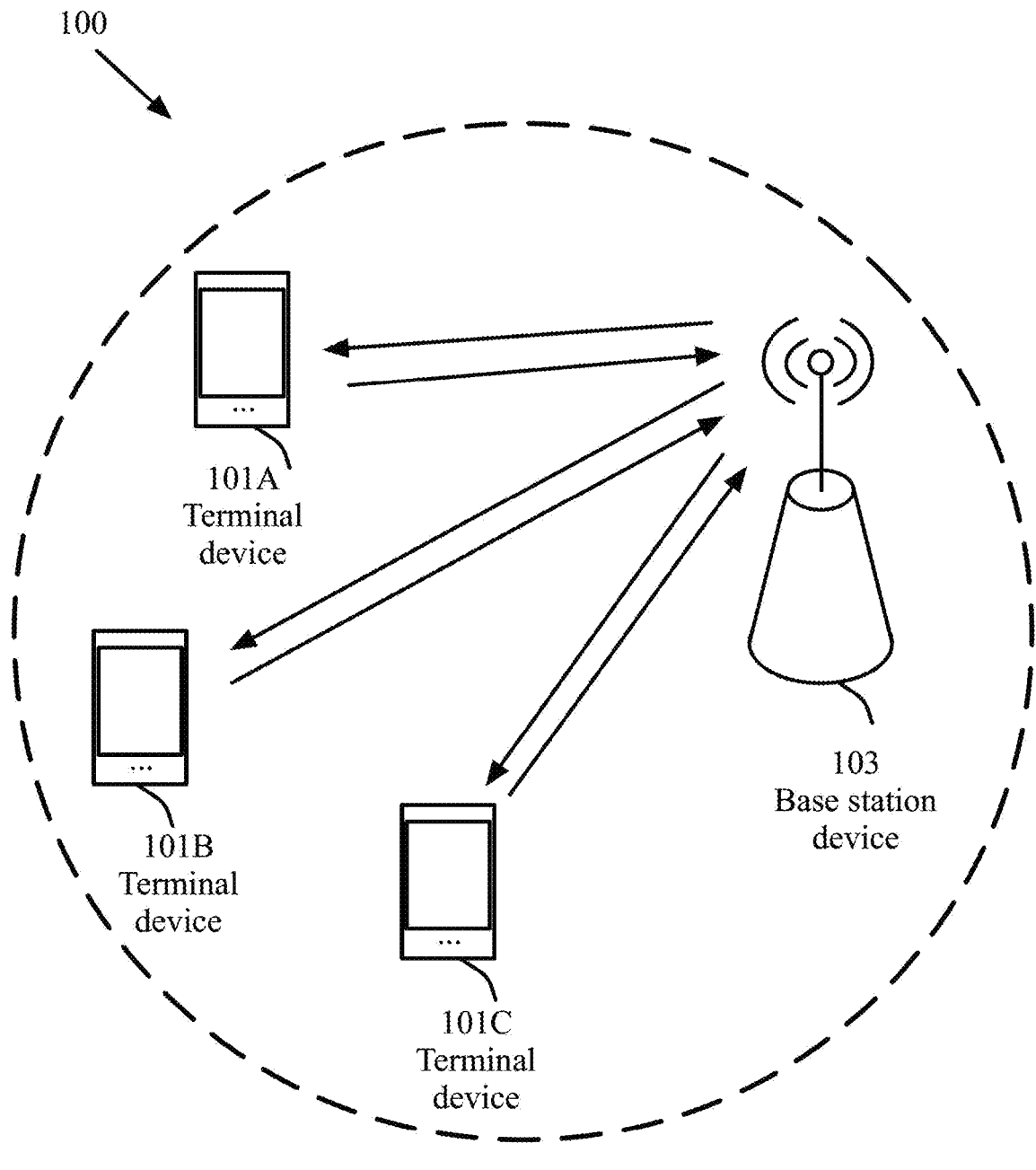
FIG. 1 is a schematic diagram illustrating a radio communication system, according to an example implementation of the present disclosure.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For the purposes of consistency and ease of understanding, like features may be identified (although, in some examples, not shown) by the same numerals in the example figures. However, the features in different implementations may differ in other respects, and thus may not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series, and the equivalent. In addition, the terms "system" and "network" herein may be used interchangeably.

As used herein, the term "and/or" should be interpreted to mean one or more items. For example, the phrase "A, B and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B and C" or the phrase "at least one of A, B or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B and C" or the phrase "one or more of A, B or C" should be interpreted to mean any of: only A, only B, only C, A and B (but not C), B and C (but not A), A and C (but not B), or all of A, B, and C.

Additionally, for the purposes of explanation and non-limitation, specific details, such as functional entities, techniques, protocols, standard, and the like are set forth for providing an understanding of the described technology. In other examples, detailed descriptions of well-known methods, technologies, systems, architectures, and the like are omitted so as not to obscure the description with unnecessary details.

Persons skilled in the art will immediately recognize that any network function(s) or algorithm(s) described in the present disclosure may be implemented by hardware, software, or a combination of software and hardware. Described functions or algorithms may correspond to modules which may be software, hardware, firmware, or any combination thereof. The software implementation may include computer executable instructions stored on a computer-readable medium, such as a memory or other types of storage devices. For example, one or more microprocessors or general-purpose computers with communication processing capability may be programmed with corresponding executable instructions and carry out the described network function(s) or algorithm(s). The microprocessors or general-purpose computers may include of one or more Application-Specific Integrated Circuits (ASICs), programmable logic arrays, and/or one or more Digital Signal Processor (DSPs). Although some of the example implementations described in this specification are oriented to software installed and executing on computer hardware, nevertheless, alternative example implementations implemented as firmware, as hardware, or as a combination of hardware and software are well within the scope of the present disclosure.

The computer-readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a 5G NR Radio Access Network (RAN)) typically includes at least one base station, at least one UE, and one or more optional network elements that provide connection towards a network. The UE communicates with the network (e.g., a Core Network (CN), an Evolved Packet Core (EPC) network, an Evolved Universal Terrestrial Radio Access network (E-UTRAN), a 5G Core (5GC), or an internet), through a radio communication network established by one or more base stations.

It should be noted that, in the present application, a UE (or a terminal device) may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a radio access network.

A base station may be configured to provide communication services according to at least one of the following Radio Access Technologies (RATs): Worldwide Interoperability for Microwave Access (WiMAX), Global System for Mobile communications (GSM, often referred to as 2G), GSM Enhanced Data rates for GSM Evolution (EDGE) Radio Access Network (GERAN), General Packet Radio Service (GPRS), Universal Mobile Telecommunication System (UMTS, often referred to as 3G) based on basic wideband-code division multiple access (W-CDMA), high-speed packet access (HSPA), LTE, LTE-A, eLTE (evolved LTE, e.g., LTE connected to 5GC), NR (often referred to as 5G), and/or LTE-A Pro. However, the scope of the present application should not be limited to the above-mentioned protocols.

A base station may include, but is not limited to, a node B (NB) as in the UMTS, an evolved node B (eNB) as in the LTE or LTE-A, a radio network controller (RNC) as in the UMTS, a base station controller (BSC) as in the GSM/GSM Enhanced Data rates for GSM Evolution (EDGE) Radio Access Network (GERAN), a next-generation eNB (ng-eNB) as in an Evolved Universal Terrestrial Radio Access (E-UTRA) BS in connection with the 5GC, a next-generation Node B (gNB) as in the 5G Access Network (5G-AN), and any other apparatus capable of controlling radio communication and managing radio resources within a cell. The BS may connect to serve the one or more UEs through a radio interface to the network.

The base station may be operable to provide radio coverage to a specific geographical area using several cells included in the radio communication network. The BS may support the operations of the cells. Each cell may be operable to provide services to at least one UE within its radio coverage. Specifically, each cell (often referred to as a serving cell) may provide services to serve one or more UEs within its radio coverage (e.g., each cell corresponds to the Downlink (DL) and optionally Uplink (UL) resources to at least one UE within its radio coverage for DL and optionally UL packet transmission). The BS may communicate with one or more UEs in the radio communication system through the cells.

A cell may correspond to sidelink (SL) resources for supporting Proximity Service (ProSe) or Vehicle to Everything (V2X) services. Each cell may have overlapped coverage areas with other cells.

As discussed above, the frame structure for NR is to support flexible configurations for accommodating various next generation (e.g., 5G) communication requirements, such as Enhanced Mobile Broadband (eMBB), Massive Machine Type Communication (mMTC), Ultra-Reliable and Low-Latency Communication (URLLC), while fulfilling high reliability, high data rate and low latency requirements. The Orthogonal Frequency-Division Multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) Low-Density Parity-Check (LDPC) code and (2) Polar Code. The coding scheme adaption may be configured based on the channel conditions and/or the service applications.

Moreover, it is also considered that in a transmission time interval of a single NR frame, a downlink (DL) transmission period, a guard period, and an uplink (UL) transmission data may at least be included, where the respective portions of the DL transmission data, the guard period, the UL transmission data should also be configurable, for example, based on the network dynamics of NR. In addition, sidelink resources may also be provided in an NR frame to support ProSe services, (E-UTRA/NR) sidelink services, or (E-UTRA/NR) V2X services.

A UE configured with multi-connectivity may connect to a Master Node (MN) as an anchor and one or more Secondary Nodes (SNs) for data delivery. Each one of these nodes may be formed by a cell group that includes one or more cells. For example, a Master Cell Group (MCG) may be formed by an MN, and a Secondary Cell Group (SCG) may be formed by an SN. In other words, for a UE configured with dual connectivity (DC), the MCG is a set of one or more serving cells including the PCell and zero or more secondary cells. Conversely, the SCG is a set of one or more serving cells including the PSCell and zero or more secondary cells.

As also described above, the Primary Cell (PCell) may be an MCG cell that operates on the primary frequency, in which the UE either performs the initial connection establishment procedure or initiates the connection reestablishment procedure. In the DC mode, the PCell may belong to the MN. The Primary SCG Cell (PSCell) may be an SCG cell in which the UE performs random access (e.g., when performing the reconfiguration with a sync procedure). In MR-DC, the PSCell may belong to the SN. A Special Cell (SpCell) may be referred to a PCell of the MCG, or a PSCell of the SCG, depending on whether the Medium Access Control (MAC) entity is associated with the MCG or the SCG. Otherwise, the term Special Cell may refer to the PCell. A Special Cell may support a Physical Uplink Control Channel (PUCCH) transmission and contention-based Random Access, and may always be activated. Additionally, for a UE in an RRC_CONNECTED state that is not configured with the CA/DC, may communicate with only one serving cell (SCell) which may be the primary cell. Conversely, for a UE in the RRC_CONNECTED state that is configured with the CA/DC a set of serving cells including the special cell(s) and all of the secondary cells may communicate with the UE.

Some mathematical expressions used in the present application are provided below.

Floor (CX) represents a floor function for the real number CX. For example, floor (CX) may represent a function that provides the largest integer within a range that does not exceed the real number CX.

Ceil (DX) represents a ceiling function to a real number DX. For example, ceil (DX) may be a function that provides the smallest integer within the range not less than the real number DX.

Mod (EX, FX) represents a function that provides the remainder obtained by dividing EX by FX.

Exp (GX) represents e^GX. Here, e is the Napier number. Also, (HX)^(IX) indicates IX to the power of HX.

According to one aspect of the present embodiment, a waveform formed based on the OFDM may be used in a radio communication system. An OFDM symbol defines a unit in the time domain of the waveform. Each OFDM symbol is converted to a time-continuous signal during a baseband signal generation. For example, the cyclic prefix-OFMD (CP-OFDM) may be used in the downlink transmission of the radio communication system. For example, either CP-OFDM or Discrete Fourier Transform-spread-Orthogonal Frequency Division Multiplex (DFT-s-OFDM) may be used in the uplink transmission of the radio communication system.

FIG. 1 is a schematic diagram illustrating a radio communication system, according to an example implementation of the present disclosure. In FIG. 1, the radio communication system 100 includes the terminal devices 101A to 101C and the base station device 103 (BS 103). The terms base station device, base station, and BS herein may be used interchangeably. The terms terminal device, user equipment, and UE herein may be used interchangeably.

BS 103 may include one or more transmission/reception devices. When BS 103 is configured of multiple transmission/reception devices, each of the multiple transmission/reception devices may be arranged at a different position. A transmission/reception device may include a transmission device and/or a reception device.

BS 103 may serve radio communication and provide one or more cells. A cell is defined as a set of resources used for a wireless communication. A cell may include one or both of a downlink component carrier and an uplink component carrier. A serving cell may include a downlink component carrier and two or more uplink component carriers.

One or more SCS-specific carriers may be associated with one component carrier. Each SubCarrier Spacing-specific (SCS-specific) carrier defines a carrier for a subcarrier-spacing configuration. For example, one SCS-specific carrier may be associated with either a downlink component carrier or an uplink component carrier. In another example, one SCS-specific carrier may be associated with both a downlink component carrier and an uplink component carrier.

FIGS. 2A and 2B are two diagrams illustrating parameters related to subcarrier spacing (SCS)-specific carriers, according to an example implementation of the present disclosure. In FIGS. 2A and 2B, u 201 represents the subcarrier-spacing configuration. $N^{slot}_{symb}$ 202 represents the number of OFDM symbols in a slot. $N^{frame,u}_{slot}$ 203 represents the number of slots in a radio frame. $N^{frame,u}_{slot}$ 204 and $N^{frame,u}_{slot}$ 205 represent the number of slots in a subframe for normal cyclic prefix and extended cyclic prefix, respectively.

In FIG. 2A, for example, when the subcarrier-spacing configuration u 201 is set to 2 and the CP configuration is set to normal Cyclic Prefix CP), the parameters are set to $N^{slot}_{symb}=14$, $N^{frame,u}_{slot}=40$, and $N^{frame,u}_{slo}=4$. Further, in FIG. 2B, for example, when the subcarrier-spacing configuration u 201 is set to 2 and the CP configuration is set to an extended CP, the parameters are set to $N^{frame,u}_{slot}=12$, $N^{frame,u}_{slot}=40$, $N^{frame,u}_{slot}=4$.

Time unit $T_c$ represents the length of the time domain. The time unit $T_c$ may be calculated by $1/(df_{max}*N_f)$, where $df_{max}$ represents 480 kHz and $N_f=4096$. The constant k may be calculated by $df_{max}*N_f/(df_{ref}N_{f,ref})$. The constant k is 64 when $df_{ref}$ is 15 kHz and $N_{f,ref}$ is 2048.

Radio transmissions in the downlink and/or radio transmissions in the uplink may be organized into radio frames (or system frames, frames) of length $T_f$. $T_f$ is calculated by $(df_{max}N_f/100)*T_s$ and $(df_{max}N_f/100)*T_s$ is equal to 10 ms. One radio frame may include ten subframes. The subframe length $T_{sf}$ is calculated by $df_{max}N_fT_s/1000$ and $df_{max}N_fT_s/1000$ is equal to 1 ms. The number of OFDM symbols per subframe $N^{subframe,u}_{symb}$ is calculated by $N^{slot}_{symb}N^{subframe,u}_{slot}$.

SCS of the OFDM-based waveform may be calculated by subcarrier-spacing configuration u. For example, the SCS may be calculated by $15000*2^u$.

Figure 3:
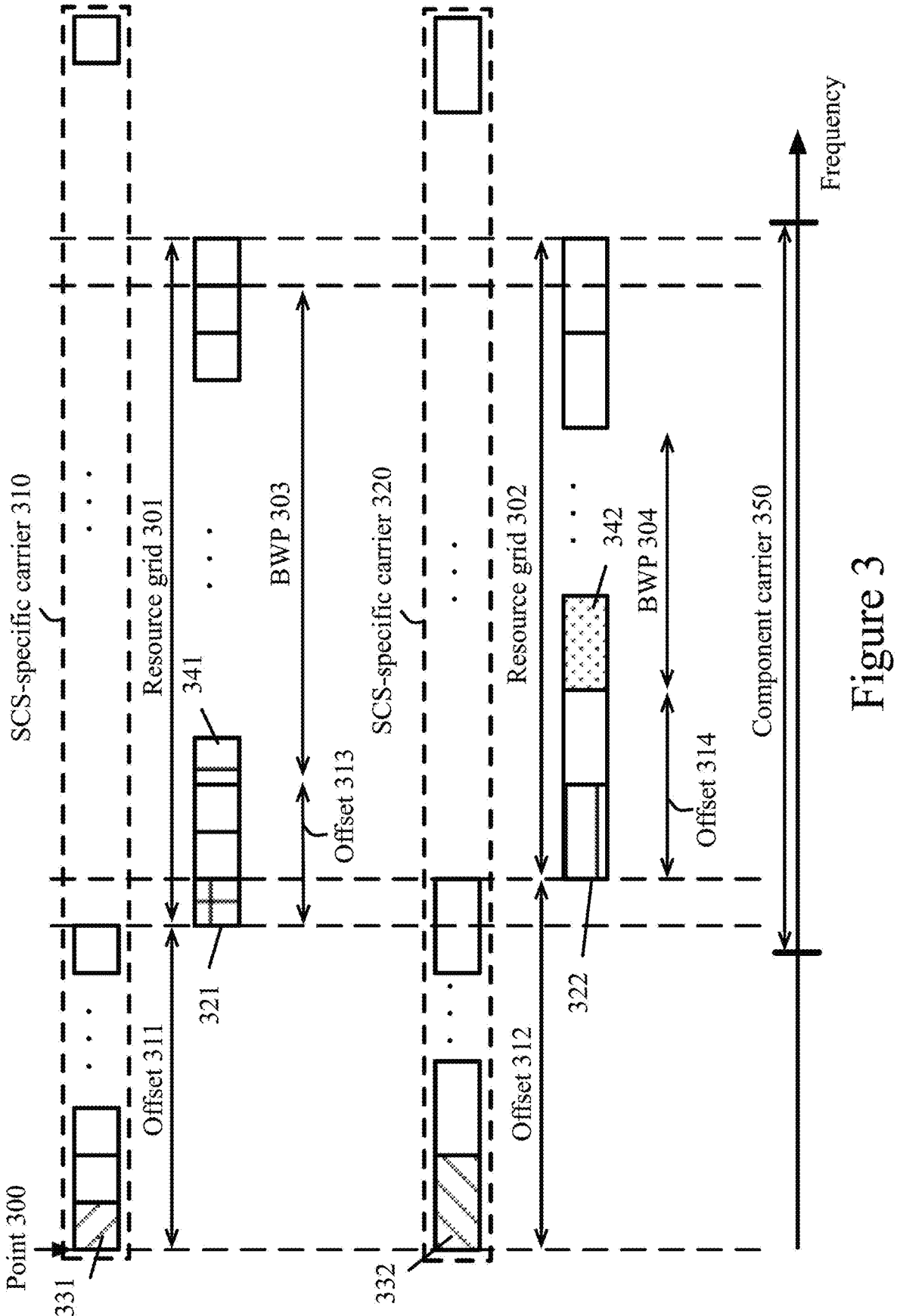
FIG. 3 is a diagram illustrating an example configuration of SCS-specific carriers, according to an example implementation of the present disclosure.

FIG. 3 is a diagram illustrating an example configuration of SCS-specific carriers, according to an example implementation of the present disclosure. The horizontal axis in FIG. 3 represents the frequency domain. FIG. 3 shows a configuration example of two SCS-specific carriers associated with the component carrier 350. In FIG. 3, $u_1=u_2-1$ is assumed.

Point 300 is an identifier for a specific subcarrier. Point 300 is also referred to as Point A. Common resource blocks (CRBs) for SCS-specific carrier 310 are defined with respect to Point 300. The CRB with index 0 is represented by the block 331. CRBs for SCS-specific carrier 320 are defined with respect to Point 300. The CRB with index 0 is represented by the block 332. The CRB with index 0 is defined as the CRB where a subcarrier in the CRB coincides with the subcarrier identified by Point 300.

In FIG. 3, the bandwidth of one CRB in the SCS-specific carrier 310 is a half bandwidth of one CRB in the SCS-specific carrier 320. In other implementations, the bandwidth of one CRB in the SCS-specific carrier 310 may be the same as the bandwidth of one CRB in the SCS-specific carrier 320.

The offset 311 is a Resource Block-level (RB-level) offset from the CRB with index 0 for SCS-specific carrier 310 to the reference point 321 of the resource grid 301. The reference point of the resource grid 301 is the block 321. The offset 312 is an RB-level offset from the CRB with index 0 for SCS-specific carrier 320 to the reference point 322 of the resource grid 302. The reference point of the resource grid 302 is the block 322.

The offset 313 is an RB-level offset from the reference point 321 of the resource grid 301 to the reference point 341 of the Band Width Part (BWP) 303. The reference point of the BWP 303 is the block 341. The offset 314 is an RB-level offset from the reference point 322 of the resource grid 301 to the reference point 342 of the BWP 304. The reference point of the BWP 304 is the block 342.

Figure 4:
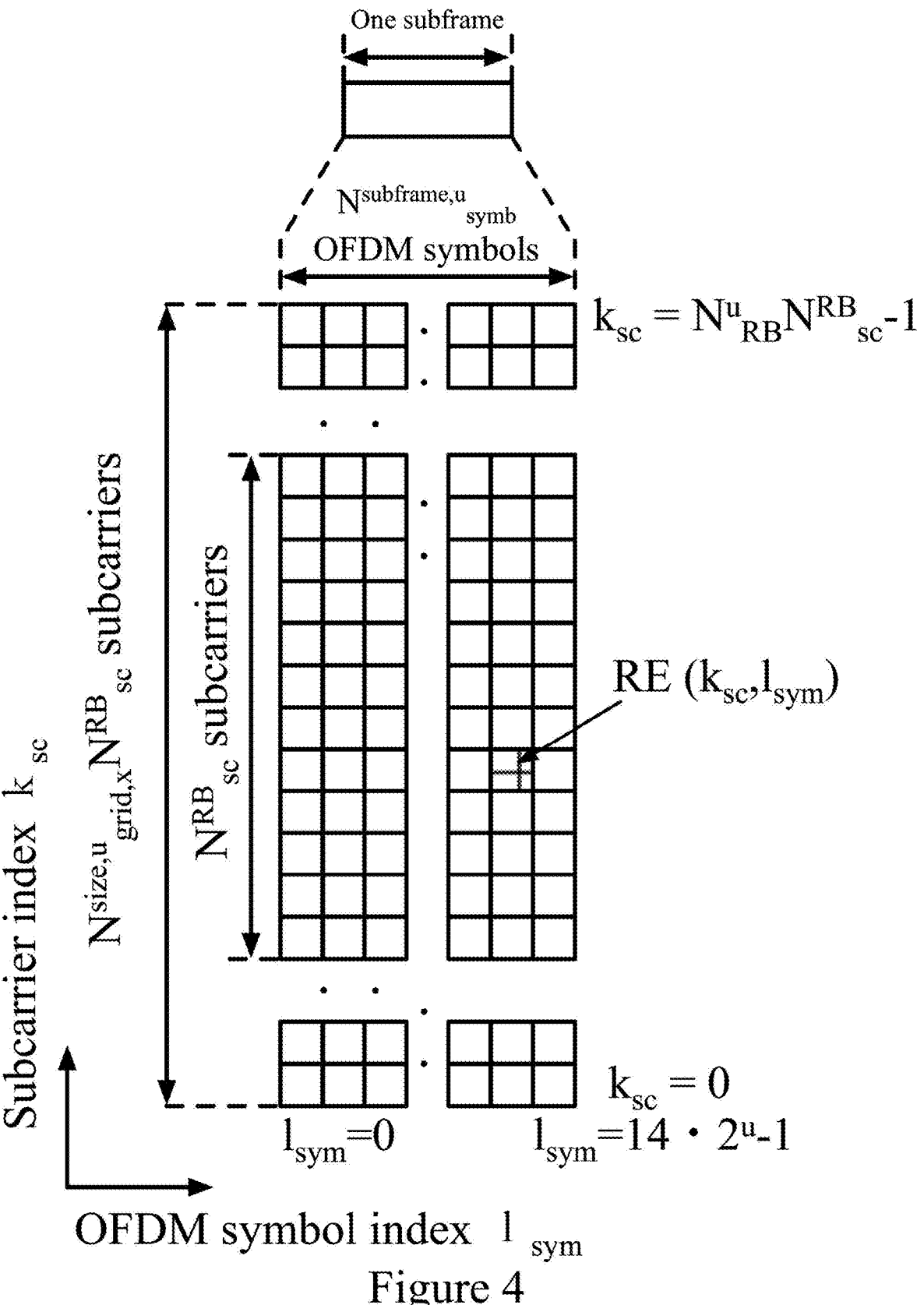
FIG. 4 is a diagrammatic view illustrating an example configuration of a resource grid, according to an example implementation and mode of the present disclosure.

FIG. 4 is a diagrammatic view illustrating an example configuration of a resource grid, according to an example implementation and mode of the present disclosure. The horizontal axis represents OFDM symbol index $l_{sym}$. The vertical axis represents the subcarrier index $ks_c$. The resource grid includes $N^{size,u}_{grid,x} N^{RB}_{sc}$ subcarriers and $N^{subframes,u}_{symb}$ OFDM symbols. A resource specified by the subcarrier index $ks_c$ and the OFDM symbol index $l_{sym}$ in a resource grid is also referred to as (Resource Element (RE).

A resource block (RB) includes $N^{RB}_{sc}$ consecutive subcarriers. A resource block is a generic name for a CRB, a Physical Resource Block (PRB), and/or a Virtual Resource Block (VRB). In FIG. 4, $N^{RB}_{sc}$ may be 12. CRBs are indexed in ascending order starting at CRB with index 0. PRBs are indexed in ascending order starting at its reference point of the BWP. A BWP is defined as a subset of resource blocks included in the resource grid. The BWP includes $N^{size,u}_{BWP,i}$ resource blocks starting from the reference points of the BWP.

An antenna port may be defined such that the channel over which a symbol on the antenna port is conveyed may be inferred from the channel over which another symbol on the same antenna port is conveyed. The channel may correspond to a physical channel. The symbols may correspond to OFDM symbols. The symbols may correspond to resource block units. The symbols may correspond to resource elements.

Two antenna ports are said to be Quasi Co-Located (QCL) if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters. Carrier aggregation is a framework of communication using multiple aggregated serving cells or using multiple component carriers.

Figure 5:
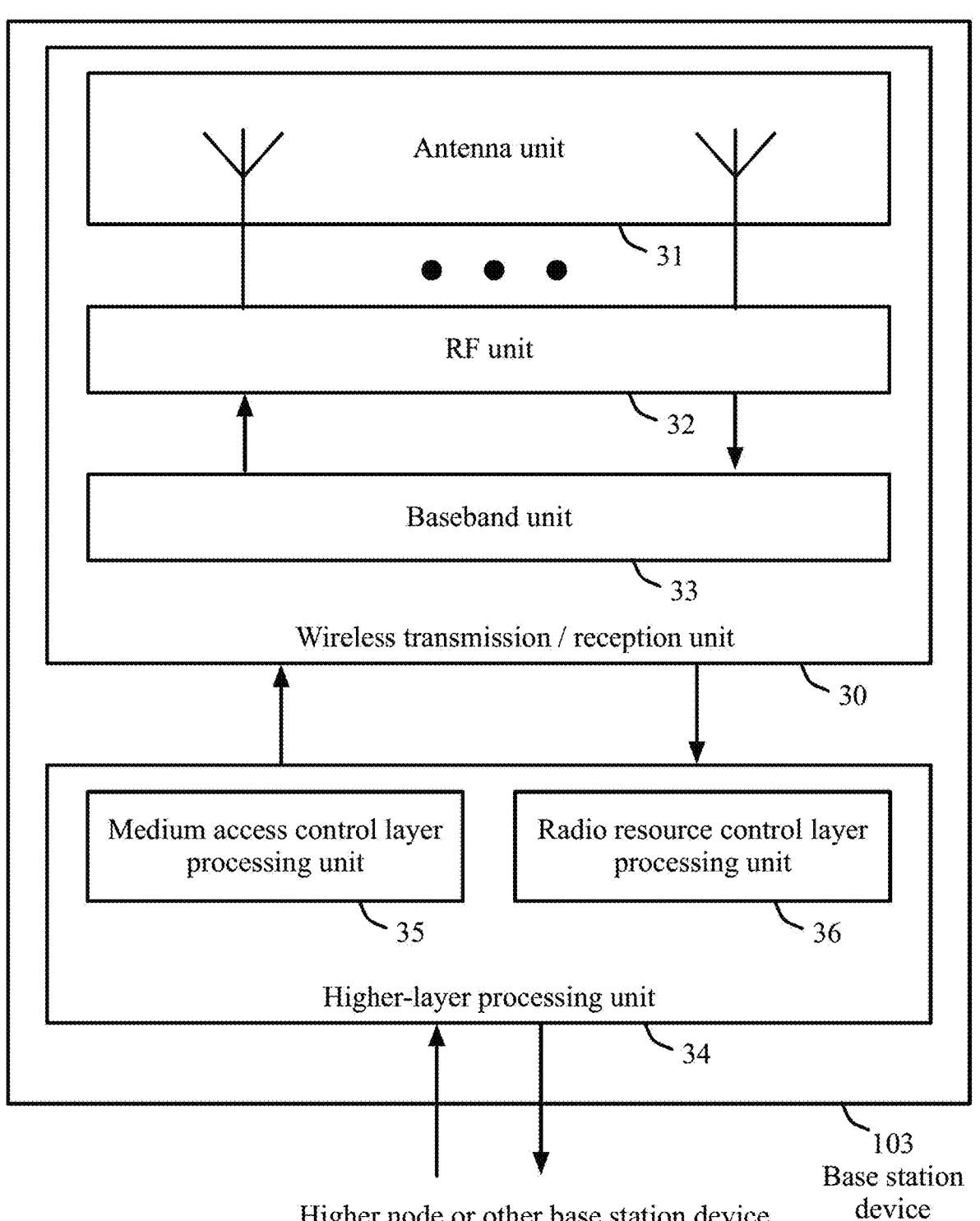
FIG. 5 is a schematic block diagram illustrating a configuration example of a base station device, according to an example implementation of the present disclosure.

FIG. 5 is a schematic block diagram illustrating a configuration example of a base station device 103, according to an example implementation of the present disclosure. As shown in FIG. 5, the base station device 103 may include a part or all of the wireless transmission and reception unit (also referred to herein as physical layer processing unit) 30 and a higher-layer processing unit 34. The wireless transmission and reception unit 30 may include a part or all of an antenna unit 31, a Radio Frequency (RF) unit 32, and a baseband unit 33. The higher-layer processing unit 34 may include a part or all of a Medium Access Control (MAC) layer processing unit 35 and a Radio Resource Control (RRC) layer processing unit 36.

The wireless transmission and reception unit 30 may include a part (or all) of a wireless transmission unit 30a (not shown in the figure) and a wireless reception unit 30b (not shown in the figure). The configuration of the baseband unit 33 in the wireless transmission unit 30a and the configuration of the baseband unit 33 in the wireless reception unit 30b may be the same or different. The configuration of the RF unit 32 in the wireless transmission unit 30a and the configuration of the RF unit 32 in the wireless reception unit 30b may be the same or different. The configuration of the antenna unit 31 in the wireless transmission unit 30a and the configuration of the antenna unit 31 in the wireless reception unit 30b may be the same or different. The wireless transmission and reception unit 30 may include at least one processor (not shown in the figure) and one or more non-transitory computer-readable media (not shown in the figure) that store computer-executable instructions and data.

The higher-layer processing unit 34 may provide downlink data (e.g., transport blocks) to the wireless transmission and reception unit 30 (or the wireless transmission unit 30a).

The higher-layer processing unit 34 may perform the processing of a part or all of the MAC layer, the Packet Data Convergence Protocol (PDCP) layer, the Radio Link Control (RLC) layer and the RRC layer. The higher-layer processing unit 34 may also include at least one processor (not shown in the figure) and one or more non-transitory computer-readable media (not shown in the figure) that store computer-executable instructions and data.

The MAC layer processing unit 35 may perform the processing of the MAC layer. The RRC layer processing unit 36 may perform the processing of the RRC layer. The RRC layer processing unit 36 may manage various RRC parameters of the terminal device 101.

The wireless transmission and reception unit 30 (or the wireless transmission unit 30a) may perform processing, such as encoding and modulation. The wireless transmission and reception unit 30 (or the wireless transmission unit 30a) generates a physical signal by encoding and modulating the downlink data. The wireless transmission and reception unit 30 (or the wireless transmission unit 30a) converts the OFDM symbols in the physical signal to a baseband signal by converting them to a time-continuous signal. The wireless transmission and reception unit 30 (or the wireless transmission unit 30a) transmits the baseband signal (or the physical signal) to the terminal device 101 via radio frequency. The wireless transmission and reception unit 30 (or the wireless transmission unit 30a) may arrange the baseband signal (or the physical signal) on a component carrier and transmit the baseband signal (or the physical signal) to the terminal device 101.

The wireless transmission and reception unit 30 (or the wireless reception unit 30b) may perform processing, such as demodulation and decoding. The wireless transmission and reception unit 30 (or the wireless reception unit 30b) separates, demodulates, and decodes the received physical signal, and provides the decoded information to the higher-layer processing unit 34. The wireless transmission and reception unit 30 (or the wireless reception unit 30b) may perform the channel access procedure prior to the transmission of the physical signal.

The RF unit 32 demodulates the radio signal received via the antenna unit 31 into an analog signal, and/or removes the extra frequency components. The RF unit 32 provides the processed analog signal to the baseband unit 33.

The baseband unit 33 converts the analog signal input from the RF unit 32 into a baseband signal. The baseband unit 33 separates a portion which corresponds to the CP from the baseband signal. The baseband unit 33 performs Fast Fourier Transformation (FFT) on the baseband signal from which the CP has been removed. The baseband unit 33 extracts components of the physical signal from the baseband signal. The baseband unit 33 performs Inverse Fast Fourier Transformation (IFFT) on the downlink data to generate time-continuous signal, adds a CP to the generated signal, generates a baseband signal, and converts the baseband signal into an analog signal. The baseband unit 33 provides the analog signal to the RF unit 32.

The RF unit 32 removes the extra frequency components from the analog signal input from the baseband unit 33, up-converts the analog signal to a radio frequency, and transmits it via the antenna unit 31. The RF unit 32 may have the function of controlling transmission power.

The terminal device 101 may configure one or more downlink BWPs per serving cell. The terminal device 101 may configure one or more uplink BWPs per serving cell.

The terminal device 101 may try to detect a Physical Downlink Shared Channel (PDSCH), a Physical Downlink Control Channel (PDCCH), and a Channel State Information-Reference Signal (CSI-RS) in the active downlink BWP. The terminal device 101 may transmit a Physical Uplink Control Channel (PUCCH) and a Physical Uplink Shared Channel (PUSCH) in the active uplink BWP. The active downlink BWP and the active uplink BWP are also referred to as active BWP.

The terminal device 101 may not receive the PDSCH, PDCCH, and CSI-RS in the downlink BWPs other than the active downlink BWP. The terminal device 101 may not transmit the PUCCH and PUSCH in the uplink BWPs other than the active uplink BWP. BWPs other than the active BWP is referred to as inactive BWPs.

Figure 6:
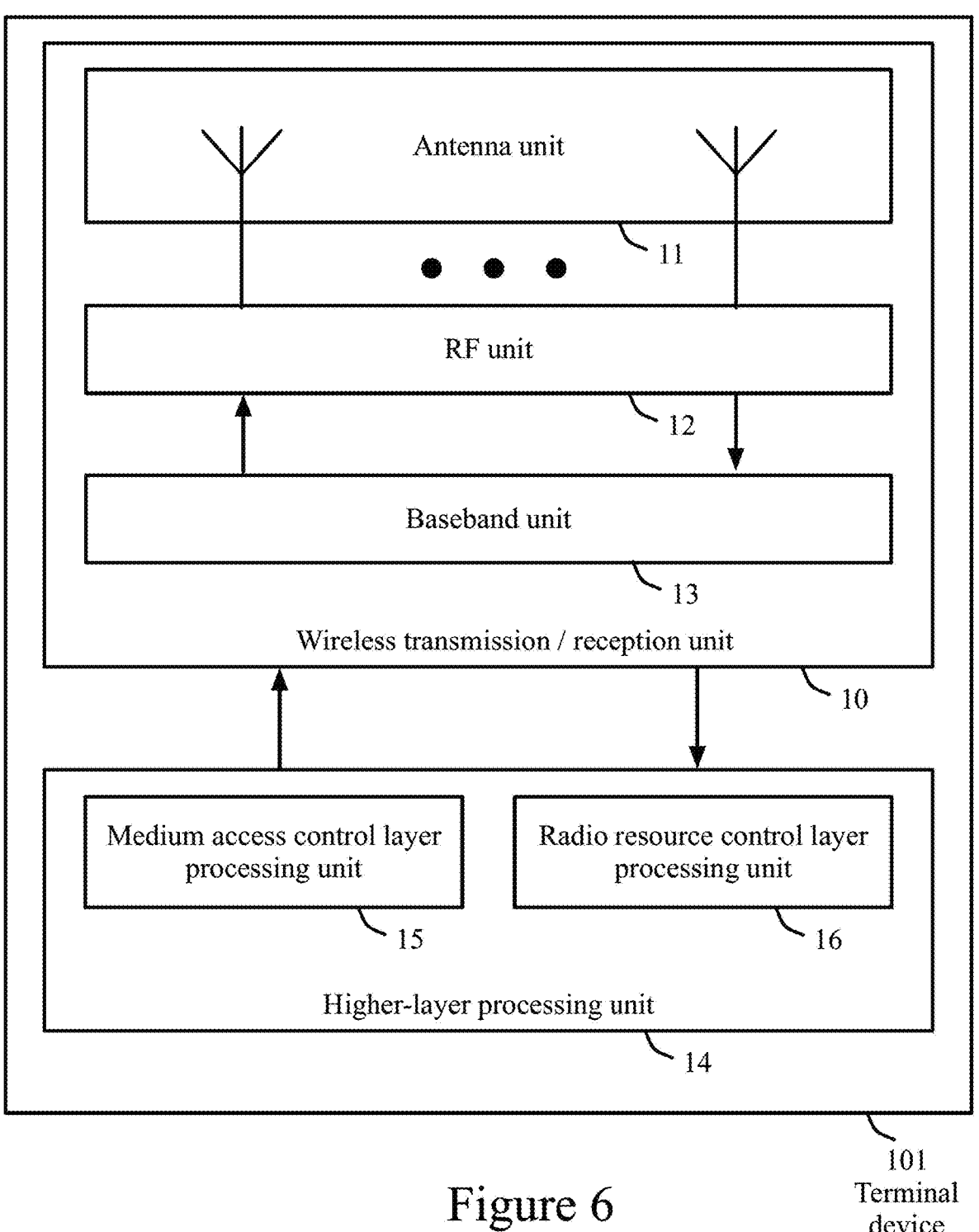
FIG. 6 is a schematic block diagram illustrating a configuration example of a terminal device, according to an example implementation of the present disclosure.

FIG. 6 is a schematic block diagram illustrating a configuration example of a terminal device, according to an example implementation of the present disclosure. As shown in FIG. 6, the terminal device 101 may include a part or all of the wireless transmission and reception unit (also referred to herein as physical layer processing unit) 10 and the higher-layer processing unit 14. The wireless transmission and reception unit 10 may include a part or all of the antenna unit 11, the RF unit 12, and the Baseband unit 13. The higher-layer processing unit 14 may include a part or all of the MAC layer processing unit 15 and the RRC layer processing unit 16. The higher-layer processing unit 14 may include at least one processor (not shown in the figure) and one or more non-transitory computer-readable media (not shown in the figure) that store computer-executable instructions and data.

The wireless transmission and reception unit 10 may include a part of or all of the wireless transmission unit 10a (not shown in the figure) and the wireless reception unit 10b (not shown in the figure). The wireless transmission and reception unit 10 may include at least one processor (not shown in the figure) and one or more non-transitory computer-readable media (not shown in the figure) that store computer-executable instructions and data.

The configuration of the baseband unit 13 in the wireless transmission unit 10a and the configuration of the baseband unit 13 in the wireless reception unit 10b may be the same or different. The configuration of the RF unit 12 in the wireless transmission unit 10a and the RF unit 12 in the wireless reception unit 10b may be the same or different. The configuration of the antenna unit 11 in the wireless transmission unit 10a and the configuration of the antenna unit 11 in the wireless reception unit 10b may be the same or different.

The higher-layer processing unit 14 provides uplink data (transport blocks) to the wireless transmission and reception unit 10 (or the wireless transmission unit 10a). The higher-layer processing unit 14 may perform processing of the MAC layer, the PDCP layer, the RLC layer, and/or the RRC layer.

The MAC layer processing unit 15 in the higher-layer processing unit 14 may perform processing of the MAC layer. RRC layer processing unit 16 in the higher-layer processing unit 14 may perform the process of the RRC layer. RRC layer processing unit 16 manages various RRC parameters of the terminal device 101 based on RRC messages received from the base station device 103.

The wireless transmission and reception unit 10 (or the wireless transmission unit 10a) may perform processing, such as encoding and modulation. The wireless transmission and reception unit 10 (or the wireless transmission unit 10a) may generate a physical signal by encoding and modulating the uplink data. The wireless transmission and reception unit 10 (or the wireless transmission unit 10a) may convert OFDM symbols in the physical signal to a baseband signal by conversion to a time-continuous signal. The wireless transmission and reception unit 10 (or the wireless transmission unit 10a) may transmit the baseband signal (or the physical signal) to the base station device 103 via radio frequency. The wireless transmission and reception unit 10 (or the wireless transmission unit 10a) may arrange the baseband signal (or the physical signal) on a BWP (active uplink BWP) and transmit the baseband signal (or the physical signal) to the base station device 103.

The wireless transmission and reception unit 10 (or the wireless reception unit 10b) performs processing, such as demodulation and decoding. The wireless transmission and reception unit 10 (or the wireless reception unit 10b) may receive a physical signal in a BWP (active downlink BWP) of a serving cell. The wireless transmission and reception unit 10 (or the wireless reception unit 10b) may separate, demodulate, and decode the received physical signal, and provide the decoded information to the higher-layer processing unit 14. The wireless transmission and reception unit 10 (or the wireless reception unit 10b) may perform the channel access procedure prior to the transmission of the physical signal.

The RF unit 12 may demodulate the radio signal received via the antenna unit 11 into an analog signal, and/or removes extra frequency components. The RF unit 12 may provide the processed analog signal to the baseband unit 13. The baseband unit 13 may convert the analog signal input from RF unit 12 into a baseband signal. The baseband unit 13 may separate a portion which corresponds to CP from the baseband signal, perform FFT on the baseband signal from which the CP has been removed. The baseband unit 13 may extract components of the physical signal from the baseband signal.

The baseband unit 13 may perform IFFT on the uplink data to generate time-continuous signal, adds a CP to the generated signal, generate a baseband signal, and convert the baseband signal into an analog signal. The baseband unit 13 may provide the analog signal to the RF unit 12.

The RF unit 12 may remove extra frequency components from the analog signal input from the baseband unit 13, up-converts the analog signal to a radio frequency, and may transmit it via the antenna unit 11. RF unit 12 may have a function of controlling transmission power.

A physical signal is a generic term for physical downlink channels, physical downlink signals, physical uplink channels, and physical uplink signals. The physical channel is a generic term for physical downlink channels and physical uplink channels.

A physical uplink channel corresponds to a set of REs that carry one or both of information originating from the higher-layer and the Uplink Control Information (UCI). In the radio communication system according to one aspect of the present embodiments, a part or all of the PUCCH, PUSCH, and/or a Physical Random Access Channel (PRACH) may be used.

A PUCCH may be used to transmit the UCI. A PUCCH may be sent to deliver (transmit, convey) uplink control information. The UCI may be mapped to the PUCCH. The terminal device 101 may transmit a PUCCH in which the UCI is mapped. The base station device 103 may receive the PUCCH in which the UCI is mapped.

The Channel State Information (CSI) may be deemed as a type of UCI. The CSI is used to convey information related to the propagation path between the terminal device 101 and the base station device 103.

The Hybrid Automatic Repeat request ACKnowledgement (HARQ-ACK) information may also be deemed as a type of UCI. The HARQ-ACK information is used to convey whether the downlink data has been successfully decoded or not.

The Scheduling Request (SR) may also be deemed as a type of UCI. The SR is used to request an uplink resource (a PUSCH or a UL-SCH).

Uplink control information (uplink control information bit, uplink control information sequence, uplink control information type) includes at least part or all of the CSI, SR, and HARQ-ACK.

The CSI may include at least part or all of a channel quality indicator (CQI), a Precoder Matrix Indicator (PMI), and a Rank Indicator (RI). CQI is an indicator related to channel quality (e.g., propagation quality) or physical channel quality, and PMI is an indicator related to a precoder. RI is an indicator related to transmission rank (or the number of transmission layers).

CSI may be provided at least based on receiving one or more physical signals (e.g., one or more CSI-RSs) used at least for channel measurement. The CSI may be selected by a terminal device at least based on receiving one or more physical signals used for channel measurement. Channel measurements may include interference measurements.

A PUSCH may be used to transmit one or both of a transport block and UCI. A PUSCH may be sent to deliver (transmit, convey) one or both of a transport block and uplink control information. The terminal device 101 may transmit a PUSCH in which one or both of a transport block and UCI is mapped. The base station device 103 may receive the PUSCH in which the one or both of the transport block and the UCI is mapped.

A PRACH may be used to transmit a random-access preamble. A PRACH may be sent to deliver (transmit, convey) an index of a random-access preamble. the terminal device 101 may transmit a PRACH. The base station device 103 may receive the PRACH.

For a given PRACH opportunity, 64 random-access preambles are defined. The random-access preamble is specified (determined, given) based on the cyclic shift $C_v$ of the PRACH and the sequence index u for the PRACH.

A physical uplink signal corresponds to a set of REs. A physical uplink signal may not carry information generated in the higher-layer. The terminal device 101 may transmit a physical uplink signal. The base station device 103 may receive the physical uplink signal. In the radio communication system according to one aspect of the present embodiment, a part or all of UpLink Demodulation Reference Signal (UL DMRS), SRS (Sounding Reference Signal (SRS), UpLink Phase Tracking Reference Signal (UL PTRS) may be used.

UL DMRS is a generic name of a DMRS for a PUSCH and a DMRS for a PUCCH. A set of antenna ports of a DMRS for a PUSCH may be given based on a set of antenna ports for the PUSCH. For example, a set of DMRS antenna ports for a PUSCH may be the same as a set of antenna ports for the PUSCH.

A PUSCH and a DMRS for the PUSCH is collectively referred to as PUSCH. A set of antenna ports of a DMRS for a PUCCH may be given based on a set of antenna ports for the PUCCH. For example, a set of DMRS antenna ports for a PUCCH may be the same as a set of antenna ports for the PUCCH. A PUCCH and a DMRS for the PUCCH is collectively referred to as PUCCH.

A physical downlink channel corresponds to a set of REs that carry one or both of information originating from the higher-layer and Downlink Control Information (DCI). In the radio communication system according to one aspect of the present embodiment, a part or all of Physical Broadcast Channel (PBCH), Physical Downlink Control Channel (PDCCH), and Physical Downlink Shared Channel (PDSCH) may be used.

A PBCH may be used to transmit a Master Information Block (MIB). A PBCH may be sent to deliver (transmit, convey) a MIB. The terminal device 101 may receive a PBCH. The base station device 103 may transmit the PBCH.

A PDCCH may be used to transmit DCI. A PDCCH may be sent to deliver (transmit, convey) DCI. The terminal device 101 may receive a PDCCH in which DCI is mapped. The base station device 103 may transmit the PDCCH in which the DCI is mapped.

DCI format includes a set of information fields. Each information field may mask a bit sequence of the DCI. Bits masked by an information field is associated with a specific meaning associated with the information field.

Several DCI formats may be used in the radio communication system according to one aspect of the present embodiment. Several example DCI formats are provided.

DCI format 0_0 is used for scheduling a PUSCH for a cell. The DCI format 0_0 includes a part or all of Information fields 1A to 1E. Information field 1A is a DCI format identification field. Information field 1B is a Frequency Domain Resource Assignment (FDRA) field. Information field 1C is a Time Domain Resource Assignment (TDRA) field. Information field 1D is a frequency-hopping flag field. Information field 1E is a Modulation-and-Coding-Scheme (MCS) field.

A DCI format identification field may indicate whether a DCI format including the DCI format identification field is an uplink DCI format or a downlink DCI format. The DCI format identification field included in the DCI format 0_0 indicates that the DCI format 0_0 is an uplink DCI format.

A FDRA field in a DCI format may be used to indicate assignment of frequency resources for a physical channel scheduled by the DCI format. For example, the FDRA field may indicate the number of RBs, X, for PUSCH.

A TDRA field in a DCI format may be used to indicate assignment of time resources for a physical channel scheduled by the DCI format.

A frequency-hopping flag field in a DCI format may be used to indicate whether frequency-hopping is applied to a physical channel scheduled by the DCI format.

A MCS field in a DCI format may be used to indicate one or both of a modulation scheme for a physical channel scheduled by the DCI format and a target code rate for the physical channel. The target code rate is used to determine a Transport Block Size (TBS) for the physical channel.

The DCI format 0_0 may not include fields used for a CSI request. That is, CSI may not be requested by the DCI format 0_0.

The DCI format 0_0 may not include a carrier indicator field. If an uplink DCI format does not include a carrier indicator field, the terminal device 101 may determine that an uplink component carrier on which a PUSCH scheduled by the uplink DCI format is mapped is an uplink component carrier in a serving cell which includes a downlink component carrier on which a PDCCH with the uplink DCI format is mapped.

The DCI format 0_0 may not include a BWP indicator field. If a DCI format does not include a BWP indicator field, the terminal device 101 may determine that active BWP change has not been triggered by the DCI format.

DCI format 0_1 may be used for scheduling of a PUSCH for a cell. The DCI format 0_1 includes a part or all of Information fields 2A to 2H. Information field 2A is a DCI format identification field. Information field 2B is a FDRA field. Information field 2C is a TDRA field. Information field 2D is a frequency-hopping flag field. Information field 2E is an MCS field. Information field 2F is a CSI request field. Information field 2G is a BWP field. Information field 2H is a carrier indicator field.

The DCI format identification field in the DCI format 01 may indicate that the DCI format 01 is an uplink DCI format.

The CSI request field may be used to request CSI reporting.

If the DCI format 0_1 includes a BWP field, the BWP field may be used to indicate an uplink BWP on which a PUSCH scheduled by the DCI format 0_1 is mapped.

If the DCI format 0_1 includes the carrier indicator field, the carrier indicator field may be used to indicate an uplink component carrier on which a PUSCH is mapped.

DCI format 10 may be used for scheduling of a PDSCH for a cell. The DCI format 1_0 includes a part or all of Information fields 3A to 3F. Information field 3A is a DCI format identification field. Information field 3B is a FDRA field. Information field 3C is a TDRA field. Information field 3D is an MCS field. Information field 3E is a PDSCH-to-HARQ-feedback indicator field. Information field 3F is a PUCCH resource indicator field. The DCI format identification field in the DCI format 1_0 indicates that the DCI format 1_0 is a downlink DCI format.

The PDSCH-to-HARQ-feedback timing indicator field may be used to indicate the offset (K1) from a slot in which the last OFDM symbol of a PDSCH scheduled by the DCI format is included to another slot in which the first OFDM symbol of a PUCCH triggered by the DCI format 1_0 is mapped. The PUCCH resource indicator field may be used to indicate a PUCCH resource.

The DCI format 1_0 may not include the carrier indicator field. If a downlink DCI format does not include the carrier indicator field, the terminal device 101 may determine that a downlink component carrier on which a PDSCH scheduled by the downlink DCI format is mapped is the downlink component carrier on which the PDCCH with the DCI format 1_0 is mapped. The DCI format 1_0 may not include the BWP field.

The DCI format 1_1 may be used for scheduling of a PDSCH for a cell. The DCI format 1_1 includes a part or all of Information fields 4A to 4H. Information field 4A is a DCI format identification field. Information field 4B is a FDRA field. The 4C is a TDRA field. Information field 4D is an MCS field. Information field 4E is a PDSCH-to-HARQ-feedback indicator field. Information field 4F is a PUCCH resource indicator field. Information field 4G is a BWP field. Information field 4H is a carrier indicator field. The DCI format identification field in the DCI format 11 may indicate that the DCI format 1_1 is a downlink DCI format.

A PDSCH may be used to transmit a transport block. A PDSCH may be sent to deliver (transmit, convey) a transport block. The base station device 103 may transmit a PDSCH. The terminal device 101 may receive the PDSCH.

A physical downlink signal corresponds to a set of REs. A physical downlink signal may not carry the information generated in the higher-layer. The base station 103 transmits a physical downlink signal. The terminal device 101 may receive the physical downlink signal. In the radio communication system according to one aspect of the present embodiment, at least a part or all of an SS (Synchronization signal), DL DMRS (DownLink DeModulation Reference Signal), CSI-RS (Channel State Information-Reference Signal), and DL PTRS (DownLink Phase Tracking Reference Signal) may be used.

A synchronization signal may be used to synchronize in the frequency domain and time domain for downlink. The synchronization signal is a generic name of PSS (Primary Synchronization Signal) and SSS (Secondary Synchronization Signal).

Figure 7:
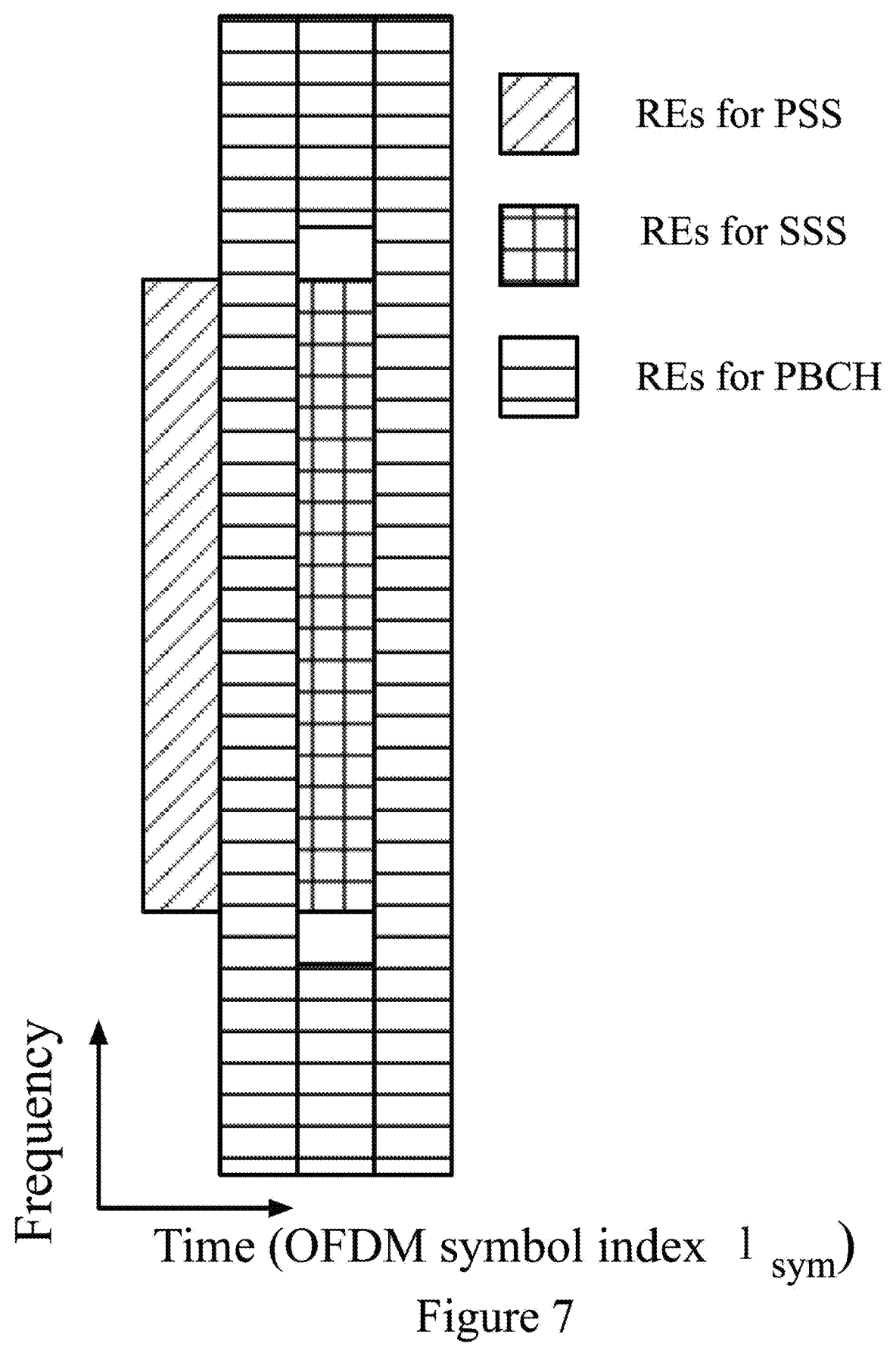

FIG. 7 is a diagram illustrating an example configuration of a synchronization signal/physical broadcast channel (SS/PBCH) block including a primary synchronization signal (PSS) and a secondary synchronization signal (SSS), according to an example implementation of the present disclosure. In FIG. 7, the horizontal axis represents the OFDM symbol index $1_{sym}$, and the vertical axis represents the frequency domain. The shaded blocks represent a set of REs for the PSS. The block of grid lines represents a set of REs for the SSS. Also, the blocks in the horizontal line represent a set of REs for the PBCH and a set of REs for a DMRS for the PBCH.

The SS/PBCH block in FIG. 7 includes a PSS, an SSS, and a PBCH. The SS/PBCH block includes 4 consecutive OFDM symbols and 240 subcarriers. The PSS is allocated to the 57th to 183rd subcarriers in the first OFDM symbol. The SSS is allocated to the 57th to 183rd subcarriers in the third OFDM symbol. The first to 56th subcarriers of the first OFDM symbol may be set to zero. The 184th to 240th subcarriers of the first OFDM symbol may be set to zero. The 49th to 56th subcarriers of the third OFDM symbol may be set to zero. The 184th to 192nd subcarriers of the third OFDM symbol may be set to zero. In the first to 240th subcarriers of the second OFDM symbol, the PBCH is allocated to subcarriers in which the DMRS for the PBCH is not allocated. In the first to 48th subcarriers of the third OFDM symbol, the PBCH is allocated to subcarriers in which the DMRS for the PBCH is not allocated. In the 193rd to 240th subcarriers of the third OFDM symbol, the PBCH is allocated to subcarriers in which the DMRS for the PBCH is not allocated. In the first to 240th subcarriers of the 4th OFDM symbol, the PBCH is allocated to subcarriers in which the DMRS for the PBCH is not allocated.

The antenna ports of the PSS, the SSS, the PBCH, and the DMRS for the PBCH in an SS/PBCH block may be identical. DL DMRS is a generic name of a DMRS for a PBCH, a DMRS for a PDSCH and a DMRS for a PDCCH.

A set of antenna ports of a DMRS for a PDSCH may be given based on a set of antenna ports for the PDSCH. For example, a set of DMRS antenna ports for a PDSCH may be the same as a set of antenna ports for the PDSCH.

A PDSCH and a DMRS for the PDSCH is collectively referred to as PDSCH. A set of antenna ports of a DMRS for a PDCCH may be given based on a set of antenna ports for the PDCCH. For example, a set of DMRS antenna ports for a PDCCH may be the same as a set of antenna ports for the PDCCH. A PDCCH and a DMRS for the PDCCH is collectively referred to as PDCCH.

A BCH (Broadcast CHannel), a UL-SCH (Uplink-Shared CHannel) and a DL-SCH (Downlink-Shared CHannel) are transport channels. A channel used in the MAC layer is called a transport channel. A unit of transport channel used in the MAC layer is also called transport block (TB) or MAC PDU (Protocol Data Unit). In the MAC layer, control of HARQ (Hybrid Automatic Repeat request) is performed for each transport block. The transport block is a unit of data delivered by the MAC layer to the physical layer. In the physical layer, transport blocks are mapped to codewords and modulation processing is performed for each codeword.

One UL-SCH and one DL-SCH may be provided for each serving cell. BCH may be given to PCell. BCH may not be given to PSCell and SCell.

A BCCH (Broadcast Control CHannel), a CCCH (Common Control CHannel), and a DCCH (Dedicated Control CHannel) are logical channels. The BCCH is a channel of the RRC layer used to deliver MIB or system information. The CCCH may be used to transmit a common RRC message in multiple terminal devices. The DCCH may be used to transmit a dedicated RRC message to a terminal device.

The BCCH in the logical channel may be mapped to the BCH or the DL-SCH in the transport channel. The CCCH in the logical channel may be mapped to the DL-SCH or the UL-SCH in the transport channel. The DCCH in the logical channel may be mapped to the DL-SCH or the UL-SCH in the transport channel.

The UL-SCH in the transport channel may be mapped to a PUSCH in the physical channel. The DL-SCH in the transport channel may be mapped to a PDSCH in the physical channel. The BCH in the transport channel may be mapped to a PBCH in the physical channel.

A higher-layer parameter is a parameter in an RRC message or a MAC CE (Control Element). A higher-layer parameter may be a cell-specific parameter or a UE-specific parameter. A cell-specific parameter is a parameter including a common configuration in a cell. A UE-specific parameter is a parameter including a configuration that may be configured differently for each UE.

The base station device 103 may indicate change of cell-specific parameters by reconfiguration with random-access. The base station device 103 may indicate change of UE-specific parameters by reconfiguration with or without random-access.

Figure 8:
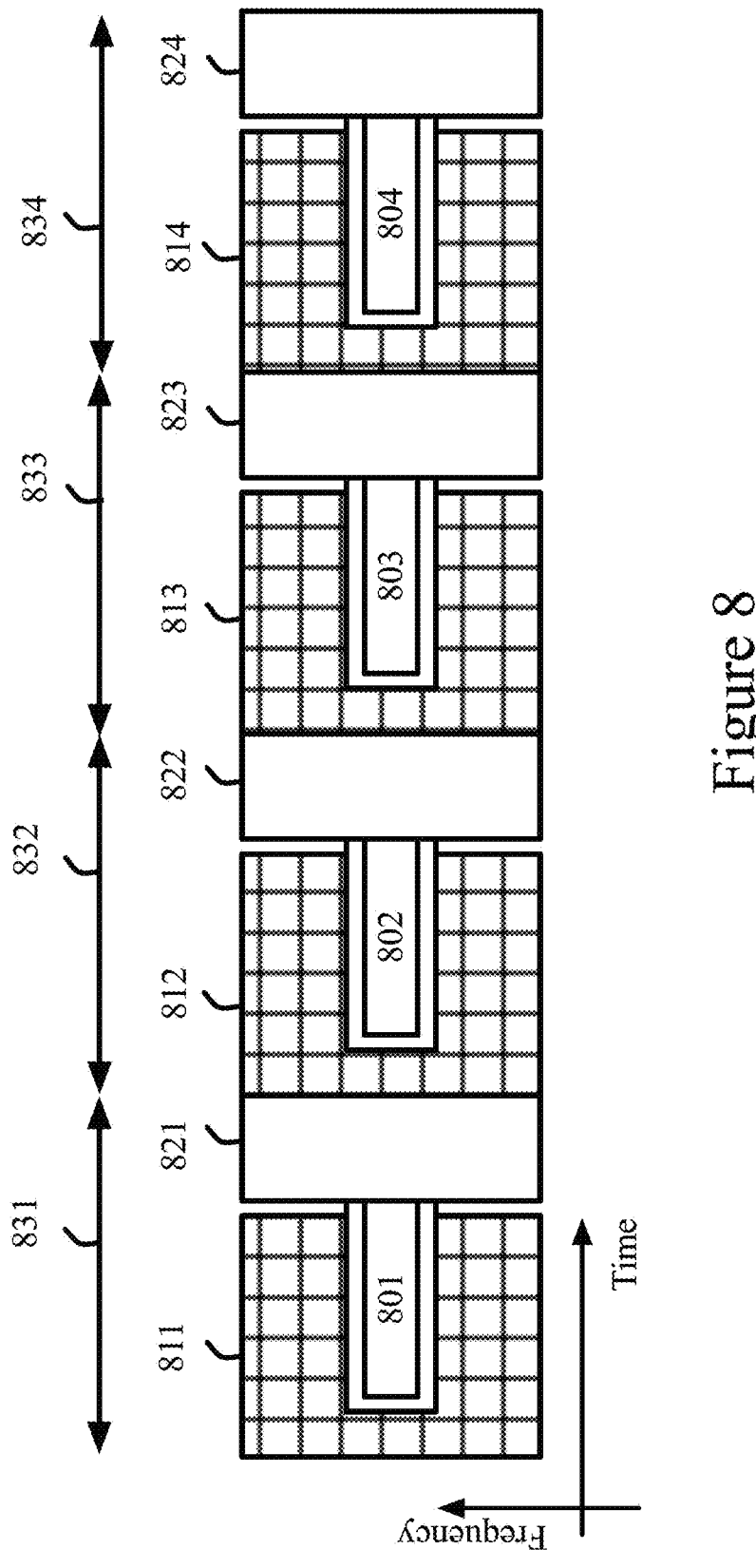
FIG. 8 is a time-frequency diagram illustrating an example resource partitioning in a serving cell, according to an example implementation of the present disclosure.

FIG. 8 is a time-frequency diagram illustrating an example resource partitioning in a serving cell, according to an example implementation of the present disclosure. The horizontal axis represents the time domain. The vertical axis represents the frequency domain. The regions 801, 802, 803, and 804 represent the time-frequency resources for a UL subband. The regions 811, 812, 813, and 814 with grid lines represent DL regions. The regions 821, 822, 823, and 824 represent UL regions. The lines 831, 832, 833, and 834 represent periods of the time division duplexing (TDD) pattern. Each region represents a resource for each SS/PBCH block with a different index. Time domain guard periods are placed on a switching location from DL to UL. Frequency domain guard bands are placed on a boundary of DL and UL.

TDD pattern is a pattern including a part of all the DL region, flexible region, and UL region. In FIG. 8, the TDD pattern includes the DL region and the UL region. The time domain guard period between the DL region and UL region may be as part of the DL region, as part of the UL region, or flexible region. The TDD pattern may be configured based on one or more RRC parameters provided by the RRC layer.

The UL subband may be configured in one or both of the DL region and the time domain guard period. The time domain resource of the UL subband may be configured by one or more RRC parameters provided by the RRC layer.

The time domain resource of the UL subband may be configured by one or more first RRC parameters used to indicate a periodicity of the UL subband, one or more second RRC parameters used to indicate the starting slot of the UL subband in each period, and one or more third RRC parameters used to indicate the length of the UL subband in each period in number of slots. For example, in a case that the periodicity is 20 slots, the starting slot is the $3^{rd}$ slot, and the length is 11 slots, the terminal device 101 determines that the UL subband with length of 11 slots starting at the $3^{rd}$ slot is placed in each periodicity.

One or more first RRC parameters used to indicate the periodicity may be one or more RRC parameters different from the one or more RRC parameters used to indicate the periodicity of the TDD pattern. For example, the one or more RRC parameters used to indicate the periodicity of the TDD pattern may be reused to indicate the periodicity of the UL subband. For example, the terminal device 101 may assume the periodicity of the UL subband is the same as the periodicity of the TDD pattern.

One or more fourth RRC parameters may be used to indicate the starting OFDM symbol of the UL subband in the starting slot. For example, one or more fifth RRC parameters may be used to indicate the length of the UL subband in number of symbols. For example, the frequency domain resource of the UL subband may be configured by one or more first RRC parameters used to indicate the starting RB of the UL subband and one or more second RRC parameters used to indicate the length of the UL subband in number of RBs.

The UL subband may be configured in an SCS-specific carrier. Therefore, in this case, the RRC parameters used to indicate resources of the UL subband may be provided per SCS-specific carrier. The UL subband may be configured in a BWP. Therefore, in this case, the RRC parameters used to indicate resources of the UL subband may be provided per BWP.

Using the UL subband, the base station device 103 may perform simultaneous transmission and reception at a time. For example, in a time occasion with UL subband 801, the base station device 103 performs transmission of physical downlink channels in the region 811 and reception of physical uplink channels in the region 801 at a time. The time occasion where the UL subband is mapped is referred to as a SubBand Full Duplex (SBFD) region.

Various physical layer configurations may be independently provided for the SBFD region and non-SBFD region. For example, the base station device 103 may use different QCL properties for the SBFD region and the non-SBFD region. The base station device 103 may use different settings for the components of the RF unit 32. For example, the components may include analog filters, amplifiers, or clocks. The terminal device 101 may obtain information related to the various physical layer configurations from the base station device 103.

Figure 9:
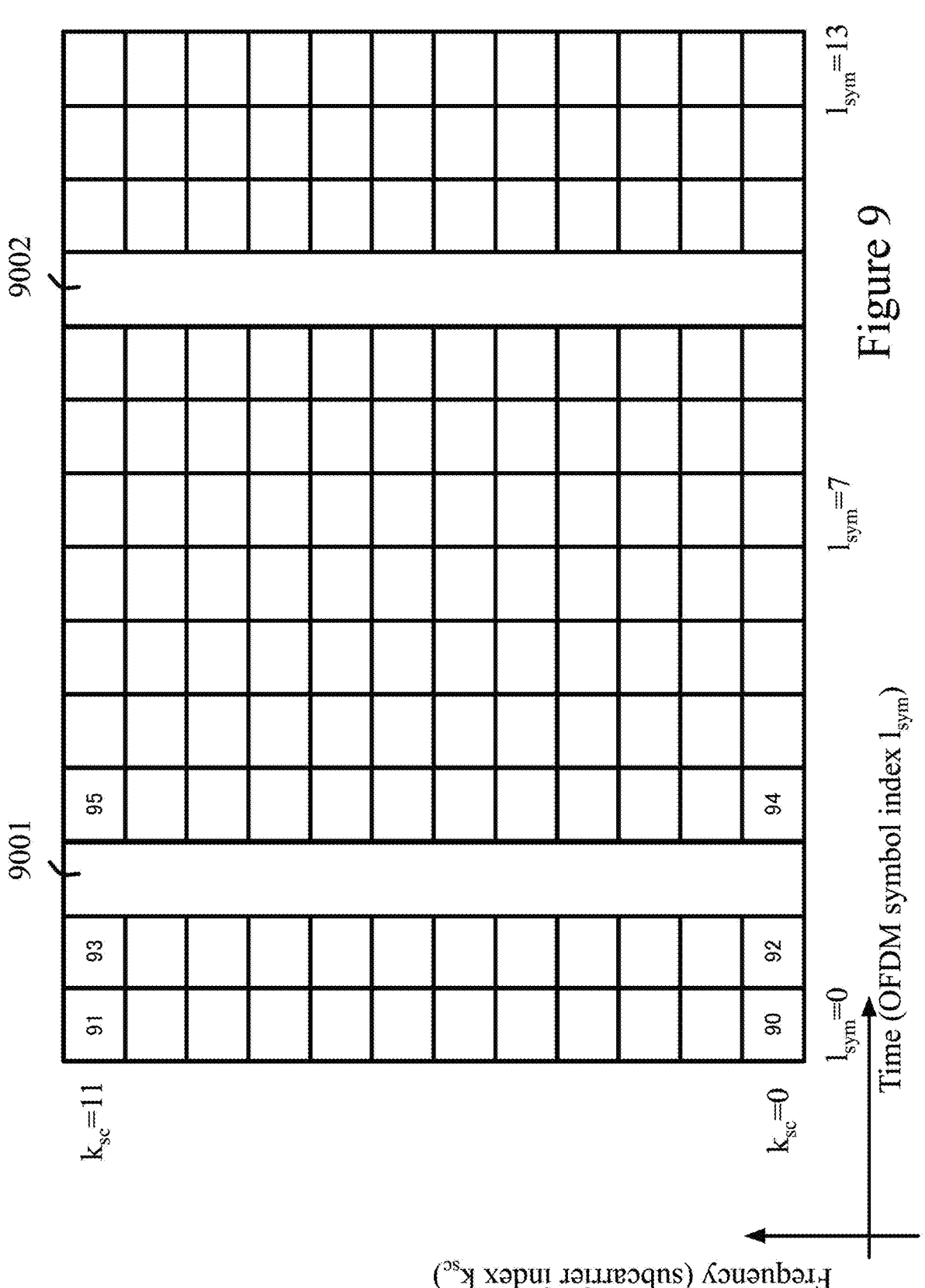
FIG. 9 is a time-frequency diagram illustrating an example PUSCH allocation in a serving cell, according to an implementation of the present disclosure.

FIG. 9 is a time-frequency diagram illustrating an example PUSCH allocation in a serving cell, according to an implementation of the present disclosure. The horizontal axis represents the OFDM symbol index, and the vertical axis represents the subcarrier index. A PUSCH may be allocated in 12 subcarriers and 14 OFDM symbols. Resource elements may be identified by the index set ($k_{sc}$, $l_{sym}$). For example, the resource element 90 has index set (0, 0), the resource element 91 has index set (11, 0), the resource element 92 has index set (0, 1), the resource element 93 has index set (11, 1), the resource element 94 has index set (0, 3), and the resource element 95 has index set (11, 3). In FIG. 9, single layer transmission is assumed for simplicity. Embodiments and modes are also applicable to multi-layer transmission.

A sequence of modulation symbols $x_1$ may be mapped to the resource elements in the PUSCH allocation. Here, each of the modulation symbols $x_1$ may be a complex valued symbol derived by modulation (e.g., Quadrature Phase Shift Keying (QPSK), 16 Quadrature Amplitude Modulation (QAM), 64 QAM, 256 QAM, 1024 QAM). In some embodiments, each of the modulation symbols $x_1$ may be a complex valued symbol derived at least from modulation and precoder.

The length L of the sequence of the modulation symbols $x_1$ may be derived by the number of resource elements excluding resource elements (e.g., 9001 and 9002) reserved for other purposes. In the example described in FIG. 9, L is equal to 12*12=144.

The sequence of the modulation symbols $x_1$ may be mapped to the resource elements allocated for the PUSCH transmission in the frequency-first manner. In some embodiments, $x_0$ may be mapped to the resource element with index set (0, 0), $x_1$ may be mapped to the resource element with index set (1, 0), and $x_2$ may be mapped to the resource element with index set (2, 0), and so on. Furthermore, $x_{11}$ may be mapped to the resource element with index set (11, 0), $x_{12}$ may be mapped to the resource element with index set (0, 1), and $x_{13}$ may be mapped to the resource element with index set (1, 1), and so on. On the other hand, the modulation symbols may not be mapped to some resource elements reserved for other purposes (e.g., resource elements 9001-9002 reserved for DMRS of the PUSCH). Therefore, $x_{23}$ may be mapped to the resource element with index set (11, 1), $x_{24}$ may be mapped to the resource element with index set (0, 3), and $x_2$s may be mapped to the resource element with index set (1, 3), and so on.

An Orthogonal Cover Code (OCC) may be applied to a PUSCH. OCC is a coding technique used to mitigate interference and improve system performance. By assigning orthogonal codes to different subchannels, OCC allows for simultaneous and interference-free transmission of multiple users' data. In a case where an OCC is applied to a PUSCH, modulation symbols may apply spreading. In a case where an OCC of $\{p_0, p_1\}$ is applied to a PUSCH, the wireless transmission and reception unit 30 (FIG. 5) may generate two different sequences of $p_0*x_1$ and $p_1*x_1$. Here, $p_0$ and $p_1$ are complex valued symbols.

In some implementations, OCC may be applied before transform precoding. If an OCC is applied to a PUSCH before transform precoding, the OCC may be seen as interleaved frequency division multiplex.

In some embodiments, the two sequences may be mapped to the resource elements allocated for the PUSCH. For example, $p_0*x_0$ may be mapped to the resource element with index set (0,0), $p_1*x_0$ may be mapped to the resource element with index set (1,0), $p_0*x_1$ may be mapped to the resource element with index set (2,0), and $p_1*x_1$ may be mapped to the resource element with index set (3,0), and so on. In this example, $p_0*x_1$ and $p_1*x_1$ are mapped next to each other in the frequency domain. This kind of mapping is referred to as frequency domain OCC.

In some embodiments, $p_0*x_0$ may be mapped to the resource element with index set (0,0), $p_1*x_0$ may be mapped to the resource element with index set (0,1), $p_0*x_1$ may be mapped to the resource element with index set (1,0), and $p_1*x_1$ may be mapped to the resource element with index set (1,1), and so on. In this example, $p_0*x_1$ and $p_1*x_1$ are mapped next to each other in the time domain. This kind of mapping is referred to as time domain OCC.

The length of OCC is referred to as spreading factor. The spreading factor of the OCC of $\{p_0, p_1\}$ is 2.

In a case where OCC with spreading factor P is applied to the PUSCH, the length of the sequence of the modulation symbols $x_1$ may be represented by the number of resource elements allocated for the PUSCH excluding resource elements reserved for other purposes (e.g., resource elements 9001-9002), divided by the spreading factor. For example, in a case where the spreading factor is 2 and the PUSCH allocation as in FIG. 9, the length of the sequence is 144/2=72.

In a case where the length of the sequence of the modulation symbols $x_1$ is divided by the spreading factor, rate-matching output sequence length may be also divided by the spreading factor where the rate-matching output sequence length is derived by the length of the sequence of the modulation symbols $x_1$ multiplied by the modulation order of the modulation type.

Figure 10:
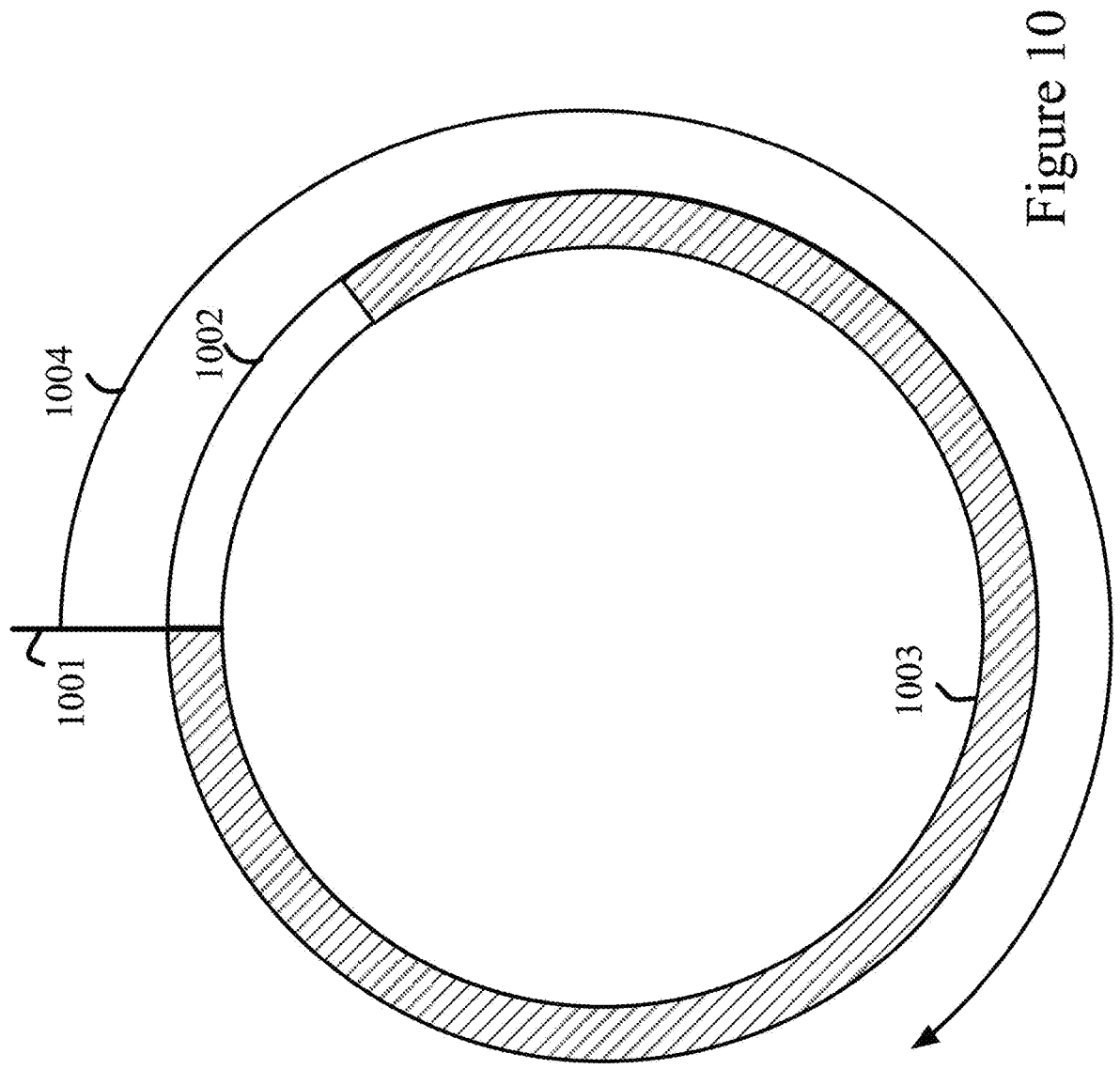
FIG. 10 is a diagram illustrating an example of a circular buffer for rate-matching operation, according to an implementation of the present disclosure.

FIG. 10 is a diagram illustrating an example of a circular buffer for rate-matching operation, according to an implementation of the present disclosure. The circular buffer shows concept of the rate-matching operation. In the circular buffer, coded bits (e.g., bits encoded by an error correcting code) may be mapped in clockwise order. Here, 1001 represents the starting position of the coded bit mapping. The section 1002 represents the part of the circular buffer used to store systematic bits of the coded bits. The section 1003 represents the part of the circular buffer used to store parity bits of the coded bits. The region 1004 represents the region where the coded bits in the circular buffer are written into the output sequence of the rate-matching operation. The length of the output sequence may be used to determine the rate-matching output sequence length.

The size of the circular buffer and the rate-matching output sequence length may determine how many parity bits are written into the output sequence of the rate-matching operation. If the size of the circular buffer is unchanged and the rate-matching output sequence is shortened, the number of parity bits written into the output sequence may be reduced. The reduction of the parity bits may cause degraded decoding performance. Furthermore, If the output sequence does not include any parity bits, the receiver cannot decode the data.

The size of the circular buffer may be determined at least based on the TBS of UL-SCH associated with the PUSCH. Therefore, the TBS calculation may be different in a PUSCH with OCC from the TBS calculation in a PUSCH without OCC.

Figure 11:
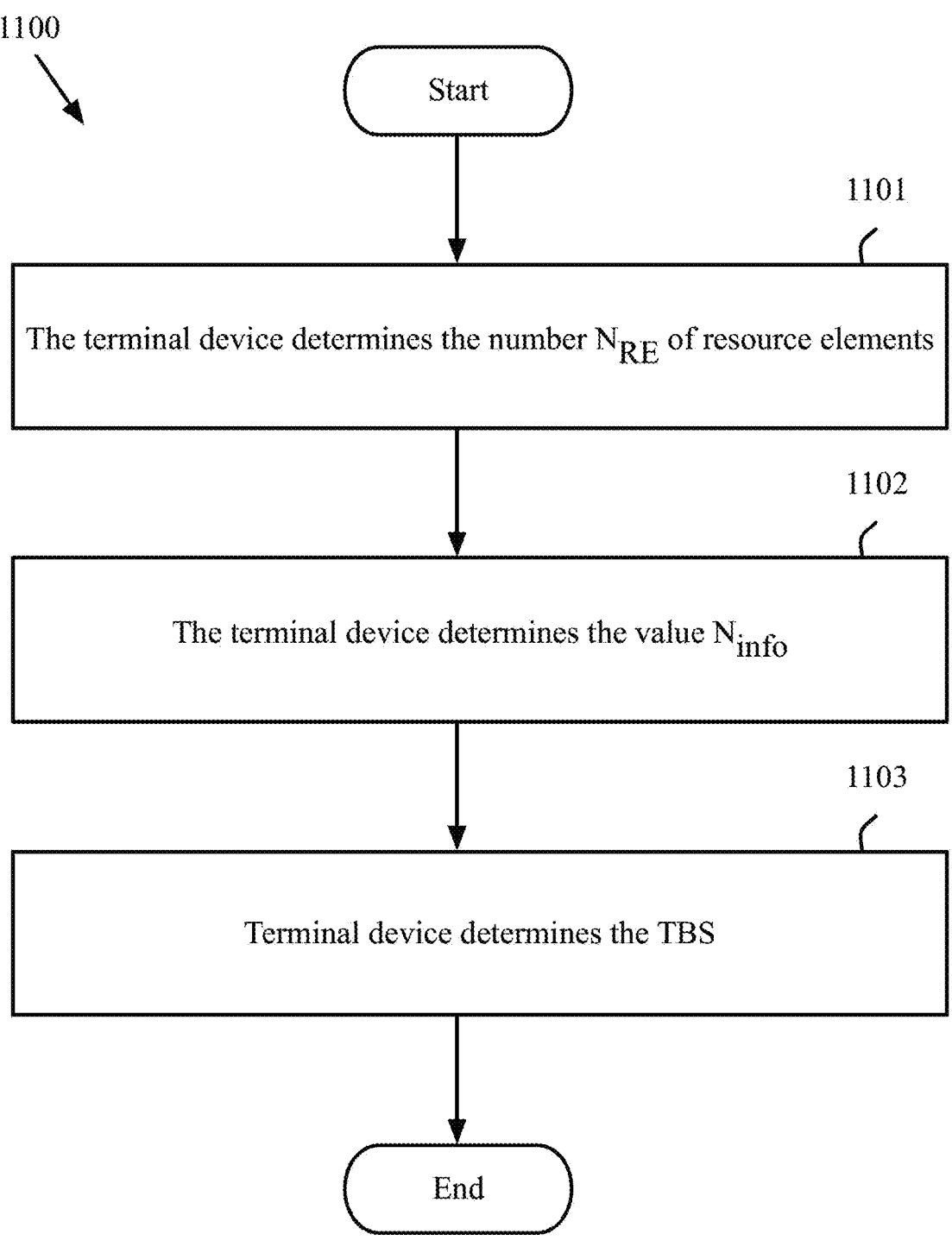
FIG. 11 is a flowchart illustrating an example method/process performed by a terminal device to determine the transport block size, according to an example implementation of the present disclosure.

FIG. 11 is a flowchart illustrating an example method/process 1100 performed by a terminal device to determine the TBS, according to an example implementation of the present disclosure. At block 1101, the terminal device may determine the number $N_{RE}$ of resource elements. In some embodiments, block 1101 may be a procedure to determine the number $N_{RE}$ of resource elements in one slot in one RB. For example, $N_{RE} = \min (X_{TH}, N^{RB}_{sc} * N^{sh}_{symb} - N^{PRB}_{DMRS} - N^{PRB}_{oh}) * n_{PRB}$ may be used to calculate $N_{RE}$. Here, $X_{th}$ is a configured or predefined threshold. $N^{sh}_{symb}$ is the number of OFDM symbols allocated for a PUSCH in one slot. $N^{PRB}_{DMRS}$ is an overhead value in consideration of the resource elements to which the DMRS for the PUSCH is mapped. In some embodiments, DMRS for a PUSCH potentially allocated for other UEs may be also considered to determine $N^{PRB}_{DMRS}$. $N^{PRB}_{DMRS}$ may be the number of resource elements per PRB, to which the DMRS is mapped in the OFDM symbols allocated for the PUSCH. $N^{PRB}_{oh}$ is a value in consideration of overhead due to elements other than the DMRS for the PUSCH. The elements may at least include overhead due to mapping of the control resource set or the CSI-RS. $N^{PRB}_{oh}$ may be provided via an RRC parameter. Also, $n_{PRB}$ may be a number of resource blocks allocated for the PUSCH.

At block 1102, the terminal device 101 may determine the value $N_{info}$. In some embodiments, $N_{info}$ may be determined at least based on one or more of $N_{RE}$, R, $Q_m$, and V. R represents a code rate for the PUSCH. In some embodiments, R may represent a target code rate for the PUSCH. $Q_m$ represents the modulation order for the PUSCH. V represents the number of layers for the PUSCH. In some embodiments, $N_{info}=N_{RE}*R*Q_m*V$ may be used to determine $N_{info}$.

At block 1103, the terminal device may determine the TBS at least based on $N_{info}$. In some embodiments, the TBS may be determined by searching a look-up-table using $N_{info}$ to identify an entry of the look-up-table. In some embodiments, the terminal device 101 may select the TBS from the look-up-table based on the nearest value to the $N_{info}$. In some embodiments, the terminal device 101 may select the TBS from the look-up-table based on the nearest value to the $N_{info}$ among the values which do not exceed $N_{info}$ in the look-up-table. In some embodiments, the terminal device 101 may select the TBS from the look-up-table based on the nearest value to the $N_{info}$ among the values which are smaller than $N_{info}$ in the look-up-table. In some embodiments, the terminal device 101 may select the TBS from the look-up-table based on the nearest value to the $N_{info}$ among the values not falling below $N_{info}$.

In some embodiments, the terminal device 101 may determine the TBS by searching the look-up-table and using $N^a_{info}$ as the index into the look-up table. $N^a_{info}$ may be determined at least based on $N_{info}$. For example, $N^a_{info}=\max(3840, 2^n*round((N_{info}-24)/2^{\rightarrow}n))$ may be used to determine $N^a_{info}$. The value of n may be determined by floor(log $2(N_{info}-24))-5$.

In some embodiments, the TBS may be determined based on the number of code blocks C. For example, $8*C*\text{ceil}((N^a_{info}+24)/(8*C))-24$ may be used to determine the TBS. C may be determined by $\text{ceil}((N^a_{info}+24)/3816)$.

FIG. 12 is a flowchart illustrating an example method/process 1200 performed by a terminal device to perform rate matching, according to an example implementation of the present disclosure. The terminal device 101 may append (at block 1201) the CRC bits with length $L_{CRC}$ to the transport block with the length $A_{TBS}$. The resulting sequence may be denoted as $b_k$ ($k=0\sim A_{TBS}+L_{CRC}-1$).

The terminal device 101 may divide (at block 1202) the sequence $b_k$ into multiple code blocks based on a condition. In some embodiments, the condition may be identified by comparing $A_{TBS}+L_{CRC}$ and a value $C_{max}$. $C_{max}$ is also referred to as the maximum code block size. In some embodiments, the condition may be whether $A_{TBS}+L_{CRC}$ is larger than $C_{max}$ or not. In some embodiments, the condition may be whether $A_{TBS}+L_{CRC}$ is smaller than $C_{max}$ or not.

In a case where the terminal device 101 divides the sequence $b_k$, additional CRC bits with length $L_{CRC2}$ may be appended (at block 1202) to each code block. The resulting sequence is denoted as $c_{r,m}$. The index r denotes the index of code blocks. The index m denotes the order of the $r^{th}$ code block.

In a case where the terminal device 101 does not divide the sequence $b_k$ into multiple code blocks, the sequence $b_k$ may be regarded as the single code block. The length of the single code block may be $A_{TBS}+L_{CRC}$.

In a case where the terminal device 101 divides the sequence $b_k$ into multiple code blocks, the length of each code block may be $(A_{TBS}+L_{CRC})/C+L_{CRC2}$.

The terminal device 101 may append (at block 1203) filler bits with length $L_{fil}$ to each of the one or more code blocks. The length of the code block with the filler bits is $A_{TBS}+$ $L_{CRC}+L_{fil}$ in a case where the sequence $b_k$ is not divided into multiple code blocks. The length of the code block with the filler bits is $(A_{TBS}+L_{CRC})/C+L_{CRC2}+L_{fil}$ in a case where the sequence $b_k$ is divided into multiple code blocks. The length of each code block after appending the filler bits may be denoted as $L_c$.

The terminal device 101 may encode (at block 1204) each code block. The encoded bits of the code block r may be denoted as $d_{r,n}$. The index n denotes the order of the encoded bits. In a case where the mother code rate of the encoder is $R_{mother}$, the length of the encoded bits of the code block r is $L_c/R_{mother}$.

The terminal device 101 may perform (at block 1205) rate-matching. In the rate-matching, code block r is mapped to the circular buffer starting at the position identified by RV0. After mapping the code block r to the circular buffer, the terminal device 101 may read the circular buffer from a specified position (e.g., RV0) until the number of bits are read. The number of bits read from the circular buffer is the rate-matching output sequence length.

In some embodiments, the rate-matching output sequence length may be determined at least based on the number of resource elements available for mapping the sequence of modulation symbols $x_1$. In some embodiments, the rate-matching output sequence length may be determined at least based on the number of resource elements available for mapping the sequence of the modulation symbols $x_1$ divided by the number of code blocks.

Therefore, the TBS may affect the size of the circular buffer. To control the size of the circular buffer, the TBS determination method may be updated.

In some embodiments, the terminal device 101 may determine the TBS for the PUSCH at least based on a scaling factor S for the PUSCH. In some embodiments, in a case where an OCC with a spreading factor P is applied for a PUSCH, the terminal device 101 may determine that the TBS is at least based on the scaling factor S for the PUSCH. In some embodiments, in a case where an OCC with the spreading factor P is not applied for a PUSCH, the terminal device 101 may determine that the TBS without using the scaling factor S.

In some embodiments, the scaling factor S may be provided via an RRC parameter. In some embodiments, the scaling factor S may be determined at least based on the spreading factor P. In some embodiments, the scaling factor S may be determined based on the spreading factor P.

Figure 13:
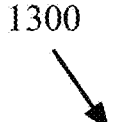
FIG. 13 is a table illustrating an example of association between the scaling factors S and the spreading factors P, according to an implementation of the present disclosure.

FIG. 13 is a table 1300 illustrating an example of association between the scaling factors S and the spreading factors P, according to an implementation of the present disclosure. As shown in FIG. 13, the spreading factor 2 is associated with scaling factor 2, the spreading factor 4 is associated with the scaling factor 3, and the spreading factor 6 is associated with the scaling factor 4.5. Therefore, in some embodiments, the terminal device 101 may determine the scaling factor S associated with the spreading factor P applied for the PUSCH.

In some embodiments, the scaling factor S is the spreading factor P. In some embodiments to determine TBS, the terminal device 101 may determine the TBS using the scaling factor S.

Figure 14:
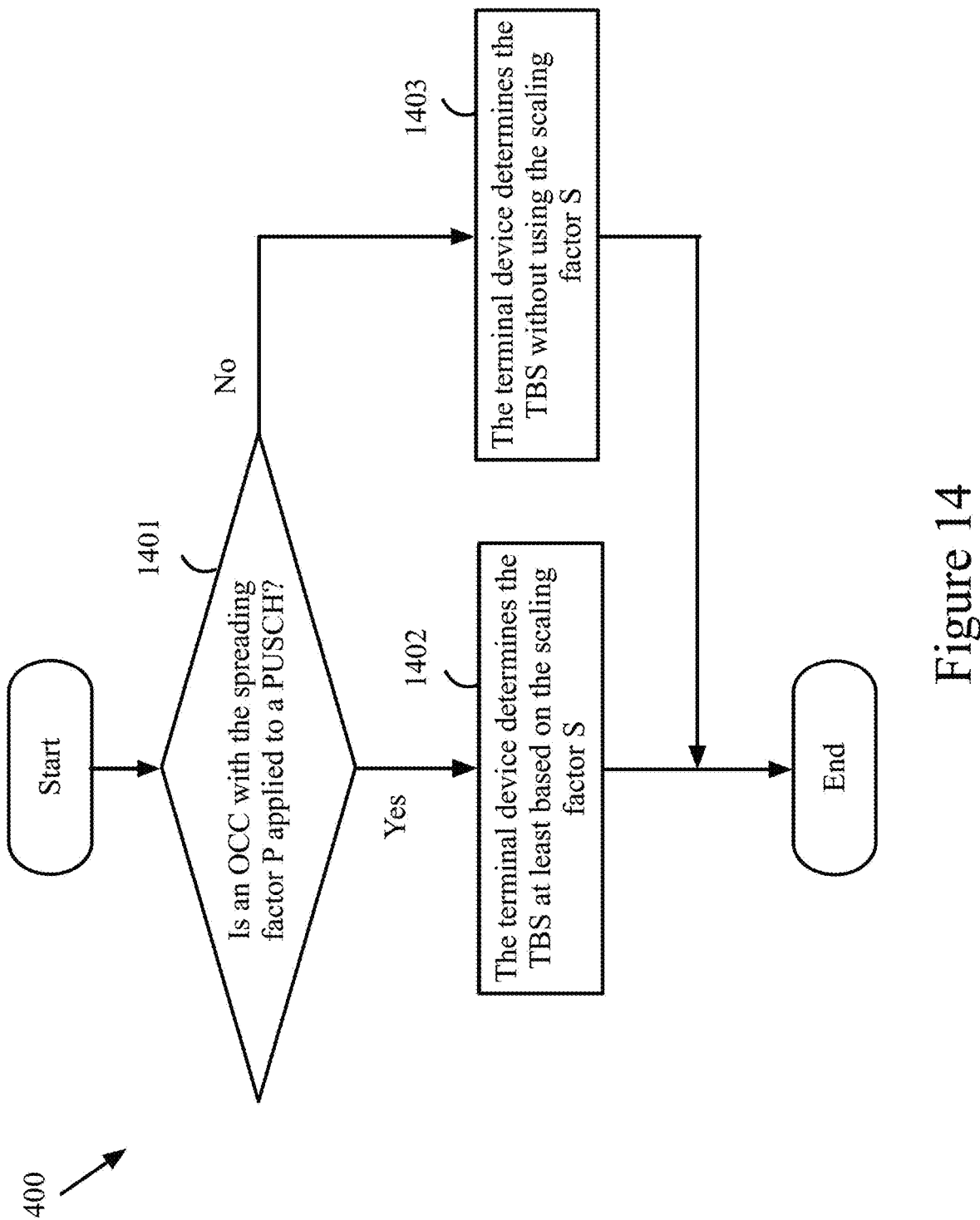
FIG. 14 is a flowchart illustrating an example method/process performed by a terminal device to determine the transport block size, according to an example implementation of the present disclosure.

FIG. 14 is a flowchart 1400 illustrating an example method/process performed by a terminal device to determine the TBS, according to an example implementation of the present disclosure. The terminal device 101 may determine (at block 1401) whether an OCC with the spreading factor P is applied to a PUSCH. If the terminal device 101 determines (at block 1401) that an OCC with the spreading factor P is applied to the PUSCH, the terminal device 101 may determines (at block 1402) the TBS at least based on the scaling factor S. Further details of block 1402 are described below with reference to FIG. 15. If the terminal device 101 determines (at block 1401) that an OCC with the spreading factor P is not applied to the PUSCH, in the terminal device 101 may determine (at block 1403) the TBS without using the scaling factor S.

Figure 15:
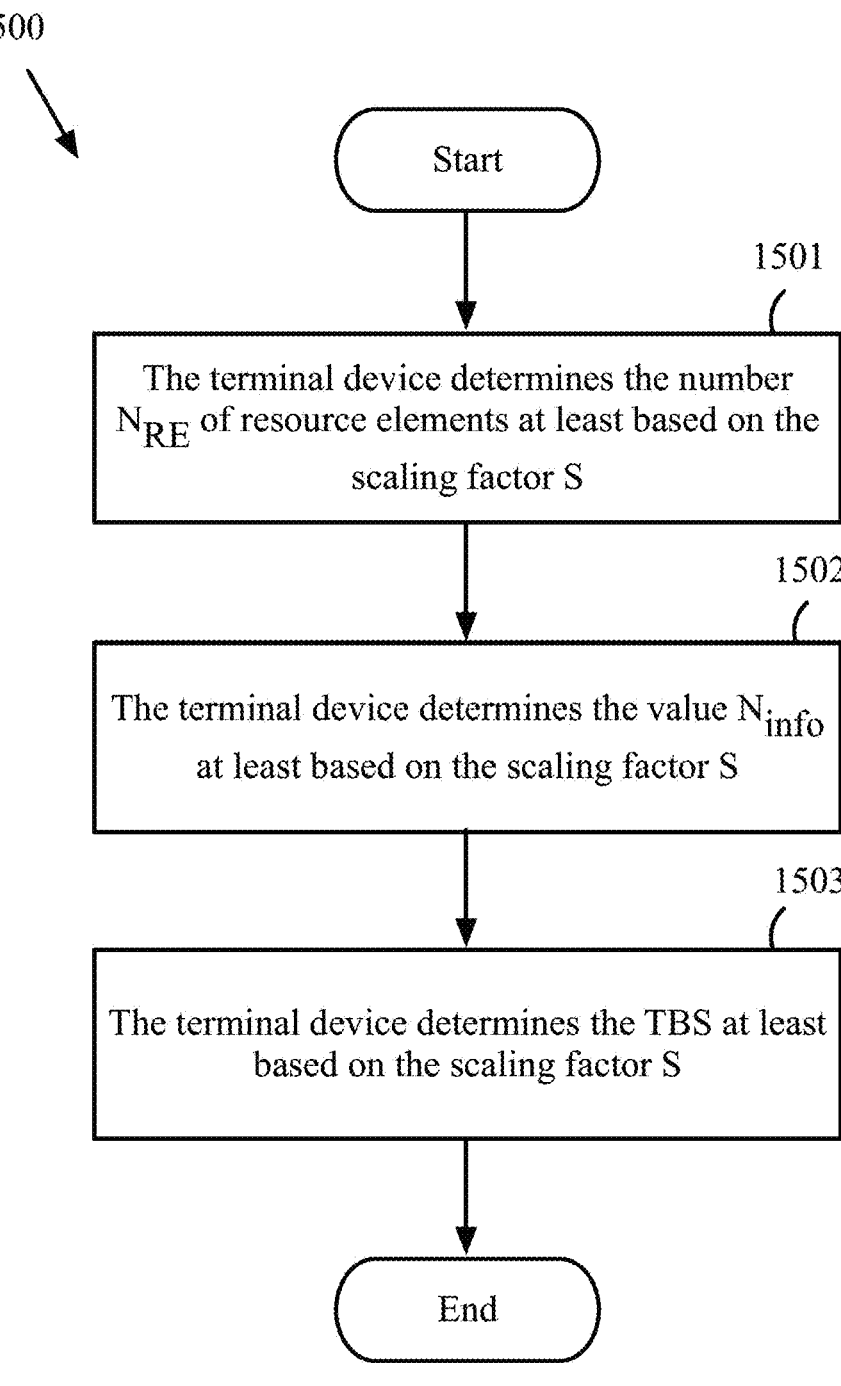
FIG. 15 illustrates a flowchart illustrating an example method/process performed by a terminal device to determine the transport block size, at least partially, based on the scaling factor, according to an example implementation of the present disclosure.

FIG. 15 illustrates a flowchart illustrating an example method/process 1500 performed by a terminal device to determine the TBS, at least partially, based on the scaling factor, according to an example implementation of the present disclosure. The process 1500 provides further details of block 1402 of FIG. 14 where the terminal device 101 determines the TBS at least based on the scaling factor S.

The terminal device 101 may determine (at block 1501) the number $N_{RE}$ of resource elements at least based on the scaling factor S. In some embodiments, min $(X_{TH}, (N^{RB}_{sc}*N^{sh}_{symb}-N^{PRB}_{DMRS}-N^{PRB}_{oh})/S)*n_{PRB}$ may be used to determine the number $N_{RE}$. In some embodiments, min $(X_{TH}, N^{RB}_{sc}*N^{sh}_{symb}/S-N^{PRB}_{DMRS}-N^{PRB}_{oh})*n_{PRB}$ may be used to determine the number $N_{RE}$.

The terminal device 101 may determine (at block 1502) the value $N_{info}$ at least based on the scaling factor S. For example, $N_{RE}*R*Q_m*V/S$ may be used to determine the value $N_{info}$.

The terminal device 101 may determine (at block 1503) the TBS based on the scaling factor S. For example, the terminal device may determine the final TBS based on the TBS determined as described above with reference to block 1103 of FIG. 11 divided by S.

Figure 16:
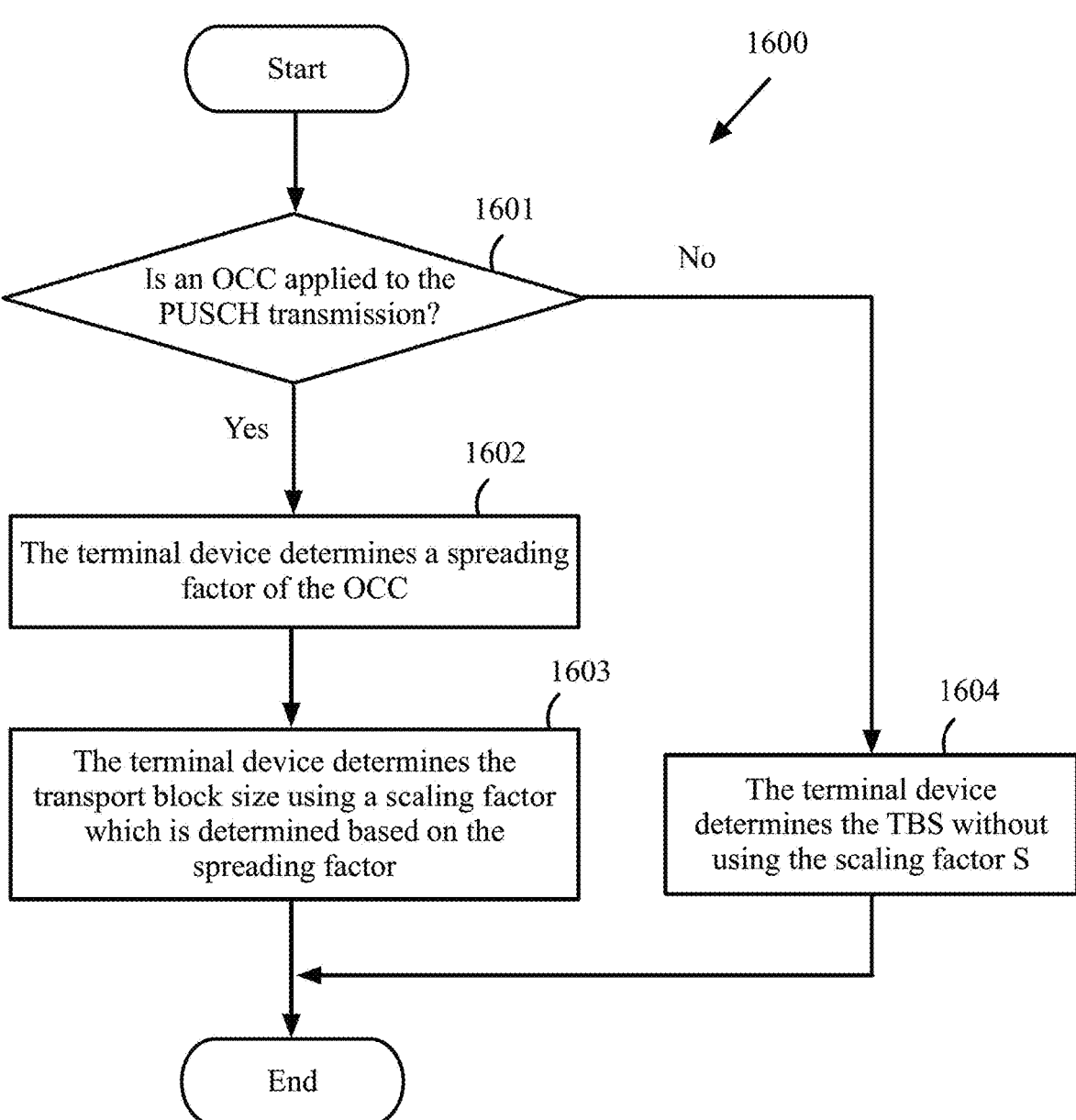
FIG. 16 is a flowchart illustrating an example method/ process performed by a transmitting wireless terminal implementing the process of FIGS. 14-15, according to an example implementation of the present disclosure.

FIG. 16 is a flowchart illustrating an example method/process 1600 performed by a transmitting wireless terminal implementing the process of FIGS. 14-15, according to an example implementation of the present disclosure. As shown, the terminal device may make (at block 1601) a determination as to whether an OCC is applied to the PUSH transmission. For example, the terminal device, in some embodiments, may receive an indication from a base station that the OCC is to be applied and may determine that the OCC is applied after receiving the indication.

If the OCC is applied to the PUSH transmission, the terminal device may determine (at block 1602) a spreading factor of the OCC. In some embodiments, the spreading factor of the OCC may be the length of the OCC. For example, when the OCC of $\{p_0, \ldots, p_{n-1}\}$ is applied, the length of the OCC is n, where n may be 2, 3, 4, 6, or 12.

The terminal device may determine (at block 1603) the TBS using a scaling factor which may be determined based on the spreading factor. In some embodiments, the terminal device may determine the scaling factor based on the spreading factor by performing a table lookup. For example, the terminal device may perform a table-look-up into the table 1300 of FIG. 13 to find the scaling factor. In some embodiments, the scaling factor may be equal to the spreading factor. The scaling factor, in some embodiments, may be updates based on an RRC message received from a BS.

In some embodiments, the terminal device may determine (at block 1603) the TBS based on the number of REs allocated for the PUSCH transmission, the code rate for the PUSCH transmission, the modulation order for the PUSCH transmission, and the number of layers for the PUSCH transmission. The transport block size may be inversely proportional to the scaling factor. As described above with reference to block 1103 of FIG. 11, $N_{info}$ may be calculated as $N_{RE}*R*Q_m*V$, where $N_{RE}$ is the number of REs, R is code rate for the PUSCH transmission, $Q_m$ is the modulation order for the PUSCH transmission, and V is the number of layers for the PUSCH transmission. $N_{info}$ may then be divided by the scaling factor S, and the results may be used to determine TBS, for example by performing a table look up.

In some embodiments, the terminal device may determine (at block 1603) the TBS based on the number of code blocks C. For example, as described above with reference to block 1103 of FIG. 11, the TBS may be calculated as $8*C*ceil((N^a_{info}+24)/(8*C))-24)/S$ or $8*C*ceil((N^a_{info}/S+24)/(8*C))-24)$, where C may be determined by $ceil((N^a_{info}+24)/3816)$, and $N^a_{info}$ was described with reference to block 1103 of FIG. 3. In some embodiments, the terminal device may determine (at block 1603) the TBS based on a number of OFDM symbols allocated for a PUSCH transmission in one slot. For example, as described above, the TBS may be determined based on the $N_{RE}$, and the $N_{RE}$ may be determined based on the number of OFDM symbols allocated for a PUSCH transmission in one slot.

In a case that an OCC is not applied to the PUSH transmission, the terminal device may determine (at block 1604) the TBS without using the scaling factor S. The process 1600 may then end.

Figure 17:
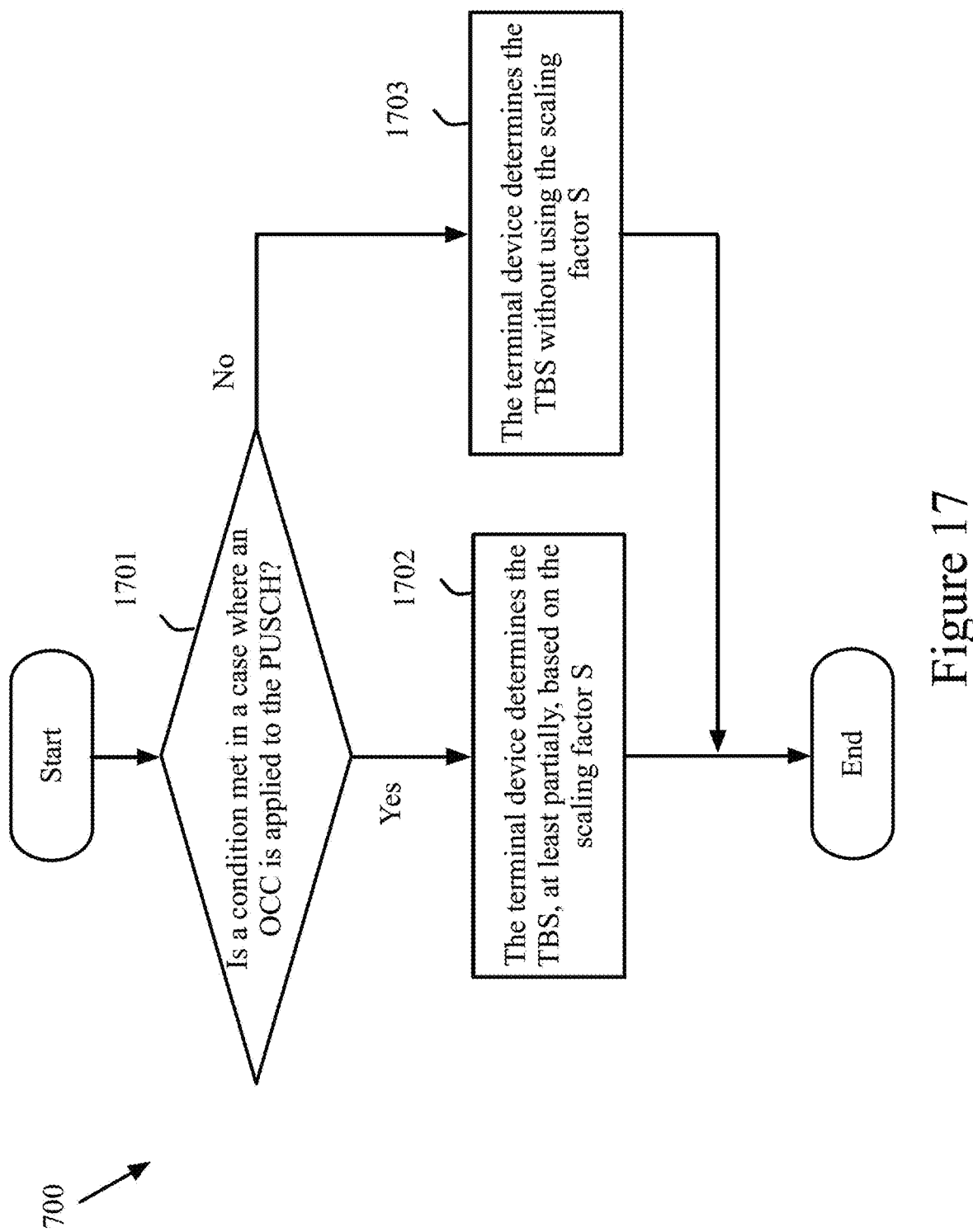
FIG. 17 is a flowchart illustrating an example method/ process performed by a terminal device to determine the transport block size, according to an example implementation of the present embodiment.

In some embodiments, the applicability of the scaling factor S may be controlled by a condition. FIG. 17 is a flowchart illustrating an example method/process 1700 performed by a terminal device to determine the TBS, according to an example implementation of the present embodiment. The terminal device 101 may determine (at block 1701) whether a condition is met in a case where an OCC is applied to the PUSCH. If the terminal device 101 determines that the condition was met, the terminal device 101 may determine (at block 1702) the TBS, at least partially, based on the scaling factor S. If the terminal device 101 determines that the condition was not met, in the terminal device 101 may determine (at block 1703) the TBS without using the scaling factor S.

In some embodiments, the condition may be provided via an RRC parameter. In some embodiments, the condition may be provided via a DCI format used for scheduling of the PUSCH.

In some embodiments, the condition may depend on the MCS that is allocated for the PUSCH. For example, in a case where a MCS in a specific set of MCS indices is allocated for the PUSCH, the terminal device 101 may perform the step 1702. For example, in a case where a MCS allocated for the PUSCH is not in the specific set of MCS indices, the terminal device 101 may perform the step 1703. The specific set of MCS indices may be provided via an RRC parameter.

In some embodiments, the condition may be the target code rate indicated via the MCS allocated for the PUSCH. For example, in a case where the target code rate is above a threshold, the terminal device 101 may perform the step 1702. In a case where the target code rate is not above the threshold, the terminal device 101 may perform the step 1703. The threshold may be provided via an RRC parameter.

Figure 18:
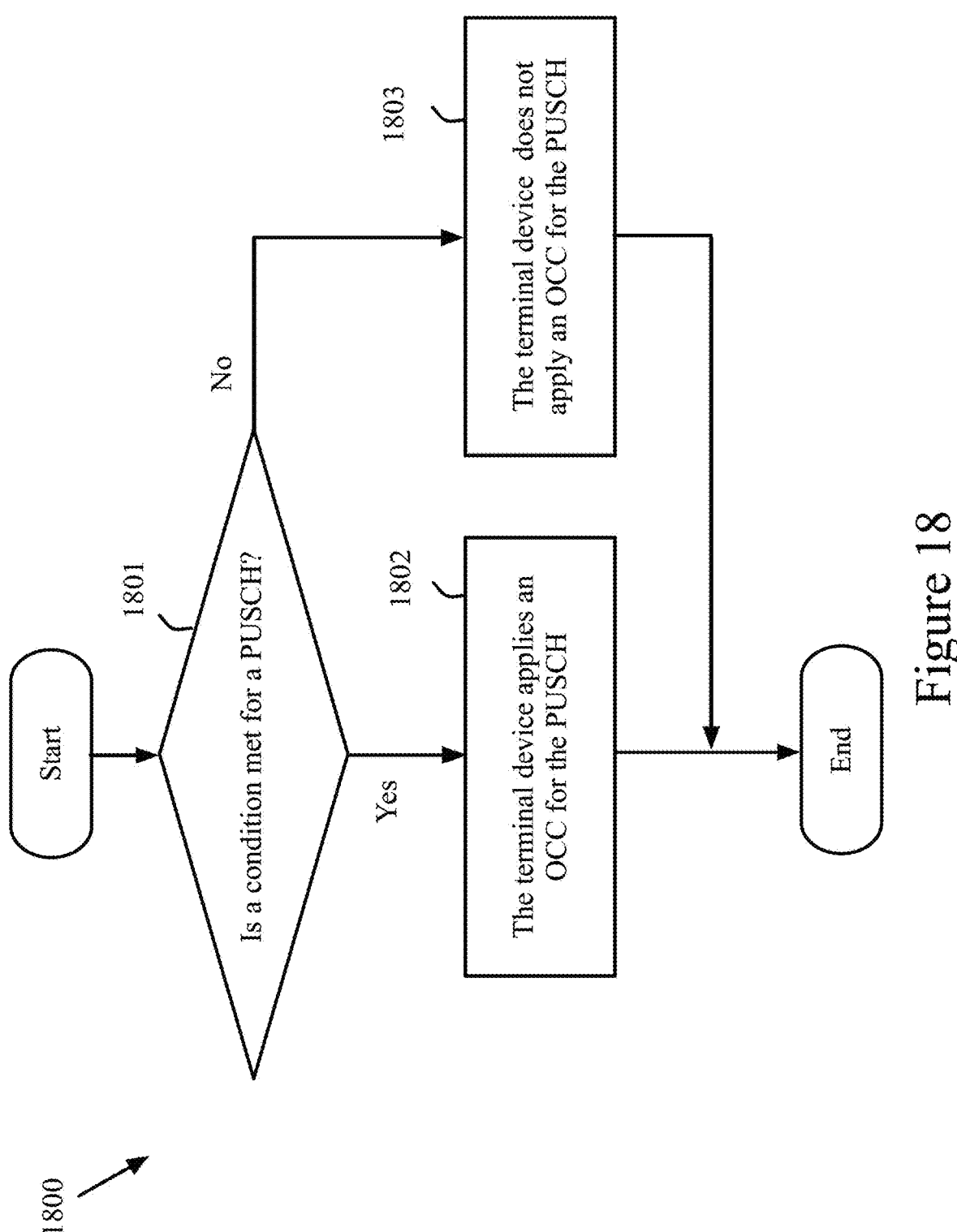
FIG. 18 is a flowchart illustrating an example method/ process performed by a terminal device to determine the TBS, according to an example implementation of the present embodiment.

In some embodiments, applicability of an OCC with a spreading factor may be controlled by a condition. FIG. 18 is a flowchart illustrating an example method/process 1800 performed by a terminal device to determine the TBS, according to an example implementation of the present embodiment. The terminal device 101 may determine (at block 1801) whether a condition is met. If the terminal device 101 determines that the condition is met, the terminal device 101 may apply (at block 1802) an OCC for the PUSCH. If the terminal device 101 determines that the condition is not met, the terminal device 101 may not apply (at block 1803) an OCC for the PUSCH.

In some embodiments, the condition may be provided via an RRC parameter. In some embodiments, the condition may be provided via a DCI format used for scheduling of the PUSCH.

In some embodiments, the condition may depend on the MCS that is allocated for the PUSCH. For example, in a case where a MCS in a specific set of MCS indices is allocated for the PUSCH, the terminal device 101 may perform block 1802. For example, in a case where a MCS allocated for the PUSCH is not in the specific set of MCS indices, the terminal device 101 may perform block 1803. The specific set of MCS indices may be provided via an RRC parameter.

In some embodiments, the MCS may be used to determine the spreading factor for the OCC. In some embodiments, multiple sets of MCS indices may be provided. In a case where a MCS allocated for the PUSCH is in the first set of MCS indices, the terminal device 101 may perform block 1802 with a first spreading factor (e.g., 2). In a case where a MCS allocated for the PUSCH is in the second set of MCS indices, the terminal device 101 may perform block 1802 with a second spreading factor (e.g., 4). In a case where a MCS allocated for the PUSCH is in the third set of MCS indices, the terminal device 101 may perform block 1803. Each set of MCS indices may be provided by an RRC parameter.

In some embodiments, the condition may be the target code rate indicated via the MCS allocated for the PUSCH. For example, in a case where the target code rate is above a threshold, the terminal device 101 may perform block 1802, In a case where the target code rate is not above the threshold, the terminal device 101 may perform block 1803. The threshold may be provided via an RRC parameter.

In some embodiments, the target code rate may be used to determine the spreading factor for the OCC. In some embodiments, multiple sets of range of target code rate may be provided. In a case where a target code for the PUSCH is in the first set of range of target code rate, the terminal device 101 may perform block 1802 with a first spreading factor (e.g., 2). In a case where a target code for the PUSCH is in the second set of range of target code rate, the terminal device 101 may perform block 1802 with a second spreading factor (e.g., 4). In a case where a target code for the PUSCH is in the third set of range of target code rate, the terminal device 101 may perform block 1803. Each set of range of target code rate may be provided by an RRC parameter.

In some embodiments, the condition may be the time domain resource allocation (TDRA) for the PUSCH. For example, in a case where the TDRA is a first TDRA (e.g., 14 OFDM symbol allocation), the terminal device 101 may perform block 1802. For example, in a case where the TDRA is a second TDRA (e.g., 2 OFDM symbol allocation), the terminal device 101 may perform block 1803.

In some embodiments, each row of the TDRA table may be configured with an indication indicating whether an OCC is applied to the PUSCH or not. The indication may be provided via an RRC parameter.

In some embodiments, each row of the TDRA table may be configured with an indication indicating a spreading factor for the PUSCH. In some embodiments, in a case where a spreading factor is provided in the row associated with the TDRA for the PUSCH, the terminal device 101 may perform block 1802 with the provided spreading factor. In some embodiments, in a case where a spreading factor is not provided in the row associated with the TDRA for the PUSCH, the terminal device 101 may perform the step 1803. The spreading factor in each row may be provided via an RRC parameter.

In some embodiments, each row of the TDRA table may be configured with an indication indicating an OCC for the PUSCH. In some embodiments, in a case where an OCC (e.g., [+1, −1]) is provided in the row associated with the TDRA for the PUSCH, the terminal device 101 may perform block 1802 with the provided OCC. In some embodiments, in a case where an OCC (e.g., [+1, −1, +1, −1]) is provided in the row associated with the TDRA for the PUSCH, the terminal device 101 may perform the block 1803 with the provided OCC. In some embodiments, in a case where an OCC is not provided in the row associated with the TDRA for the PUSCH, the terminal device 101 may perform the block 1803. The OCC in each row may be provided via an RRC parameter.

Figure 19:
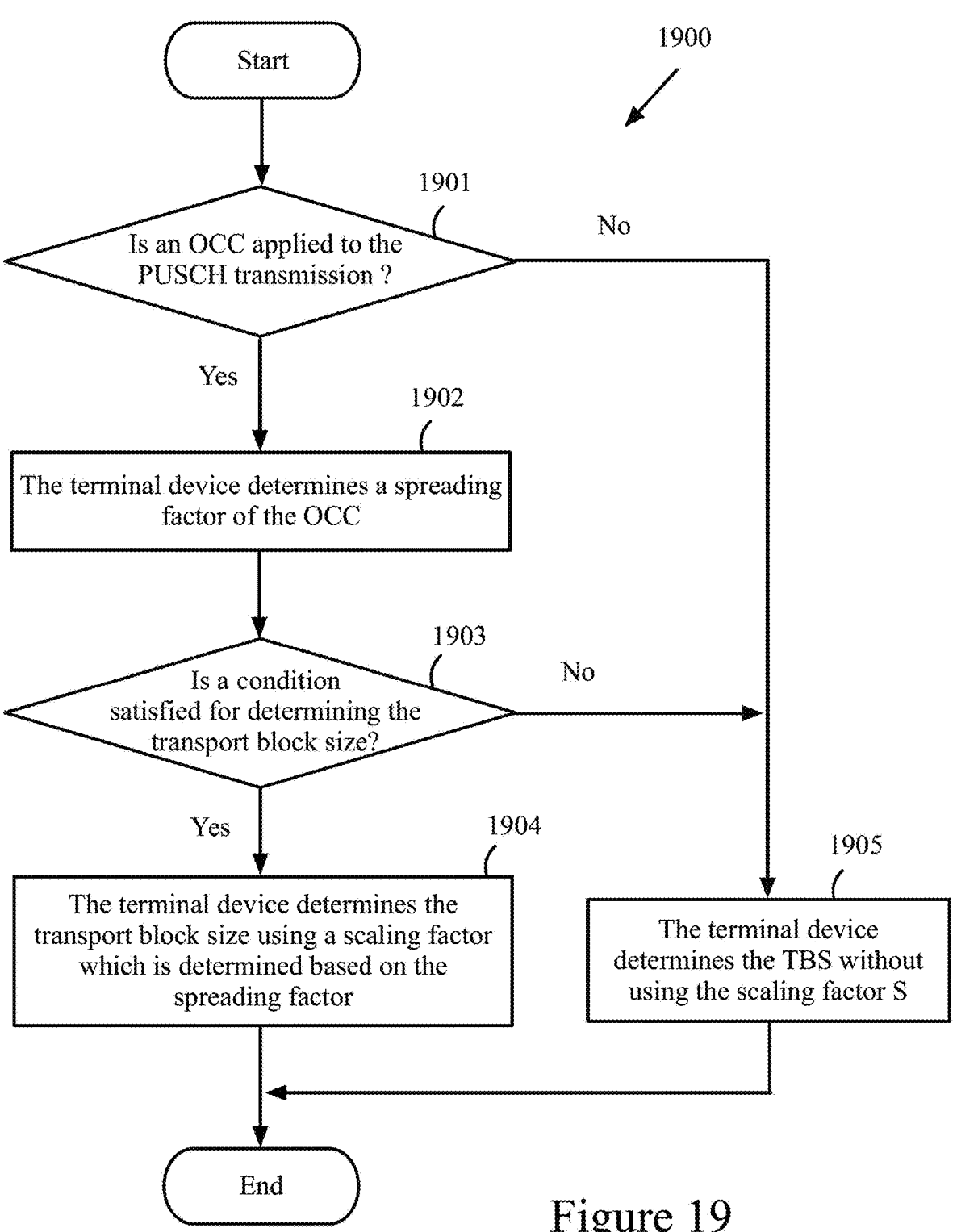
FIG. 19 is a flowchart illustrating an example method/ process performed by a transmitting wireless terminal implementing the process of FIGS. 17-18, according to an example implementation of the present disclosure.

FIG. 19 is a flowchart illustrating an example method/ process 1900 performed by a transmitting wireless terminal implementing the process of FIGS. 17-18, according to an example implementation of the present disclosure. As shown, the terminal device may determine (at block 1901) whether an OCC is applied to the PUSCH transmission. For example, the terminal device, in some embodiments, may receive an indication from a base station that the OCC is to be applied and may determine that the OCC is applied after receiving the indication.

In a case that an OCC is not applied to the PUSH transmission, the terminal device may determine (at block 1905) the TBS without using the scaling factor S. The process 1900 may then end.

If the OCC is applied to the PUSH transmission, the terminal device may determine (at block 1902) a spreading factor of the OCC. In some embodiments, the spreading factor of the OCC may be the length of the OCC. For example, when the OCC of $\{p_0, \ldots, p_{n-1}\}$ is applied, the length of the OCC is n, where n may be 2, 3, 4, 6, or 12.

The terminal device may determine (at block 1903) whether a condition is satisfied for determining the TBS. In some embodiments, the condition may be whether the MCS allocated for the PUSCH transmission is in a specific set of MCSs. In these embodiments, determining whether the condition is satisfied may include determining that the condition is satisfied in a case that the MCS is in the specific set of MCSs.

In some embodiments, the terminal device may receive the condition from a BS in an RRC message. In some embodiments, the terminal device may receive the condition from a BS in a DCI format used for scheduling the PUSCH transmission.

In a case that the condition is met, the terminal device may determine (at block 1904) the transport block size using a scaling factor which may be determined based on the spreading factor. In some embodiments, the terminal device may determine the scaling factor based on the spreading factor by performing a table lookup. For example, the terminal device may perform a table-look-up into the table 1300 of FIG. 13 to find the scaling factor. In some embodiments, the scaling factor may be equal to the spreading factor. The scaling factor, in some embodiments, may be updates based on an RRC message received from a BS.

In some embodiments, the terminal device may determine (at block 1904) the TBS based on the number of REs allocated for the PUSCH transmission, the code rate for the PUSCH transmission, the modulation order for the PUSCH transmission, and the number of layers for the PUSCH transmission. The transport block size may be inversely proportional to the scaling factor. As described above with reference to block 1103 of FIG. 11, $N_{info}$ may be calculated as $N_{RE}*R*Q_m*V$, where $N^{RE}$ is the number of REs, R is code rate for the PUSCH transmission, $Q_m$ is the modulation order for the PUSCH transmission, and V is the number of layers for the PUSCH transmission. $N_{info}$ may then be divided by the scaling factor S, and the results may be used to determine TBS, for example by performing a table look up.

In some embodiments, the terminal device may determine (at block 1904) the TBS based on the number of code blocks C. For example, as described above with reference to block 1103 of FIG. 11, the TBS may be calculated as $8*C*ceil((N^a_{info}+24)/(8*C))-24)/S$ or $8*C*ceil((N^a_{info}/S+24)/(8*C))-24)$, where C may be determined by $ceil((N^a_{info}+24)/3816)$, and $N^a_{info}$ was described with reference to block 1103 of FIG. 3. In some embodiments, the terminal device may determine (at block 1603) the TBS based on a number of OFDM symbols allocated for a PUSCH transmission in one slot. For example, as described above, the TBS may be determined based on the $N_{RE}$, and the $N_{RE}$ may be determined based on the number of OFDM symbols allocated for a PUSCH transmission in one slot.

In a case that the condition is not satisfied (at block 1903), the terminal device may determine (at block 1905) the TBS without using the scaling factor S. The process 1900 may then end.

There are several options to apply an OCC for the PUSCH. In the first option, the OCC may be applied to modulation symbols before applying DFT. In this option, an OCC may be applied within an OFDM symbol. In the second option, an OCC may be applied across OFDM symbols.

Figure 20:
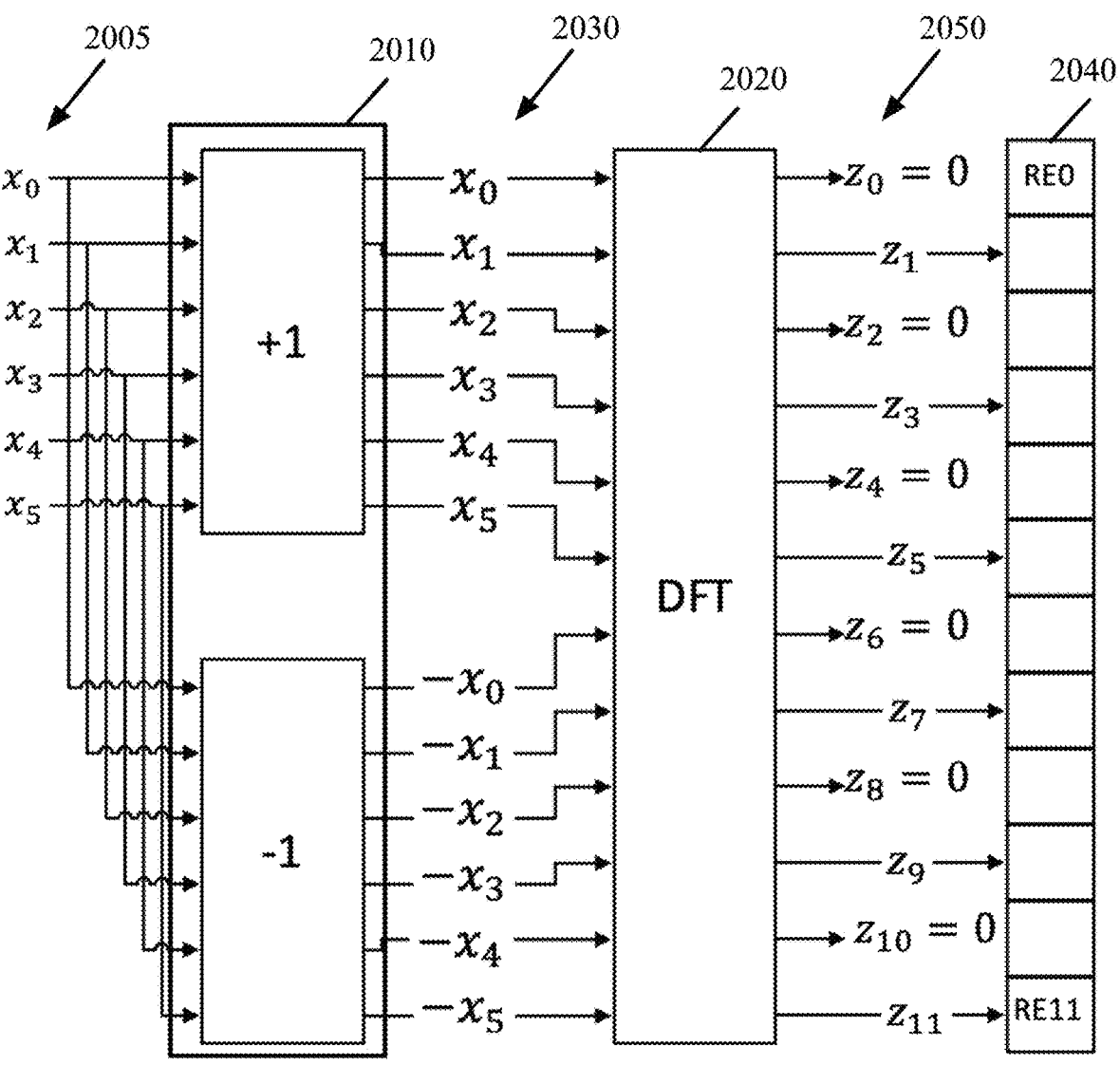
FIG. 20 is a schematic diagram illustrating the application of OCC to modulation symbols prior to applying DFT, according to an example implementation of the present disclosure.

FIG. 20 is a schematic diagram illustrating the application of OCC to modulation symbols prior to applying DFT, according to an example implementation of the present disclosure. In the example of FIG. 20, the OCC (as shown by block 2010) is [+1, −1]. Applying the OCC sequence to the modulation symbols [x0, x1, x2, x3, x4, x5]2005 may result in the input sequence [x0, x1, x2, x3, x4, x5, −x0, −x1, −x2, −x3, −x4, −x5]2030 to the DFT.

Applying DFT (as shown by the box 2020) to the modulation symbols [x0, x1, x2, x3, x4, x5] and [−x0, −x1, −x2, −x3, −x4, −x5] may result in the sequence [z0, z1, z2, z3, z4, z5, z6, z7, z8, z9, z10, z11]2050, which is a comb structure in frequency. In a case that X RBs are allocated for a PUSCH, for an OFDM symbol, and the number of subcarriers per RB is Y, Y*X/S modulation symbols may be prepared. For example, when the number of subcarriers per RB is 12, 12*X/S modulation symbols may be prepared.

The Y*X/S modulation symbols may be represented as $[x_0, x_1, x2, \ldots, x_{Y*X/S-1}]$. The OCC may be represented as $[p_0, p_1, \ldots, p_{S-1}]$. In this case, the input sequence 2030 to DFT may be a form generated by the Kronecker product of $[p_0, p_1, \ldots, p_{S-1}]$ and $[x_0, x_1, x_2, \ldots, x_{Y*X/S-1}]$. For example, the input sequence to DFT may be represented as $[p_0*x_0, p_0*x_1, p_0*x_2, \ldots, p_0*x_{Y*X/S-1}, \ldots, p_1*x_0, p*x_1, p_1*x_2, \ldots, p_1*x_{Y*X/S-1}, \ldots, p_{S-1}*x_0, p_{S-1}*x_1, p_{S-1}*x_2, \ldots, p_{S-1}*x_{Y*X/S-1}]$. The length of the input sequence 2030 to DFT may be Y*X*S/S=Y*X. For example, when the number of subcarriers per RB,Y, is 12, the length of the input sequence to DFT may be 12*X. The Kronecker product is an operation on two matrices of arbitrary size resulting in a block matrix. For example, when A is an m by n matrix and B is a p by q matrix, Kronecker product of A and B is a p times m by q times n matrix.

In some embodiments of the first option, in a case that X=2 and S=2, the input sequence 2030 to DFT may be represented as $[p_0*x_0, p_0*x_1, p_0*x_2, p_0*x_3, p_0*x_4, p_0*x_5,$ $p_0*x_6, p_0*x_7, p_0*x_8, p_0*x_9, p_0*x_{10}, p_0*x_{11}, p_1*x_0, p_1*x_1, p_1*x_2, p_1*x_3, p_1*x_4, p_1*x_5, p_1*x_6, p_1*x_7, p_1*x_8, p_1*x_9, p_1*x_{10}, p_1*x_{11}]$.

In some embodiments of the first option, in a case that X=2 and S=4, the input sequence 2030 to DFT may be represented as $[p_0*x_0, p_0*x_1, p_0*x_2, p_0*x_3, p_0*x_4, p_0*x_5, p_1*x_0, p_1*x_1, p_1*x_2, p_1*x_3, p_1*x_4, p_1*x_5, p_2*x_0, p_2*x_1, p_2*x_2, p_2*x_3, p_2*x_4, p_2*x_5, p_3*x_0, p_3*x_1, p_3*x_2, p_3*x_3, p_3*x_4, p_3*x_5]$.

In some embodiments of the first option, DFT may be applied to the input sequence 2030. After the DFT, a sequence 2050 with the length Y*X may be obtained. The sequence 2050 may be a form of comb structure. Depending on the OCC sequence, some of the resource elements 2040 for the PUSCH transmission may include zero or negligible (e.g., almost zero) values. In the example of FIG. 20, where the OCC sequence is [+1, −1], the odd element (e.g., z0, z2, z4, z6, z8, and z10) of the comb structure may be zero or negligible. For example, the odd elements may be at least one order of magnitude smaller than the even elements. As another example, in a case that X=2, S=2 and the OCC is [+1, −1], all the even elements of the sequence may be zero or almost zero. For example, the even elements may be at least one order of magnitude smaller than the odd elements. As another example, in a case that X=2, S=2, and the OCC is [+1, +1], all the odd elements of the sequence may be zero or almost zero. Therefore, the first option may act similar to the IFDM (Interleaved Frequency Domain Multiplexing).

In some embodiments of the first option, in a case of S=4, an OCC sequence may be determined from [+1, +1, +1, +1], [+1, −j, −1, +j], [+1, −1, +1, −1] and [+1, +j, −1, +j]. Here, j represents imaginary unit.

FIG. 21 is a flowchart illustrating an example method/process 2100 performed by a terminal device to apply OCC to modulation symbols prior to applying DFT, according to an example implementation of the present disclosure. At block 2101, the terminal device may determine that an OCC is applied to the PUSCH transmission based on an indication received from a BS. for example, in some implementations, the indication that an OCC is applied to the PUSCH transmission may receive from the BS as an RRC parameter.

The terminal device may determine (at block 2102) a spreading factor of the OCC. For example, the terminal device may determine the spreading factor of the OCC as the length of the OCC. The terminal device may determine (at block 2103) the number of RBs allocated to the PUSCH transmission. For example, the terminal device may receive a DCI from the BS for scheduling the PUSCH transmission. The terminal device may determine the number of RBs allocated to the PUSCH transmission using FDRA field of the DCI.

The terminal device may determine (at block 2104) the number of a first set of modulation symbols before applying the OCC to each OFDM symbol of the PUSCH as a function of the number of allocated RBs and the spreading factor of the OCC. For example, the terminal device may determine the number of the first set of modulation symbols as the number of subcarriers per RB multiplied by the number of allocated RBs and divided by the spreading factor of the OCC. The first set of modulation symbols may be the set of modulation symbols 2005 of FIG. 20.

The terminal device may determine (at block 2105) a second set of modulation symbols after applying the OCC to each OFDM symbol by performing a Kronecker product of the first set of modulation symbols and a sequence of the OCC. For example, the second set of modulation symbols may be the sequence 2030 of FIG. 20.

In some implementation, the number of the second set of modulation symbols may be a function of the number of allocated RBs. For example, the number of the second set of modulation symbols may be the number of subcarriers per RB multiplied by the number of allocated RBs. As described above, for the spreading factor of S, the number of allocated RBs of X, and the number of subcarriers per RB of Y, the first set of modulation symbols may include [x0, x1, x2, . . . , xY*X/S−1]symbols. For the spreading factor of S, the OCC sequence may include [p0, p1, . . . , pS−1] unit values (e.g., the unit values may include +1, −1). The second set of modulation symbols may then be determined as [p0*x0, p0*x1, p0*x2, . . . , p0*xY*X/S−1, . . . , p1*x0, p1*x1, p1*x2, . . . , p1*xY*X/S−1, . . . , pS−1*x0, pS−1*x1, pS−1*x2, . . . , pS−1*xY*X/S−1].

The terminal device may apply (at block 2106) OCC to the second set of modulation symbols. The process 2100 may then end. Applying the DFT to the second set of modulation symbols may generate a comb structure, as described above with reference to FIG. 20. The number of elements of the comb structure may be a function of the number of allocated RBs. For example, the number of elements of the comb structure may be the number of subcarriers per RB multiplied by the number of allocated RBs. Depending on the OCC sequence, either the odd elements of the comb structure may include negligible values comparing to even elements of the comb structure, or even elements of the comb structure include negligible values comparing to odd elements of the comb structure.

FIG. 22 is a flowchart illustrating an example method/process 2200 performed by a base station to apply OCC to modulation symbols prior to applying DFT, according to an example implementation of the present disclosure. At block 2201, the BS may determine that an OCC is to be applied to the PUSCH transmission. The BS may determine (at block 2202) a spreading factor for the OCC. The BS may send (at block 2203) an indication to the terminal device that an OCC is to be applied to the PUSCH.

The BS may determine (at block 2204) the number of RBs allocated to the PUSCH transmission. The BS may send (at block 2205) the number of RBs allocated to the PUSCH transmission to the terminal device. For example, the BS device may send a DCI to the terminal device for scheduling the PUSCH transmission. The BS may include the number of RBs allocated to the PUSCH transmission in the FDRA field of the DCI.

The BS may determine (at block 2206) the number of a first set of modulation symbols before applying the OCC to each OFDM symbol of the PUSCH as a function of the number of allocated RBs and the spreading factor of the OCC. For example, the BS may determine the number of the first set of modulation symbols as the number of subcarriers per RB multiplied by the number of allocated RBs and divided by the spreading factor of the OCC.

The BS may determine (at block 2207) a second set of modulation symbols after applying the OCC to each OFDM symbol by performing a Kronecker product of the first set of modulation symbols and a sequence of the OCC. The process 2200 may then end. In some implementation, the number of the second set of modulation symbols may be a function of the number of allocated RBs. For example, the number of the second set of modulation symbols may be the number of subcarriers per RB multiplied by the number of allocated RBs. As described above, for the spreading factor of S, the number of allocated RBs of X, and the number of subcarriers per RB of Y, the first set of modulation symbols may include [x0, x1, x2, . . . , xY*X/S−1] symbols. For the spreading factor of S, the OCC sequence may include [p0, p1, . . . , pS−1] unit values (e.g., the unit values may include +1, −1). The second set of modulation symbols may then be determined as [p0*x0, p0*x1, p0*x2, . . . , p0*xY*X/S−1, . . . , p1*x0, p1*x1, p1*x2, . . . , p1*xY*X/S−1, . . . , pS−1*x0, pS−1*x1, pS−1*x2, . . . , pS−1*xY*X/S−1].

The BS may apply (at block 2208) OCC to the second set of modulation symbols. The process 2200 may then end. Applying the DFT to the second set of modulation symbols may generate a comb structure, as described above with reference to FIG. 20. The number of elements of the comb structure may be a function of the number of allocated RBs. For example, the number of elements of the comb structure may be the number of subcarriers per RB multiplied by the number of allocated RBs. Depending on the OCC sequence, either the odd elements of the comb structure may include negligible values comparing to even elements of the comb structure, or the even elements of the comb structure include negligible values comparing to odd elements of the comb structure.

Figure 23:
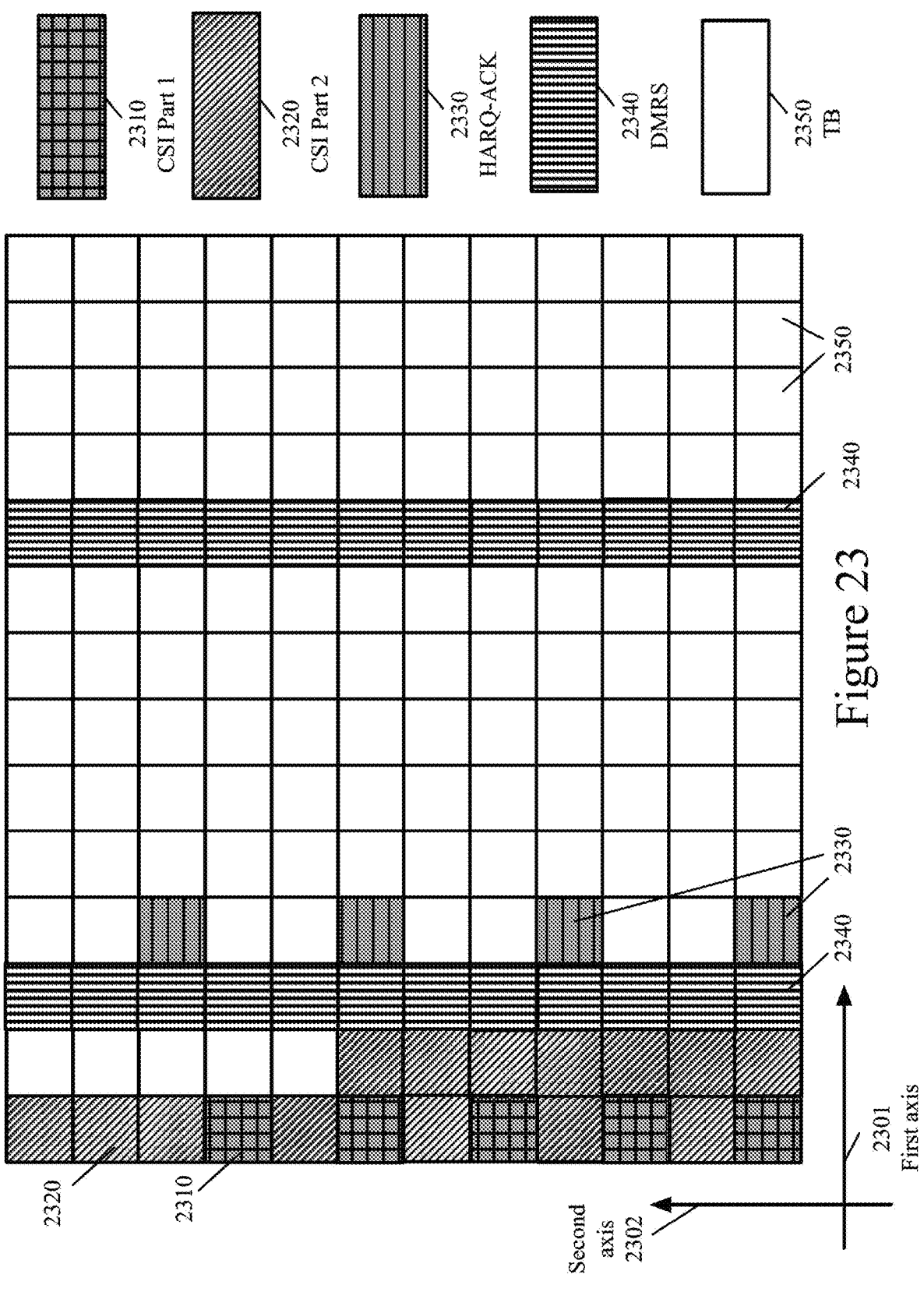
FIG. 23 is a diagram illustrating an example UCI multiplexing performed by a terminal device to multiplex a rate-matching output sequence originated from the transport block and one or more UCI sequences, according to an example implementation of the present disclosure.

FIG. 23 is a diagram illustrating an example UCI multiplexing performed by a terminal device to multiplex a rate-matching output sequence originated from the transport block and one or more UCI sequences, according to an example implementation of the present disclosure. The sequence originated from the transport block may be derived from the rate-matching output sequence. For example, the sequence may be derived from the rate-matching output sequence at least with interleaving and/or code block concatenation.

In the example of FIG. 23, X is assumed to be 2 and S is assumed to be 2. In UCI multiplexing, the sequence and the one or more UCI sequences are mapped to a matrix. The first axis 2301 may correspond to the OFDM symbol index, and the second axis 2302 may correspond to the subcarrier index. In each element in the matrix, $Q_m$*V bits may be mapped, where $Q_m$ represents the modulation order for the PUSCH, and V represents the number of layers for the PUSCH. In FIG. 23 and related description, $Q_m$*V is assumed to be.

In some embodiments, in a case that an OCC is applied to the PUSCH, the second axis may have Y*X/S entries (e.g., Y may be 12). The first axis may have $N^{sh}_{symb}$ entries in a case that frequency hopping is not applied, where $N^{sh}_{symb}$ is the number of OFDM symbols allocated for a PUSCH in one slot. In a case that the frequency hopping is applied, the first axis may have entries corresponding to the number of OFDM symbols per frequency hop.

In FIG. 23, two DMRS symbols 2340 are shown. On the other hand, in some embodiments, the 2D matrix may not include DMRS symbols.

A CSI report may include one or two parts of, CSI part 1 (labeled as 2310 in FIG. 23) and CSI part 2 (labeled as 2320 in FIG. 23). CSI part 1 has a fixed payload size and may be used to identify the number of information bits in CSI part 2. It should be noted that CSI part 1 and part 2 are transmitted in the same PUSCH. The receiver knows the position of CSI-part 1. Therefore, when the receiver receives the PUSCH, the receiver first decodes the CSI part 1. Then, based on the value of the CSI-part 1, the receiver identifies the number of information bits in CSI part 2, and decodes CSI part 2. Then, the receiver further decodes the HARQ-ACK 2330 and the rate-matching output sequence 2350 originated from the TB.

In a case that CSI part 1 sequence is multiplexed to the PUSCH, the CSI part 1 sequence may be mapped from the first entry of the first axis. In the second axis 2302, the CSI part 1 sequence may be mapped in a distributed manner. For example, in a case that the CSI part 1 sequence has 10 bits, 10/2=5 elements may be used to map the CSI part 1 sequence. The 5 elements may be mapped in uniform distribution.

In a case that CSI part 2 sequence is multiplexed to the PUSCH, the CSI part 2 sequence may be mapped from the last entry of the first CSI part 1 sequence in the first axis.

In a case that the HARQ-ACK sequence 2330 is multiplexed to the PUSCH, the HARQ-ACK sequence 2330 may be mapped from the first entry next to the first DMRS 2340 symbol in the first axis. In the second axis, the HARQ-ACK sequence 2330 may be mapped in a distributed manner. For example, in a case that the HARQ-ACK sequence 2330 has 8 bits, 8/2=4 elements may be used to map the HARQ-ACK sequence. The 4 elements may be mapped in uniform distribution.

In some embodiments, the HARQ-ACK sequence length $E_{ACK}$ may be determined as $E_{ACK}=Q_m*V*Q'_{ACK}$. Here, $Q'_{ACK}$ is the number of coded modulation symbols for HARQ-ACK. $Q'_{ACK}$ may be determined as $$Q'_{ACK} = \min\left(\beta_{offset}^{ACK} * (O_{ACK} + L_{ACK})/R, E_{cap}\right).$$

Here, $O_{ACK}$ is the number of HARQ-ACK bits to be multiplexed. $L_{ACK}$ is the number of CRC bits appended to the HARQ-ACK bits.

R works as the code rate of the transport block. In some embodiments, R may be determined as $$R = \frac{\sum_{r=0}^{C_{UL-SCH}-1} K_r}{\sum_{l=0}^{N_{symb,all}^{PUSCH}-1} M_{sc}^{UCI}(l)}.$$

Here, $C_{UL-SCH}$ is the number of code blocks for the transport block. $K_r$ is the number of bits in the code block r.

$$N_{symb,all}^{PUSCH} = N_{symb}^{sh} - N_{DMRS}^{sh}.$$

$N_{DMRS}^{sh}$ is the number of OFDM symbols for the DMRS in the PUSCH. In FIG. 20, $$N_{symb,all}^{PUSCH} = 12$$

and $N_{DMRS}^{sh}=2$.

$$M_{sc}^{UCI}(l)$$

is the number of subcarriers for the PUSCH.

The parameter $$\beta_{offset}^{ACK}$$

34 is a well know parameter in 5G NR. The value of $$\beta_{offset}^{ACK}$$

may be provided from the BS to the terminal device by an RRC parameter. The parameter $$\beta_{offset}^{ACK}$$

may be an offset parameter related to the UCI coding rate and TB coding rate.

$E_{cap}$ may be determined as $$E_{cap} = \left\lceil \alpha \cdot \sum_{l=0}^{N_{symb,all}^{PUSCH}-1} M_{sc}^{UCI}(l) \right\rceil.$$

Here, $\alpha$ is a value provided by an RRC parameter. $l_0$ may be the index of the first entry in which the HARQ-ACK is mapped. In FIG. 23, $l_0$ is 2. Here, indexing of the $l_0$ is determined by excluding the DMRS symbols 2340. The symbols $\lceil \ \rceil$ denote the ceiling function. The $Ec_{ap}$ is the configured maximum number of coded modulation symbols to be mapped to the PUSCH.

In FIG. 23, the terminal device may multiplex UCI symbols 2310, 2320, and/or 2330 with the rate-matching output sequence 2350 originated from the transport block and one or more UCI sequences. The terminal device may also multiplex the DMRS symbols 2340 with the rate-matching output sequence 2350 originated from the transport block.

In some embodiments, the terminal device may determine whether an OCC is applied to the PUSCH. The terminal device may determine the $Q'_{ACK}$ based on determination of whether an OCC is applied to the PUSCH.

In different implementation different operations may be performed to determine $Q'_{ACK}$. Several example of these operations, referred to as operation A, operation B, operation C, and operation D are described below. In some embodiments, an operation A may be performed to determine $Q'_{ACK}$. In the operation A, the terminal device may determine $Q'_{ACK}$ based on $$Q'_{ACK} = \min\left(\beta_{offset}^{ACK} * (O_{ACK} + L_{ACK})/R, E_{cap}\right)$$

using $$\beta_{offset}^{ACK}$$

provided by a first RRC parameter in a case that the terminal device determines that the OCC is applied to the PUSCH. In the operation A, the terminal device may determine $Q'_{ACK}$ based on $$Q'_{ACK} = \min\left(\beta^{ACK}_{offset} * (O_{ACK} + L_{ACK}) / R, E_{cap}\right)$$

using $$\beta^{ACK}_{offset}$$

provided by a second RRC parameter which is different from the first RRC parameter in a case that the terminal device does not determine that the OCC is applied to the PUSCH.

In some embodiments, an operation B may be performed to determine $Q'_{ACK}$. In the operation B, the terminal device may determine $Q'_{ACK}$ based on $$Q'_{ACK} = \min\left(S * \beta^{ACK}_{offset} * (O_{ACK} + L_{ACK}) / R, E_{cap}\right)$$

in a case that the terminal device determines that the OCC is applied to the PUSCH. In the operation B, the terminal device may determine $Q'_{ACK}$ based on $$Q'_{ACK} = \min\left(\beta^{ACK}_{offset} * (O_{ACK} + L_{ACK}) / R, E_{cap}\right)$$

in a case that the terminal device does not determine that the OCC is applied to the PUSCH.

In some embodiments, an operation C may be performed to determine $Q'_{ACK}$. In the operation C, the terminal device may determine $Q'_{ACK}$ based on $$Q'_{ACK} = \min\left(\beta^{ACK}_{offset} (O_{ACK} + L_{ACK}) / R, E_{cap}\right)$$

using $$M^{UCI}_{SC}(l) = Y^* X / S$$

in a case that the terminal device determines that the OCC is applied to the PUSCH (e.g., Y may be 12). In the operation C, the terminal device may determine $Q'_{ACK}$ based on $$Q'_{ACK} = \min\left(\beta^{ACK}_{offset} (O_{ACK} + L_{ACK}) / R, E_{cap}\right)$$

using $$M^{UCI}_{SC}(1) = Y * X$$

in a case that the terminal device does not determine that the OCC is applied to the PUSCH.

In some embodiments, an operation D may be performed to determine $Q'_{ACK}$. In the operation D, the terminal device may determine $Q'_{ACK}$ based on $$Q'_{ACK} = \min\left(\beta^{ACK}_{offset} (O_{ACK} + L_{ACK}) / R, E_{cap}\right)$$

using a provided by a first RRC parameter in a case that the terminal device determines that the OCC is applied to the PUSCH. In the operation D, the terminal device may determine $Q'_{ACK}$ based on $$Q'_{ACK} = \min\left(\beta^{ACK}_{offset} (O_{ACK} + L_{ACK}) / R, E_{cap}\right)$$

using a provided by a second RRC parameter which is different from the first RRC parameter in a case that the terminal device does not determine that the OCC is applied to the PUSCH.

In some embodiments, the terminal device may use at least one of the operation A, the operation B, the operation C, and the operation D.

Figure 24:
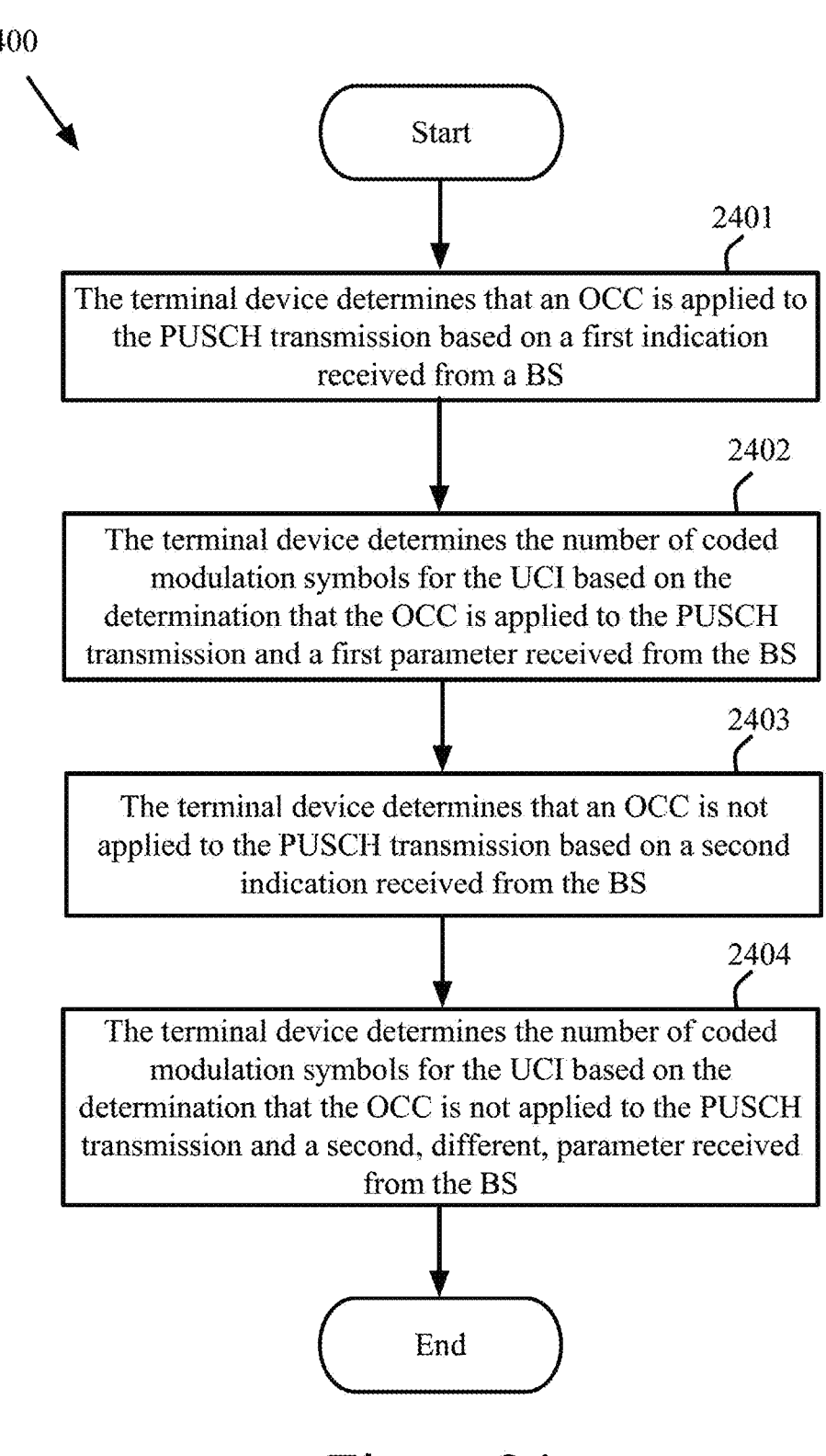
FIG. 24 is a flowchart illustrating an example method/ process performed by a terminal device to determine the number of coded modulation symbols for UCI transmitted in a PUSCH transmission, according to an example implementation of the present disclosure.

FIG. 24 is a flowchart illustrating an example method/process 2400 performed by a terminal device to determine the number of coded modulation symbols for UCI transmitted in a PUSCH transmission, according to an example implementation of the present disclosure. At block 2401, the terminal device may determine that an OCC is applied to the PUSCH transmission based on a first indication received from a BS.

The terminal device may determine (at block 2402) the number of coded modulation symbols for the UCI based on the determination that the OCC is applied to the PUSCH transmission, and a first parameter received from the BS.

The coded modulation symbols for the UCI may include one or more of coded modulation symbols for HARQ-ACK (e.g., the HARQ-ACK symbols 2330 of FIG. 23), coded modulation symbols for CSI part 1 (e.g., the CSI part 1 symbols 2310 of FIG. 23), or coded modulation symbols for CSI part 2 (e.g., the CSI part 2 symbols 2320 of FIG. 23).

The first parameter received from the BS may be either the parameter $$\beta^{ACK}_{offset},$$

the spreading factor of the OCC, or the parameter $\alpha$. For example, the first parameter received from the BS may be the parameter $$\beta^{ACK}_{offset},$$

and the terminal device may determine the number of coded modulation symbols for the UCI based on the parameter $$\beta^{ACK}_{offset},$$

as described above with reference to operation A.

The first parameter received from the BS may be the spreading factor, S, of the OCC, and the terminal device may determine the number of coded modulation symbols for the UCI based on the spreading factor of the OCC, as described above with reference to operations B or C. The spreading factor, S, may be the length of the OCC.

The first parameter received from the BS may be the parameter $\alpha$, and the terminal device may determine the number of coded modulation symbols for the UCI based on the parameter $\alpha$, as described above with reference to operation D.

The terminal device may determine (at block 2403) that an OCC is not applied to the PUSCH transmission based on a second indication received from the BS. The terminal device may determine (at block 2404) the number of coded modulation symbols for the UCI based on the determination that the OCC is not applied to the PUSCH transmission, and a second parameter (that is different than the first parameter) received from the BS. The process 2400 may then end.

In the case that the first parameter was a first value of the parameter $$\beta_{offset}^{ACK},$$

the second parameter may be a second value of the parameter $$\beta_{offset}^{ACK},$$

that is different than the first value of the parameter $$\beta_{offset}^{ACK},$$

as described above with reference to operation A. The first value of the parameter $$\beta_{offset}^{ACK},$$

may be received by the terminal device from the BS in a first RRC message and the second value of the parameter $$\beta_{offset}^{ACK}$$

may be received in a second RRC message.

In the case that the first parameter was the spreading factor of the OCC, the terminal device may determine the number of coded modulation symbols for the UCI without using the spreading factor of the OCC, as described above with reference to operations B or C.

In the case that the first parameter was a first value of the parameter $\alpha$, the second parameter may be a second value of the parameter $\alpha$ that is different than the first value of the parameter $\alpha$, as described above with reference to operation D. The first value of the parameter $\alpha$ may be received by the terminal device from the BS in a first RRC message and the second value of the parameter $\alpha$ may be received in a second RRC message.

The terminal device may multiplex the coded modulation symbols for HARQ-ACK 2330 (FIG. 23) with the rate-matching output sequence 2350 originated from the TB. The terminal device may multiplex the coded modulation symbols for HARQ-ACK 2330 and the rate-matching output sequence 2350 originated from the TB with a sequence of coded modulation symbols of DMRS 2340. The terminal device may multiplex the coded modulation symbols for HARQ-ACK 2330 with the rate-matching output sequence 2350 originated from the TB, a sequence of coded modulation symbols 2310 for CSI part 1, and a sequence of coded modulation symbols 2320 for CSI part 2.

Figure 25:
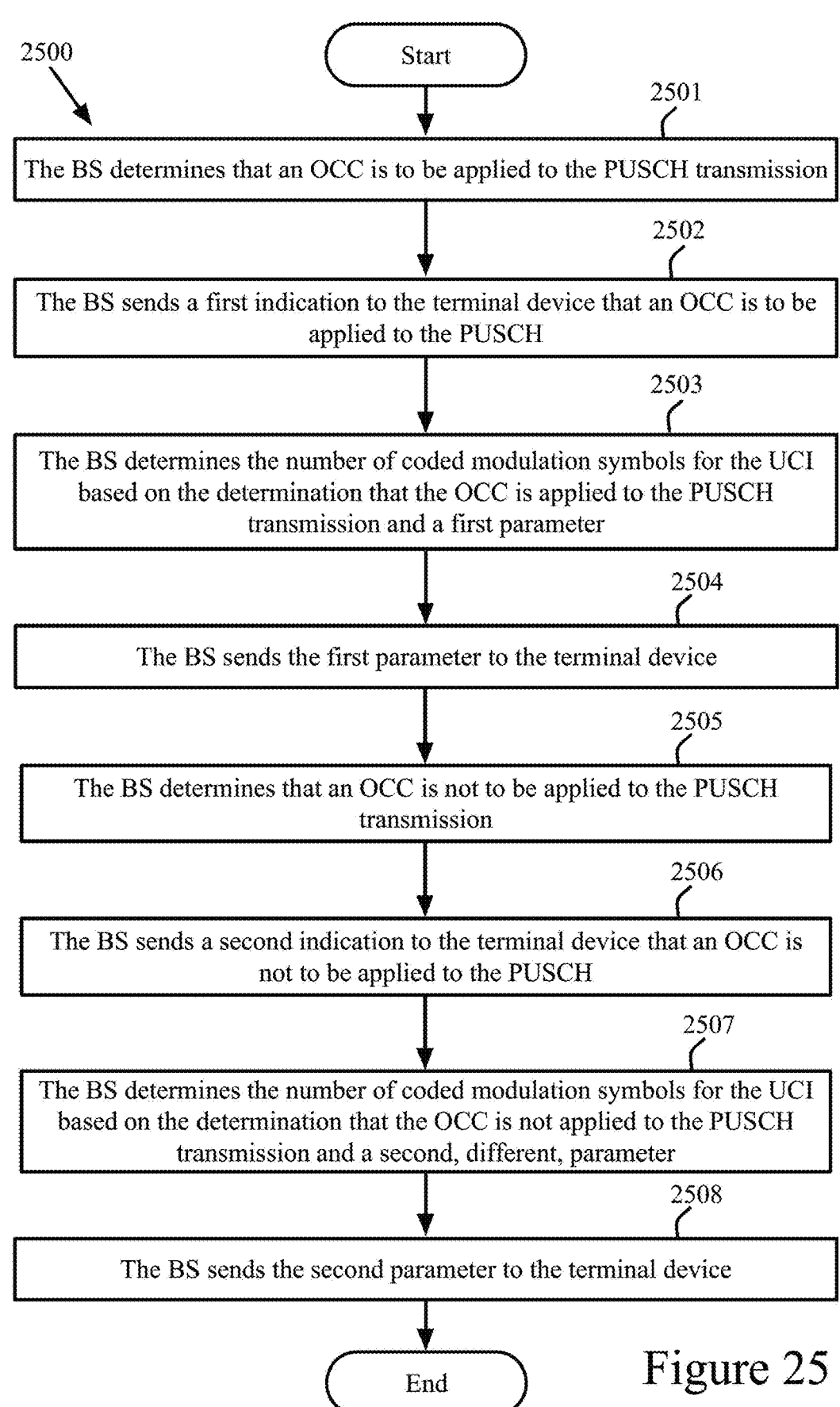
FIG. 25 is a flowchart illustrating an example method/ process performed by a BS to determine the number of coded modulation symbols for UCI transmitted in a PUSCH transmission, according to an example implementation of the present disclosure.

FIG. 25 is a flowchart illustrating an example method/process 2500 performed by a BS to determine the number of coded modulation symbols for UCI transmitted in a PUSCH transmission, according to an example implementation of the present disclosure. At block 2501, the BS may determine that an OCC is to be applied to the PUSCH transmission. The BS may send (at block 2502) a first indication to the terminal device that an OCC is to be applied to the PUSCH.

The BS may determine (at block 2503) the number of coded modulation symbols for the UCI based on the determination that the OCC is applied to the PUSCH transmission, and a first parameter. The BS may send (at block 2504) the first parameter to the terminal device.

The coded modulation symbols for the UCI may include one or more of coded modulation symbols for HARQ-ACK (e.g., the HARQ-ACK symbols 2330 of FIG. 23), coded modulation symbols for CSI part 1 (e.g., the CSI part 1 symbols 2310 of FIG. 23), or coded modulation symbols for CSI part 2 (e.g., the CSI part 2 symbols 2320 of FIG. 23).

The first parameter may be either the parameter $$\beta_{offset}^{ACK},$$

the spreading factor of the OCC, or the parameter $\alpha$. For example, the first parameter may be the parameter $$\beta_{offset}^{ACK},$$

and the BS may determine the number of coded modulation symbols for the UCI based on the parameter $$\beta_{offset}^{ACK},$$

as described above with reference to operation A.

The first parameter may be the spreading factor, S, of the OCC, and the BS may determine the number of coded modulation symbols for the UCI based on the spreading factor of the OCC, as described above with reference to operations B or C. The spreading factor, S, may be the length of the OCC.

The first parameter be the parameter $\alpha$, and the BS may determine the number of coded modulation symbols for the UCI based on the parameter $\alpha$, as described above with reference to operation D.

The BS may determine (at block 2505) that an OCC is not applied to the PUSCH transmission. The BS may send (at block 2506) a second indication to the terminal device that the OCC is not to be applied to the PUSCH transmission. The BS may determine (at block 2507) the number of coded modulation symbols for the UCI based on the determination that the OCC is not applied to the PUSCH transmission, and a second parameter that is different than the first parameter. The BS may send (at block 2508) the second parameter to the terminal device. The process 2500 may then end.

In the case that the first parameter was a first value of the parameter $$\beta_{offset}^{ACK},$$

the second parameter may be a second value of the parameter $$\beta_{offset}^{ACK}$$

that is different than the first value of the parameter $$\beta_{offset}^{ACK},$$

as described above with reference to operation A. The first value of the parameter $$\beta_{offset}^{ACK}$$

may be sent to the terminal device in a first RRC message and the second value of the parameter $$\beta_{offset}^{ACK}$$

may be sent in a second RRC message.

In the case that the first parameter was the spreading factor of the OCC, the BS may determine the number of coded modulation symbols for the UCI without using the spreading factor of the OCC, as described above with reference to operations B or C.

In the case that the first parameter was a first value of the parameter $\alpha$, the second parameter may be a second value of the parameter $\alpha$ that is different than the first value of the parameter $\alpha$, as described above with reference to operation D. The first value of the parameter $\alpha$ may be sent to the terminal device in a first RRC message and the second value of the parameter $\alpha$ may be sent in a second RRC message.

In the second option, an OCC may be applied across OFDM symbols. In a case that $N_{total}$ OFDM symbols are allocated for a PUSCH and $N^{sh}_{DMRS}$ OFDM symbols are allocated for DMRS for the PUSCH, for a subcarrier, $(N_{total}-N^{sh}_{DMRS})/S=N/S$ modulation symbols may be prepared. Here, N represents $N_{total}-N^{sh}_{DMRS}$. In some embodiments, $N_{total}$ may be the number of OFDM symbols for a PUSCH in a slot and thee $N^{sh}_{DMRS}$ may be the number of OFDM symbols for the DMRS in the slot. In some embodiments, the $N_{total}$ may be the number of OFDM symbols for a PUSCH in a frequency hop and $N^{sh}_{DMRS}$ may be the number of OFDM symbols for the DMRS in the frequency hop.

The N/S modulation symbols may be represented as [$x_0$, $x_1$, $x_2$, . . . , $x_{N/S-1}$]. The OCC may be represented as [$p_0$, $p_1$, . . . , $p_{S-1}$]. In some embodiments, the output sequence after OCC may be a form generated by the Kronecker product of [$p_0$, $p_1$, . . . , $p_{S-1}$] and [$x_0$, $x_1$, x2, . . . , $x_{N/S-1}$]. For example, the input sequence to DFT may be represented as [$p_0*x_0$, $p_0*x_1$, $p_0*x_2$, . . . , $p_0*x_{N/S-1}$, . . . , $p_1*x_0$, $p_1*x_1$, $p_1*x_2$, . . . , $p_1*x_{N/S-1}$, . . . , $p_{S-1}*x_0$, $p_{S-1}*x_1$, $p_{S-1}*x_2$, . . . , $p_{S-1}*x_{N/S-1}$]. The length of the input sequence to DFT may be N*S/S=N.

Figure 26:
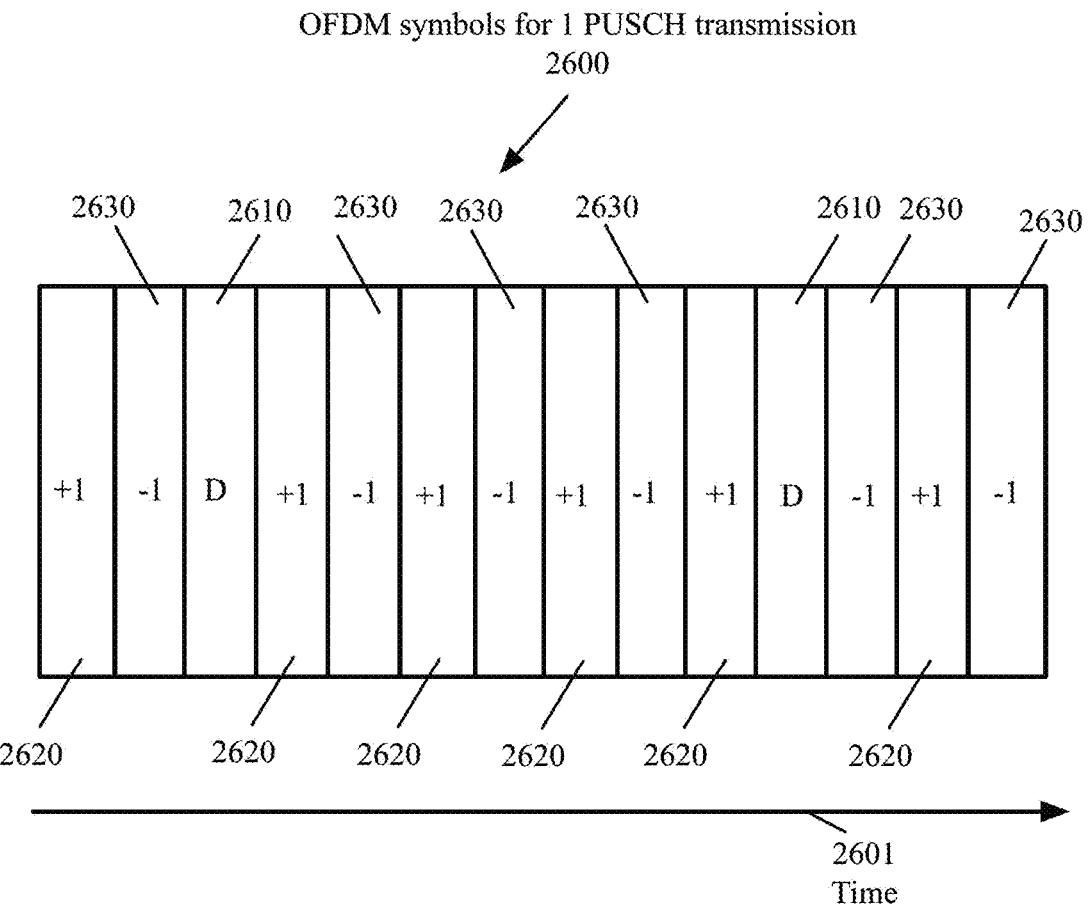
FIG. 26 is a diagram illustrating an example of the OFDM symbols transmitted by one PUSCH transmission, according to an example implementation of the present disclosure.

FIG. 26 is a diagram illustrating an example of the OFDM symbols transmitted by one PUSCH transmission, according to an example implementation of the present disclosure. In the example of FIG. 26, an OCC sequence of [+1, −1] is assumed and 14 OFDM symbols 2600 are transmitted by one PUSCH transmission. The OFDM symbols 2600 are shown in the time domain 2601. The 14 OFDM symbols include 2 DMRS symbols 2610, 6 OFDM symbols 2620 for OCC+1 and 6 OFDM symbols 2630 for OCC−1.

Figure 27:
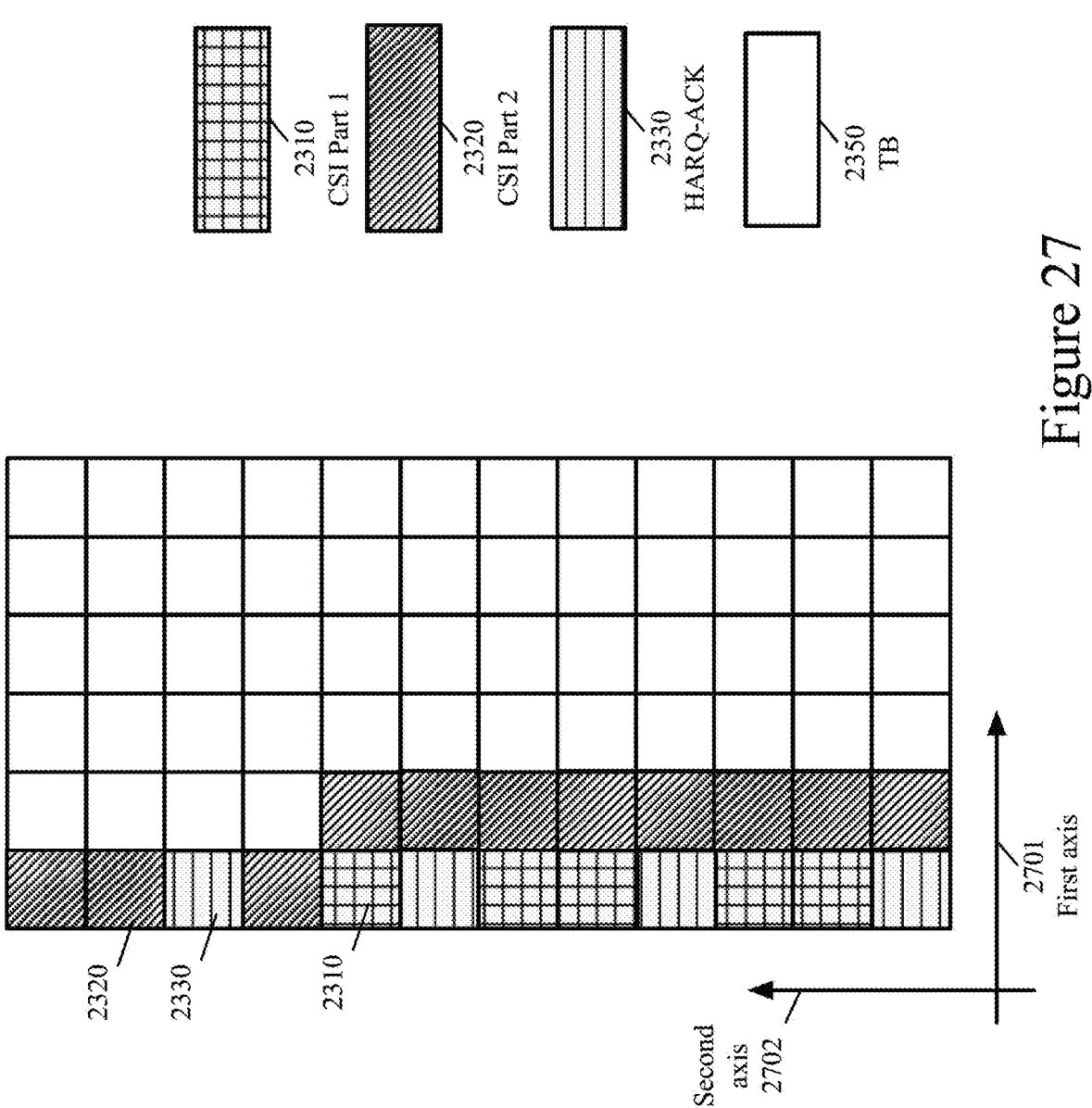
FIG. 27 is a diagram illustrating an example UCI multiplexing performed by a terminal device to multiplex a sequence originated from the transport block and one or more UCI sequences, according to an example implementation of the present disclosure.

FIG. 27 is a diagram illustrating an example UCI multiplexing performed by a terminal device to multiplex a sequence originated from the transport block and one or more UCI sequences, according to an example implementation of the present disclosure. The sequence originated from the transport block may be derived from the rate-matching output sequence. For example, the sequence may be derived from the rate-matching output sequence at least with interleaving and/or code block concatenation.

In FIG. 27, it is assumed that $N_{total}$ is 14, $N^{sh}_{DMRS}$ is 2, X is 1, and S is 2. The first axis 2701 may correspond to OFDM symbol set index. Here, each OFDM symbol set may be defined as a set of OFDM symbols in which an OCC is applied where the number of OFDM symbol sets are determined by N/S=6. Therefore, in the example of FIG. 27, N/S=6 entries are shown in the first axis 2701. The second axis 2702 may correspond to the subcarrier index. In FIG. 27, 12*X=12 entries are shown in the second axis. In each element in the matrix, $Q_m*V$ bits may be mapped. In FIG. 27 and related description, it is assumed that $Q_m*V$ is 2.

In a case that HARQ-ACK sequence is multiplexed to the PUSCH, the HARQ-ACK sequence may be mapped from the first entry in the first axis. In another embodiment, in a case that HARQ-ACK is multiplexed to the PUSCH, the entry to start the mapping of HARQ-ACK may be determined based on determining the relationship between an entry in the first axis and the first DMRS symbol. For example, the terminal device may determine whether all the OFDM symbols in the OFDM symbol set corresponding to the entry is later than the first DMRS symbol. If the terminal device determines that the entry is the first entry in which all the OFDM symbols in the OFDM symbol set is later than the first DMRS symbol, the terminal device may determine that the HARQ-ACK sequence may be mapped from the entry.

In the second axis 2702, the HARQ-ACK sequence may be mapped in a distributed manner. For example, in a case that the HARQ-ACK sequence has 8 bits, 8/2=4 elements may be used to map the HARQ-ACK sequence. The 4 elements may be mapped in uniform distribution.

In a case that CSI part 1 sequence is multiplexed to the PUSCH, the CSI part 1 sequence may be mapped from the first entry of the first axis. In the second axis, the CSI part 1 sequence may be mapped in a distributed manner. For example, in a case that the CSI part 1 sequence has 10 bits, 10/2=5 elements may be used to map the CSI part 1 sequence. The 5 elements may be mapped in uniform distribution.

In a case that CSI part 2 sequence is multiplexed to the PUSCH, the CSI part 2 sequence may be mapped from the last entry of the first CSI part 1 sequence in the first axis.

In some embodiments, the HARQ-ACK sequence length $E_{ACK}$ may be determined based on $E_{ACK}=Q_m*V*Q'_{ACK}$. Here, $Q'_{ACK}$ may be determined based on $$Q'_{ACK} = \min\left(\beta_{offset}^{ACK} * (O_{ACK} + L_{ACK})/R, E_{cap}\right).$$

Here, $O_{ACK}$ is the number of HARQ-ACK bits to be multiplexed. $L_{ACK}$ is the number of CRC bits appended to the HARQ-ACK bits.

R works as the code rate of the transport block. In some embodiments, R may be determined based on $$R = \frac{\sum_{r=0}^{C_{UL-SCH}-1} K_r}{\sum_{l=0}^{N_{symb,all}^{PUSCH}-1} M_{sc}^{UCI}(l)}.$$

Here, $C_{UL-SCH}$ is the number of code blocks for the transport block. $K_r$ is the number of bits in the code block r.

$$N_{symb,all}^{PUSCH}$$

may be $(N^{sh}_{symb}-N^{sh}_{DMRS})/S$.

$$\beta_{offset}^{ACK}$$

is a value provided by an RRC parameter.
$E_{cap}$ may be determined based on $$E_{cap} = \left[\alpha \cdot \sum_{l=0}^{N_{symb,all}^{PUSCH}-1} M_{sc}^{UCI}(l)\right].$$

Here, $\alpha$ is a value provided by an RRC parameter. $l_0$ may be the index of the first entry in which the HARQ-ACK is mapped. In FIG. 27, $l_0$ is 0. Here, indexing of the $l_0$ may be based on the OFDM symbol set index.

In some embodiments, the terminal device may determine whether an OCC is applied to the PUSCH. The terminal device may determine the $Q'_{ACK}$ based on determination of whether an OCC is applied to the PUSCH.

In some embodiments, operation A may be performed. In the operation A, the terminal device may determine $Q'_{ACK}$ based on $$Q'_{ACK} = \min\left(\beta_{offset}^{ACK} * (O_{ACK} + L_{ACK})/R, E_{cap}\right)$$

using $$\beta_{offset}^{ACK}$$

provided by a first RRC parameter in a case that the terminal device determines that the OCC is applied to the PUSCH. In the operation A, the terminal device may determine $Q'_{ACK}$ based on $$Q'_{ACK} = \min\left(\beta_{offset}^{ACK} * (O_{ACK} + L_{ACK})/R, E_{cap}\right)$$

using $$\beta_{offset}^{ACK}$$

provided by a second RRC parameter which is different from the first RRC parameter in a case that the terminal device does not determine that the OCC is applied to the PUSCH.

In some embodiments, operation B may be performed. In the operation B, the terminal device may determine $Q'_{ACK}$ based on $$Q'_{ACK} = \min\left(S * \beta_{offset}^{ACK} * (O_{ACK} + L_{ACK})/R, E_{cap}\right)$$

in a case that the terminal device determines that the OCC is applied to the PUSCH. In the operation B, the terminal device may determine $Q'_{ACK}$ based on $$Q'_{ACK} = \min\left(\beta_{offset}^{ACK} * (O_{ACK} + L_{ACK})/R, E_{cap}\right)$$

in a case that the terminal device does not determine that the OCC is applied to the PUSCH.

In some embodiments, operation C may be performed. In the operation C, the terminal device may determine $Q'_{ACK}$ based on $$Q'_{ACK} = \min\left(\beta_{offset}^{ACK} * (O_{ACK} + L_{ACK})/R, E_{cap}\right)$$

using $$N_{symb,all}^{PUSCH} = \left(N^{sh}_{symb} - N^{sh}_{DMRS}\right)/S$$

in a case that the terminal device determines that the OCC is applied to the PUSCH. In the operation C, the terminal device may determine $Q'_{ACK}$ based on $$Q'_{ACK} = \min\left(\beta_{offset}^{ACK} * (O_{ACK} + L_{ACK})/R, E_{cap}\right)$$

using $$N_{symb,all}^{PUSCH} = N^{sh}_{symb} - N^{sh}_{DMRS}$$

$N_{symb,all}^{PUSCH}=N^{sh}_{symb}-N^{sh}_{DMRS}$ in a case that the terminal device does not determine that the OCC is applied to the PUSCH.

In some embodiments, operation D may be performed. In the operation D, the terminal device may determine $Q'_{ACK}$ based on $$Q'_{ACK} = \min\left(\beta_{offset}^{ACK} * (O_{ACK} + L_{ACK})/R, E_{cap}\right)$$

using α provided by a first RRC parameter in a case that the terminal device determines that the OCC is applied to the PUSCH. In the operation D, the terminal device may determine $Q'_{ACK}$ based on $$Q'_{ACK} = \min\left(\beta_{offset}^{ACK} * (O_{ACK} + L_{ACK})/R, E_{cap}\right)$$

using α provided by a second RRC parameter which is different from the first RRC parameter in a case that the terminal device does not determine that the OCC is applied to the PUSCH.

In some embodiments, the terminal device may use at least one of the operation A, the operation B, the operation C, and the operation D.

The various foregoing example embodiments and modes may be utilized in conjunction with one another, e.g., in combination with one another.

Each of a program running on the BS and the terminal device 101A-101C according to an aspect of the present invention may be a program that controls a Central Processing Unit (CPU) and the like, such that the program causes a computer to operate in such a manner as to realize the functions of the above-described embodiment according to the present invention. The information handled in these devices is transitorily stored in a Random-Access-Memory (RAM) while being processed. Thereafter, the information is stored in various types of Read-Only-Memory (ROM) such as a Flash ROM and a Hard-Disk-Drive (HDD), and when necessary, is read by the CPU to be modified or rewritten.

Note that the terminal device 101A-101C and the base station device 103 according to the above-described embodiment may be partially achieved by a computer. In this case, this configuration may be realized by recording a program for realizing such control functions on a computer-readable recording medium and causing α computer system to read the program recorded on the recording medium for execution.

Note that it is assumed that the "computer system" mentioned here refers to a computer system built into the terminal device 101A-101C or the base station device 103, and the computer system includes an OS and hardware components such as a peripheral device. Furthermore, the "computer-readable recording medium" refers to a portable medium such as a flexible disk, a magneto-optical disk, a ROM, a CD-ROM, and the like, and a storage device built into the computer system such as a hard disk.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Furthermore, the base station device 103 according to the above-described embodiment may be achieved as an aggregation (a device group) including multiple devices. Each of the devices configuring such a device group may include some or all of the functions or the functional blocks of the base station device 103 according to the above-described embodiment. The device group may include each general function or each functional block of the base station device 103. Furthermore, the terminal device 101A-101C according to the above-described embodiment can also communicate with the base station device as the aggregation.

Furthermore, the base station device 103 according to the above-described embodiment may serve as an Evolved Universal Terrestrial Radio Access Network (E-UTRAN) and/or NG-RAN (Next Gen RAN, NR-RAN). Furthermore, the base station device 103 according to the above-described embodiment may have some or all of the functions of a node higher than an eNodeB or the gNB.

Furthermore, some or all portions of each of the terminal device 101A-101C and the base station device 103 according to the above-described embodiment may be typically achieved as an LSI which is an integrated circuit or may be achieved as a chip set. The functional blocks of each of the terminal device 101A-101C and the base station device 103 may be individually achieved as a chip, or some or all of the functional blocks may be integrated into a chip. Furthermore, a circuit integration technique is not limited to the LSI, and may be realized with a dedicated circuit or a general-purpose processor. Furthermore, in a case that with advances in semiconductor technology, a circuit integration technology with which an LSI is replaced appears, it is also possible to use an integrated circuit based on the technology.

Furthermore, according to the above-described embodiment, the terminal device 101A-101C has been described as an example of a communication device, but the present invention is not limited to such a terminal device, and is applicable to a terminal device or a communication device of a fixed-type or a stationary-type electronic device installed indoors or outdoors, for example, such as an Audio-Video (AV) device, a kitchen device, a cleaning or washing machine, an air-conditioning device, office equipment, a vending machine, and other household devices.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of one aspect of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

What is claimed is:
1. A user equipment (UE), comprising:
  one or more non-transitory computer-readable media storing one or more computer-executable instructions for determining a number of coded modulation symbols for Uplink Control Information (UCI) in a Physical Uplink Shared Channel (PUSCH) transmission; and
  at least one processor coupled to the one or more non-transitory computer-readable media, and configured to execute the one or more computer-executable instructions to cause the UE to:
    determine that an Orthogonal Cover Code (OCC) is applied to the PUSCH transmission based on a first indication received from a base station (BS);

determine the number of coded modulation symbols for the UCI, that is transmitted on the PUSCH, based on the determination that the OCC is applied to the PUSCH transmission and based on a parameter that is received from the BS, wherein the parameter received from the BS is a parameter $$\beta_{offset}^{ACK};$$

determine a number of coded modulation symbols for a hybrid automatic repeat request acknowledgement (HARQ-ACK) based on (i) the determination that the OCC is applied to the PUSCH transmission and (ii) a first value of the parameter $$\beta_{offset}^{ACK};$$

determine that the OCC is not applied to the PUSCH transmission based on a second indication received from the BS; and determine another number of coded modulation symbols for the HARQ-ACK based on (i) the determination that the OCC is not applied to the PUSCH transmission and (ii) a second value of the parameter $$\beta_{offset}^{ACK}$$

received from the BS,
wherein the first value of the parameter $$\beta_{offset}^{ACK}$$

is used when the OCC is applied to the PUSCH transmission and the second value of the parameter $$\beta_{offset}^{ACK}$$

is used when the OCC is not applied to the PUSCH transmission, and
wherein the first and second values of the parameter $$\beta_{offset}^{ACK}$$

are different.

* * * * *